United States Patent
MolavianJazi et al.

(10) Patent No.: US 12,335,008 B2
(45) Date of Patent: Jun. 17, 2025

(54) BEAM MANAGEMENT FOR REPEATERS

(71) Applicant: Samsung Electronics Co., Ltd., Suwon-si (KR)

(72) Inventors: Ebrahim MolavianJazi, San Jose, CA (US); Marian Rudolf, Longueuil (CA); Aristides Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 301 days.

(21) Appl. No.: 18/169,850

(22) Filed: Feb. 15, 2023

(65) Prior Publication Data

US 2023/0283348 A1    Sep. 7, 2023

Related U.S. Application Data

(60) Provisional application No. 63/407,469, filed on Sep. 16, 2022, provisional application No. 63/327,683, (Continued)

(51) Int. Cl.
*H04B 7/06* (2006.01)
*H04B 7/155* (2006.01)

(52) U.S. Cl.
CPC ......... *H04B 7/0639* (2013.01); *H04B 7/0695* (2013.01); *H04B 7/155* (2013.01)

(58) Field of Classification Search
CPC .... H04B 7/0639; H04B 7/0695; H04B 7/155; H04B 7/06952; H04B 7/15528; H04B 7/15542
See application file for complete search history.

(56) References Cited

U.S. PATENT DOCUMENTS

| | | | |
|---|---|---|---|
| 11,510,166 B1 * | 11/2022 | Abedini | H04W 56/0075 |
| 11,658,732 B2 * | 5/2023 | Luo | H04B 7/15535 455/9 |

(Continued)

FOREIGN PATENT DOCUMENTS

| | | | | |
|---|---|---|---|---|
| CN | 116546517 A | * | 8/2023 | ......... H04B 17/328 |
| CN | 118285154 A | * | 7/2024 | ........ H04B 7/06964 |

(Continued)

OTHER PUBLICATIONS

3GPP TS 38.174, "Integrated Access and Backhaul (IAB) radio transmission and reception," 3rd Generation Partnership Project (3GPP), Tech. Rep. V.17.0.0, Mar. 2022. (Year: 2022).*

(Continued)

*Primary Examiner* — Berhanu Tadese

(57) ABSTRACT

Apparatuses and methods for beam management for repeaters. A method for a network-controlled repeater (NCR) includes receiving, by an NCR mobile termination (NCR-MT) entity, first information for a list of spatial domain filters for an access link of an NCR forwarding (NCR-Fwd) entity, second information for a set of spatial relations corresponding to reference signals (RS) for transmission or reception on a control link (C-link) of the NCR-MT entity, and third information indicating an uplink (UL) or downlink (DL) direction for each time domain resource. The method further includes determining an UL time domain resource, a first spatial domain filter, and a second spatial domain filter based on the second information. The method further includes receiving, by the NCR-Fwd entity, a radio frequency (RF) signal on the access link using the first spatial domain filter and transmitting the RF signal on a backhaul link using the second spatial domain filter.

20 Claims, 21 Drawing Sheets

Related U.S. Application Data filed on Apr. 5, 2022, provisional application No. 63/327,698, filed on Apr. 5, 2022, provisional application No. 63/316,851, filed on Mar. 4, 2022.

(56) References Cited

U.S. PATENT DOCUMENTS

| | | | |
|---|---|---|---|
| 11,770,177 B2 * | 9/2023 | Abedini | H04B 7/15528 455/11.1 |
| 11,838,947 B2 * | 12/2023 | Luo | H04W 16/14 |
| 11,876,573 B2 * | 1/2024 | Luo | H04B 7/15535 |
| 11,943,176 B2 * | 3/2024 | Luo | H04W 16/26 |
| 2019/0181943 A1 | 6/2019 | Liang et al. | |
| 2020/0266879 A1 | 8/2020 | Chia et al. | |
| 2021/0409106 A1 | 12/2021 | Ashworth et al. | |
| 2022/0053486 A1 | 2/2022 | Abedini et al. | |
| 2022/0069868 A1 | 3/2022 | Abedini et al. | |
| 2022/0069893 A1* | 3/2022 | Abedini | H04W 48/10 |
| 2022/0399984 A1* | 12/2022 | Luo | H04L 5/14 |
| 2023/0050960 A1* | 2/2023 | Abedini | H04W 8/08 |
| 2023/0054824 A1* | 2/2023 | Abedini | H04B 17/252 |
| 2023/0067905 A1* | 3/2023 | Luo | H04W 72/0446 |
| 2023/0119750 A1* | 4/2023 | Abedini | H04B 17/346 455/11.1 |
| 2023/0189253 A1* | 6/2023 | Kim | H04L 5/0007 370/329 |
| 2023/0239768 A1* | 7/2023 | Kowalski | H04W 28/0215 370/329 |
| 2023/0269736 A1* | 8/2023 | Abedini | H04B 7/15 370/315 |
| 2023/0283348 A1* | 9/2023 | MolavianJazi | H04B 7/15528 375/262 |
| 2023/0283358 A1* | 9/2023 | Rudolf | H04B 7/15528 370/315 |
| 2024/0022931 A1* | 1/2024 | MolavianJazi | H04B 7/155 |
| 2024/0049197 A1* | 2/2024 | MolavianJazi | H04W 92/23 |
| 2024/0057190 A1* | 2/2024 | MolavianJazi | H04W 76/19 |
| 2024/0057191 A1* | 2/2024 | Chen | H04W 76/19 |
| 2024/0063890 A1* | 2/2024 | Lee | H04B 7/15535 |
| 2024/0128999 A1* | 4/2024 | Haustein | H04B 7/04013 |
| 2024/0147550 A1* | 5/2024 | Fujishiro | H04B 7/15557 |
| 2024/0155379 A1* | 5/2024 | Fujishiro | H04W 16/26 |
| 2024/0187085 A1* | 6/2024 | McMenamy | H04B 7/15507 |
| 2024/0224243 A1* | 7/2024 | Chen | H04B 7/15528 |
| 2024/0235625 A1* | 7/2024 | Lee | H04L 5/0098 |
| 2024/0259913 A1* | 8/2024 | Haustein | H04W 76/15 |
| 2024/0276324 A1* | 8/2024 | Hwang | H04W 76/30 |
| 2024/0413858 A1* | 12/2024 | McMenamy | H04W 24/10 |
| 2024/0422748 A1* | 12/2024 | Fujishiro | H04B 7/14 |
| 2024/0422750 A1* | 12/2024 | Fujishiro | H04W 72/02 |

FOREIGN PATENT DOCUMENTS

| | | | |
|---|---|---|---|
| CN | 118414862 A * | 7/2024 | |
| CN | 118476268 A * | 8/2024 | |
| CN | 118476295 A * | 8/2024 | |
| CN | 118489290 A * | 8/2024 | H04B 7/04013 |
| EP | 4468768 A1 * | 11/2024 | H04W 16/26 |
| EP | 4472295 A1 * | 12/2024 | H04B 7/15507 |
| EP | 4472328 A1 * | 12/2024 | H04B 7/04013 |
| KR | 2024064310 A * | 5/2024 | H04W 16/28 |
| TW | 202420760 A * | 5/2024 | H04B 7/0695 |
| WO | WO-2022253993 A2 * | 12/2022 | H04B 17/328 |
| WO | WO-2022253993 A3 * | 1/2023 | H04B 17/328 |
| WO | WO-2023078566 A1 * | 5/2023 | |
| WO | WO-2023131455 A1 * | 7/2023 | H04B 7/15557 |
| WO | WO-2023135822 A1 * | 7/2023 | H04W 16/26 |
| WO | WO-2023135823 A1 * | 7/2023 | |
| WO | WO-2023137767 A1 * | 7/2023 | H04W 24/02 |
| WO | WO-2023141904 A1 * | 8/2023 | |
| WO | WO-2023141949 A1 * | 8/2023 | H04B 7/15507 |
| WO | WO-2023141965 A1 * | 8/2023 | H04B 7/04013 |
| WO | WO-2023145031 A1 * | 8/2023 | |
| WO | WO-2023159434 A1 * | 8/2023 | H04B 7/15 |
| WO | WO-2023159485 A1 * | 8/2023 | H04W 16/26 |
| WO | WO-2023160801 A1 * | 8/2023 | H04B 7/0639 |
| WO | WO-2023160802 A1 * | 8/2023 | H04B 7/026 |
| WO | WO-2023167550 A1 * | 9/2023 | H04B 7/0639 |
| WO | WO-2023167556 A1 * | 9/2023 | H04B 7/15528 |
| WO | WO-2023172073 A1 * | 9/2023 | H04W 16/26 |
| WO | WO-2023178478 A1 * | 9/2023 | H04B 7/15528 |
| WO | WO-2023249379 A1 * | 12/2023 | H04B 7/15507 |
| WO | WO-2024014899 A1 * | 1/2024 | H04W 16/28 |
| WO | WO-2024018850 A1 * | 1/2024 | H04B 7/15 |
| WO | WO-2024035009 A1 * | 2/2024 | H04W 16/26 |
| WO | WO-2024035044 A1 * | 2/2024 | H04W 16/28 |
| WO | WO-2024035100 A1 * | 2/2024 | H04B 7/15507 |
| WO | WO-2024035136 A1 * | 2/2024 | H04W 16/28 |
| WO | WO-2024060246 A1 * | 3/2024 | H04B 7/0439 |
| WO | WO-2024087233 A1 * | 5/2024 | H04W 16/2623 |
| WO | WO-2024102627 A1 * | 5/2024 | H04B 7/0695 |
| WO | WO-2024134606 A1 * | 6/2024 | |
| WO | WO-2024136531 A1 * | 6/2024 | H04B 7/0439 |
| WO | WO-2024143928 A1 * | 7/2024 | |
| WO | WO-2024144146 A1 * | 7/2024 | H04W 72/0446 |
| WO | WO-2024167271 A1 * | 8/2024 | H04B 17/40 |

OTHER PUBLICATIONS

H. Guo et al., A Comparison between Network-Controlled Repeaters and Reconfigurable Intelligent Surfaces, arXiv, 2022 (Year: 2022).*

3GPP TS 38.212 V.17.2.0 , Jun. 2022 (Year: 2022).*

3GPP TR 38.867 V0.2.0 (Aug. 2022)—Study on NR network-controlled repeaters (Year: 2022).*

Extended European Search Report issued May 8, 2025 regarding Application No. 23763748.3, 10 pages. (Year: 2025).*

Qualcomm, "NR Repeaters", 3GPP TSG RAN Meeting #90e, RP-202750, Dec. 2020, 13 pages (Year: 2020).*

Samsung, "On signaling and procedures for network-controlled repeaters", 3GPP TSG RAN WG1 190 110bis-e, R1-2209745, Oct. 2022, 14 pages. (Year: 2022).*

International Search Report and Written Opinion issued May 26, 2023 regarding International Application No. PCT/KR2023/002957, 10 pages.

"3rd Generation Partnership Project; Technical Specification Group Radio Access Network; NR; Physical channels and modulation (Release 17)", 3GPP TS 38.211 V17.2.0, Jun. 2022, 136 pages.

"3rd Generation Partnership Project; Technical Specification Group Radio Access Network; NR; Multiplexing and channel coding (Release 17)", 3GPP TS 38.212 V17.2.0, Jun. 2022, 201 pages.

"3rd Generation Partnership Project; Technical Specification Group Radio Access Network; NR; Physical layer procedures for control (Release 17)", 3GPP TS 38.213 V17.2.0, Jun. 2022, 256 pages.

"3rd Generation Partnership Project; Technical Specification Group Radio Access Network; NR; Physical layer procedures for data (Release 17)," 3GPP TS 38.214 V17.2.0 , Jun. 2022, 228 pages.

5G; NR; Physical layer measurements (3GPP TS 38.215 version 17.1.0 Release 17), ETSI TS 138 215 V17.1.0, Apr. 2022, 32 pages.

"5G; NR; Medium Access Control (MAC) protocol specification (3GPP TS 38.321 version 17.1.0 Release 17)", ETSI TS 138 321 V17.1.0 , Aug. 2022, 244 pages.

"5G; NR; Radio Resource Control (RRC); Protocol specification (3GPP TS 38.331 version 17.1.0 Release 17)", ETSI TS 138 331 V17.1.0, Aug. 2022, 1257 pages.

"5G; NR; NR and NG-RAN Overall description; Stage-2 (3GPP TS 38.300 version 16.8.0 Release 16)", ETSI TS 138 300 V16.8.0, Jan. 2022, 155 pages.

"3rd Generation Partnership Project; Technical Specification Group Radio Access network; Study on NR network-controlled repeaters; (Release 18)", 3GPP TR 38.867 V1.0.0, Sep. 2022, 18 pages.

"5G; NR; User Equipment (UE) radio access capabilities (3GPP TS 38.306 version 17.1.0 Release 17)", ETSI TS 138 306 V17.1.0, Aug. 2022, 226 pages.

Extended European Search Report issued May 8, 2025 regarding Application No. 23763748.3, 10 pages.

Qualcomm, "NR Repeaters", 3GPP TSG RAN Meeting #90e, RP-202750, Dec. 2020, 13 pages.

(56) References Cited

OTHER PUBLICATIONS

Samsung, "On signaling and procedures for network-controlled repeaters", 3GPP TSG RAN WG1 #110bis-e, R1-2209745, Oct. 2022, 14 pages.

\* cited by examiner

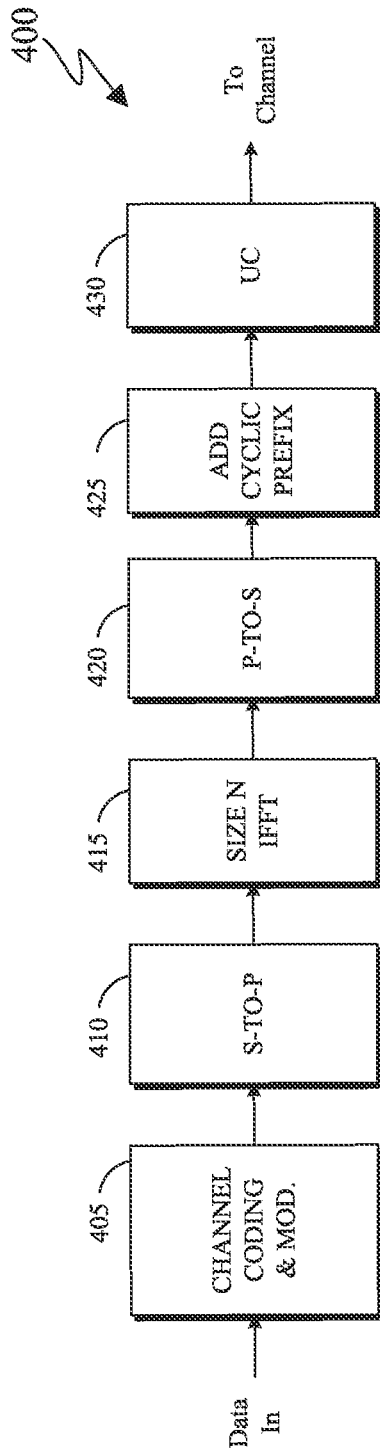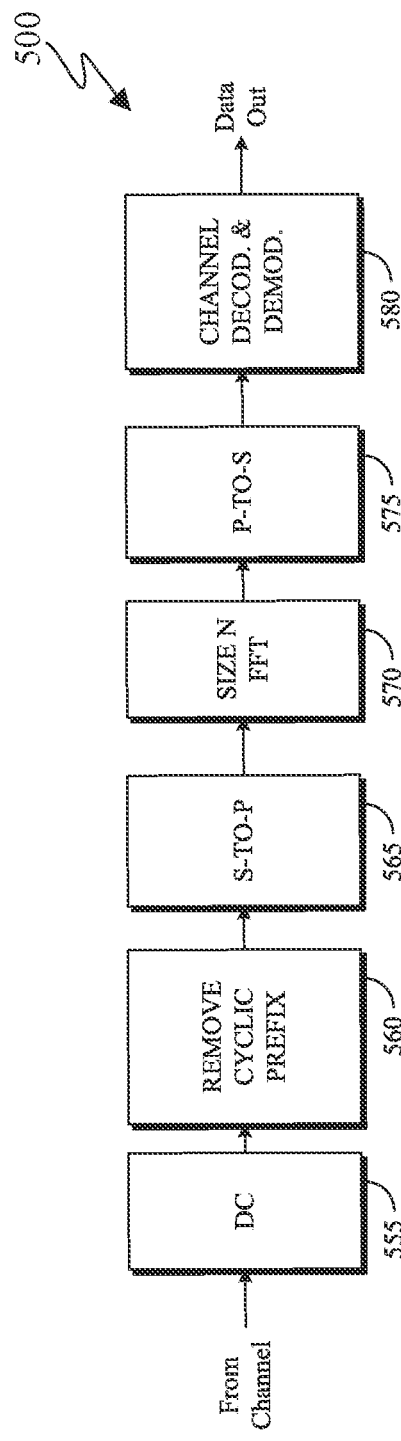
FIG. 4
FIG. 5

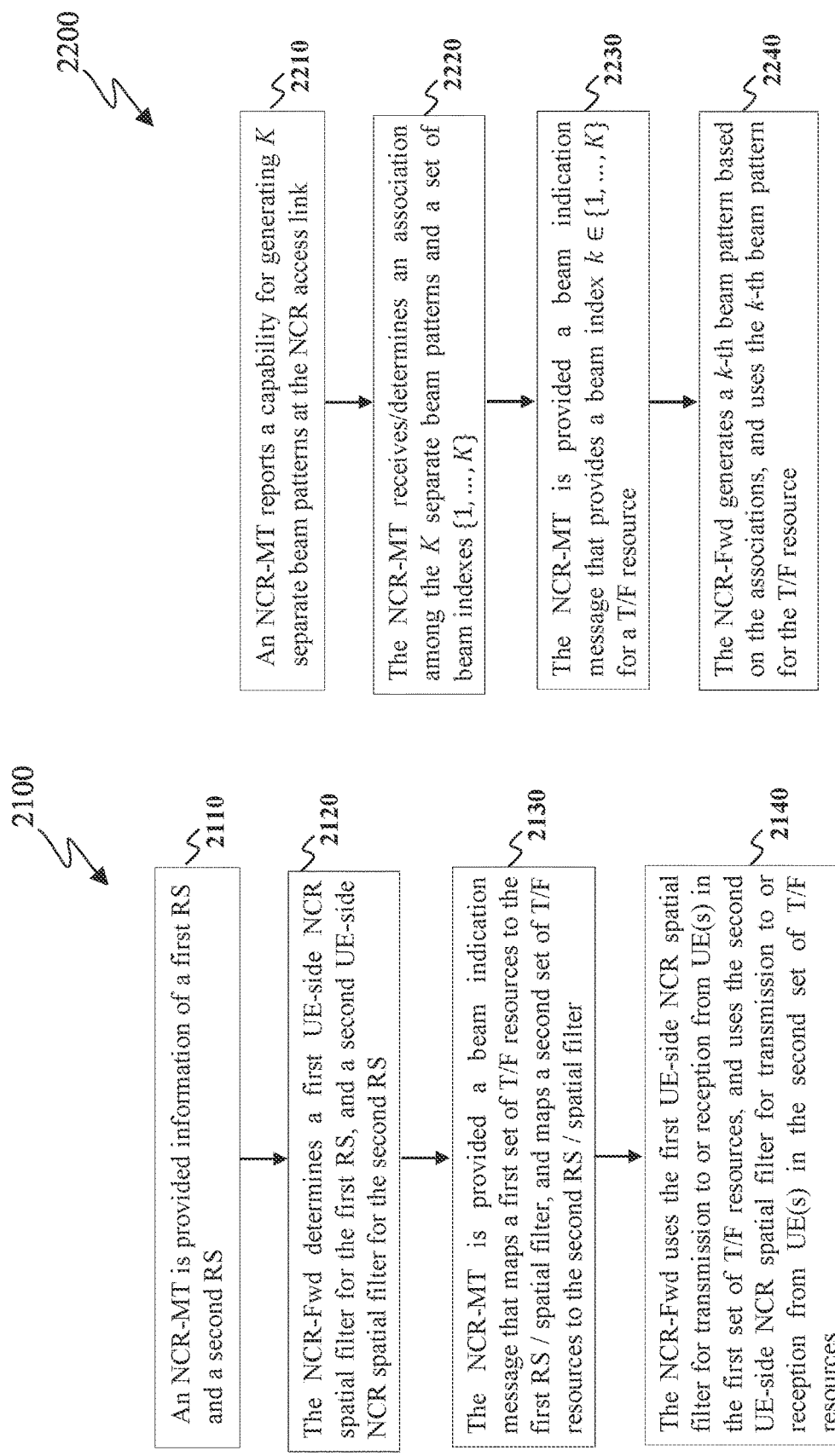

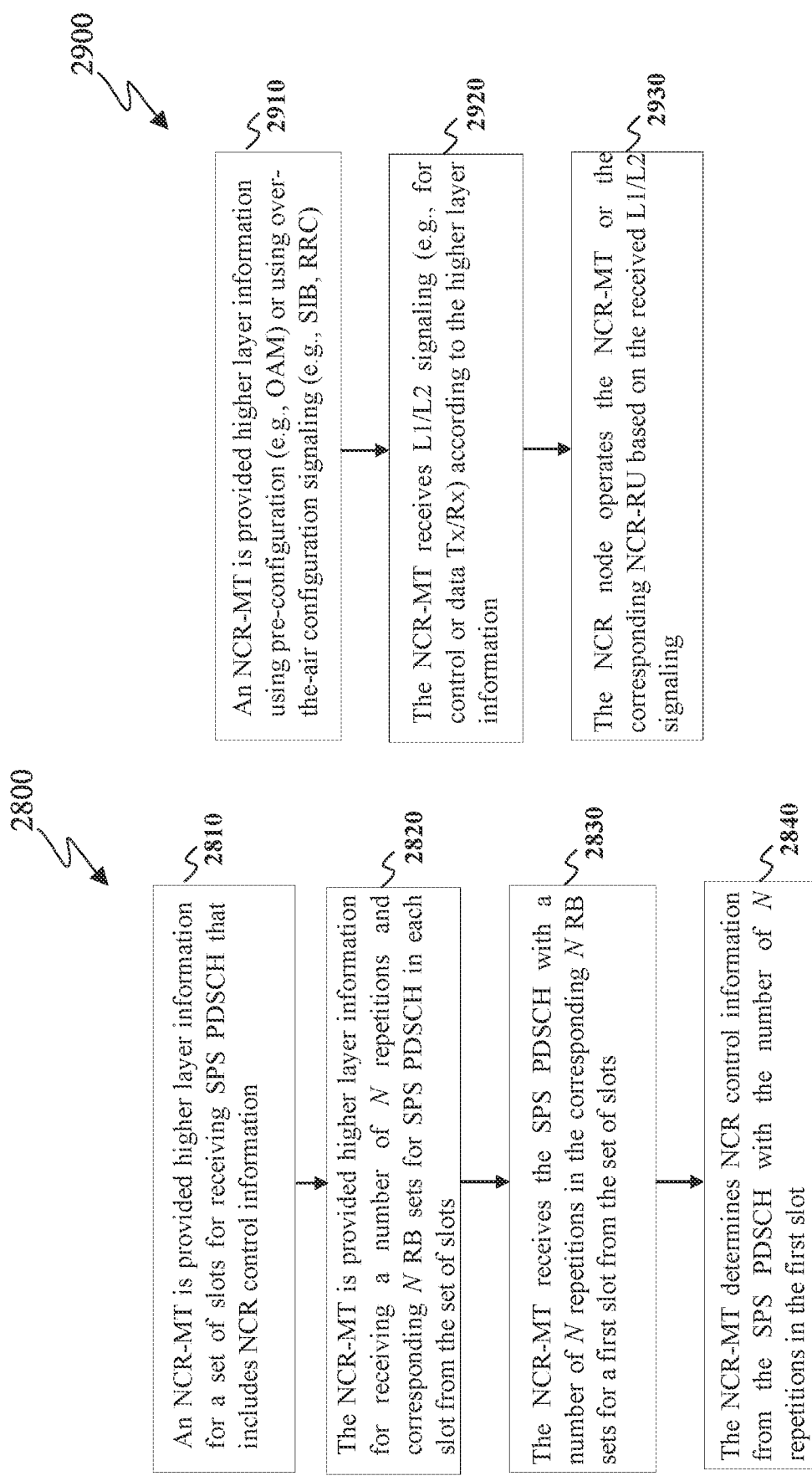

BEAM MANAGEMENT FOR REPEATERS

CROSS-REFERENCE TO RELATED APPLICATION AND CLAIM OF PRIORITY

This application claims priority under 35 U.S.C. § 119 (e) to U.S. Provisional Patent Application No. 63/316,851 filed on Mar. 4, 2022, U.S. Provisional Patent Application No. 63/327,683 filed on Apr. 5, 2022, U.S. Provisional Patent Application No. 63/327,698 filed on Apr. 5, 2022, and U.S. Provisional Patent Application No. 63/407,469 filed on Sep. 16, 2022. The above-identified provisional patent applications are hereby incorporated by reference in their entirety.

TECHNICAL FIELD

The present disclosure relates generally to wireless communication systems and, more specifically, to beam management for repeaters.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure relates to apparatuses and methods for facilitating beam management for repeaters.

In one embodiment, a method for a network-controlled repeater (NCR) is provided. The method includes receiving, by an NCR mobile termination (NCR-MT) entity, first information for a list of spatial domain filters for an access link of an NCR forwarding (NCR-Fwd) entity corresponding to a list of time domain resources, second information for a set of spatial relations corresponding to reference signals (RS) for transmission or reception on a control link (C-link) of the NCR-MT entity, and third information indicating an uplink (UL) direction or a downlink (DL) direction for each time domain resource from the list of time domain resources. The method further includes determining, by the NCR-MT entity, an UL time domain resource from the list of time domain resources based on the third information, a first spatial domain filter, from the list of spatial domain filters, and a second spatial domain filter based on the second information. The method further includes receiving, by the NCR-Fwd entity, a radio frequency (RF) signal on the access link using the first spatial domain filter over the UL time domain resource and amplifying, by the NCR-Fwd entity, the RF signal. The method further includes transmitting, by the NCR-Fwd entity, the RF signal on a backhaul link of the NCR-Fwd entity using the second spatial domain filter over the UL time domain resource.

In another embodiment, an NCR is provided. The NCR includes a transceiver configured to receive first information for a list of spatial domain filters for an access link of an NCR-Fwd entity corresponding to a list of time domain resources, second information for a set of spatial relations corresponding to RSs for transmission or reception on a C-link of the NCR-MT entity, and third information indicating an UL direction or a DL direction for each time domain resource from the list of time domain resources. The NCR further includes a processor operably coupled to the transceiver of the NCR-MT entity. The processor of the NCR-MT entity is configured to determine an UL time domain resource from the list of time domain resources based on the third information, a first spatial domain filter from the list of spatial domain filters, and a second spatial domain filter based on the second information. The NCR further includes a transceiver of the NCR-Fwd entity, operably coupled to the processor of the NCR-MT entity. The transceiver of the NCR-Fwd entity is configured to receive a RF signal on the access link using the first spatial domain filter over the UL time domain resource, amplify the RF signal, and transmit the RF signal on a backhaul link of the NCR-Fwd entity using the second spatial domain filter over the UL time domain resource.

In yet another embodiment, a base station (BS) is provided. The BS includes a transceiver configured to transmit to an NCR-MT entity. The configuration includes transmitting first information for a list of spatial domain filters for an access link of an NCR-Fwd entity corresponding to a list of time domain resources, second information for a set of spatial relations corresponding to RSs for transmission or reception on a C-link of the NCR-MT entity, and third information indicating an UL direction or a DL direction for each time domain resource from the list of time domain resources. The BS further includes a processor operably connected to the transceiver. The transceiver is configured to determine an UL time domain resource from the list of time domain resources based on the third information, and a first spatial domain filter based on the second information. The transceiver is further configured to receive a RF signal on a backhaul link from the NCR-Fwd entity using the first spatial domain filter over the UL time domain resource.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 4 and 5 illustrate example wireless transmit and receive paths according to embodiments of the present disclosure;

FIG. 21 illustrates an example flowchart for beam selection by the NCR-Fwd with respect to reference NCR beams for a set of RSs according to embodiments of the present disclosure;

FIG. 22 illustrates an example flowchart for beam selection by the NCR-Fwd on NCR access link according to embodiments of the present disclosure;

FIG. 28 illustrates an example flowchart for reception of FDM repetitions for SPS PDSCHs that includes NCR control information according to embodiments of the present disclosure;

FIG. 29 illustrates an example flowchart for NCR operation based on higher layer information according to embodiments of the present disclosure;

DETAILED DESCRIPTION

Figure 1:
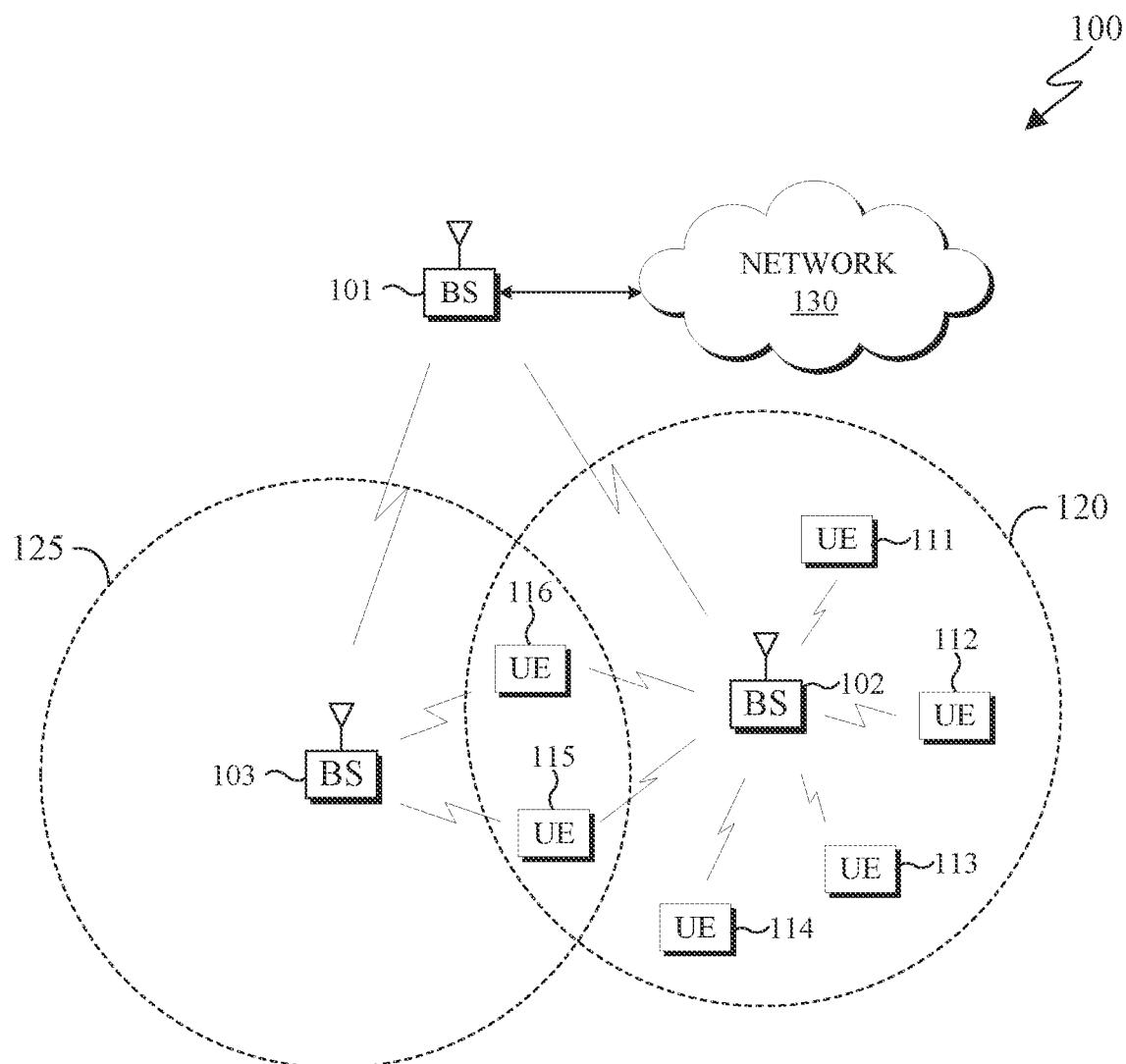
FIG. 1 illustrates an example wireless network according to embodiments of the present disclosure.

FIGS. 1 through 32, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

The following documents and standards descriptions are hereby incorporated by reference into the present disclosure as if fully set forth herein: 3GPP TS 38.211 v17.2.0, "NR, Physical Channels and Modulation" (herein "REF 1"); 3GPP TS 38.212 v17.2.0, "NR, Multiplexing and channel coding" (herein "REF 2"); 3GPP TS 38.213 v17.2.0, "NR, Physical Layer Procedures for Control" (herein "REF 3"); 3GPP TS 38.214 v17.2.0; "NR, Physical Layer Procedures for Data" (herein "REF 4"); 3GPP TS 38.215 v17.1.0; "NR, Physical Layer Measurements" (herein "REF 5"); 3GPP TS 38.321 v17.1.0; "NR, Medium Access Control (MAC) Protocol Specification" (herein "REF 6"); 3GPP TS 38.331 v17.1.0; "NR, Radio Resource Control (RRC) Protocol Specification" (herein "REF 7"); 3GPP TS 38.300 Rel-16 v16.8.0, "NR; NR and NG-RAN Overall Description; Stage 2" (herein "REF 8"); 3GPP TR 38.867 Rel-18 V1.0.0, "Study on NR network-controlled repeaters (Release 18)" (herein "REF 9"); and 3GPP TS 38.306 v17.1.0, "NR; User Equipment (UE) radio access capabilities" (herein "REF 10").

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage is of paramount importance.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHZ, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (COMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Various embodiments of the present disclosure recognize issues with coordinating beam generation and beam indication between a repeater node in a wireless network with the gNB, so that the gNB can configure and schedule UE(s) that are served through the repeater, with full authority same as for UE(s) directly served by the gNB. Various embodiments of the present disclosure also recognize that repeater operation should be such that there is no impact to UE procedures for beam management, beam failure recovery, and so on. Various embodiments of the present disclosure further recognize that mechanisms are needed to support L1/L2 signaling between the gNB and a repeater node in a wireless network for exchange of control information including time-varying or repeater-specific indications, such as beamforming information or ON/OFF indications for the repeater. Various embodiments of the present disclosure further recognize that mechanisms are desired for providing higher layer information and L1/L2 signaling that are cost-effective and minimize the implementation complexity of the repeater node. Various embodiments of the present disclosure further recognize that providing higher layer information or configuration information to a repeater node in a wireless network is desired in order to enable a 'connection' between the repeater and the gNB and to have a context to follow in later dynamic signaling of control information.

Accordingly, various embodiments of the present disclosure provide the repeater node with configuration information of the resources that the repeater node can use for reception of control signaling. Herein, a repeater can be a network-controlled (NetCon) repeater (NCR), also known as smart repeater (SR), where the gNB can provide the NCR with side control information, such as beamforming information. Further, various embodiments of the present disclosure further mechanisms for providing higher layer information and configurations are cost-effective and minimize the implementation complexity of the repeater node. Various embodiments of the present disclosure further provide methods and apparatus for beam management for SR, also known as NCRs. Various embodiments of the present disclosure further provide methods and apparatus for providing control information via L1/L2 signaling for SRs. Various embodiments of the present disclosure also provide methods and apparatus for providing higher layer information to SRs.

Figure 2:
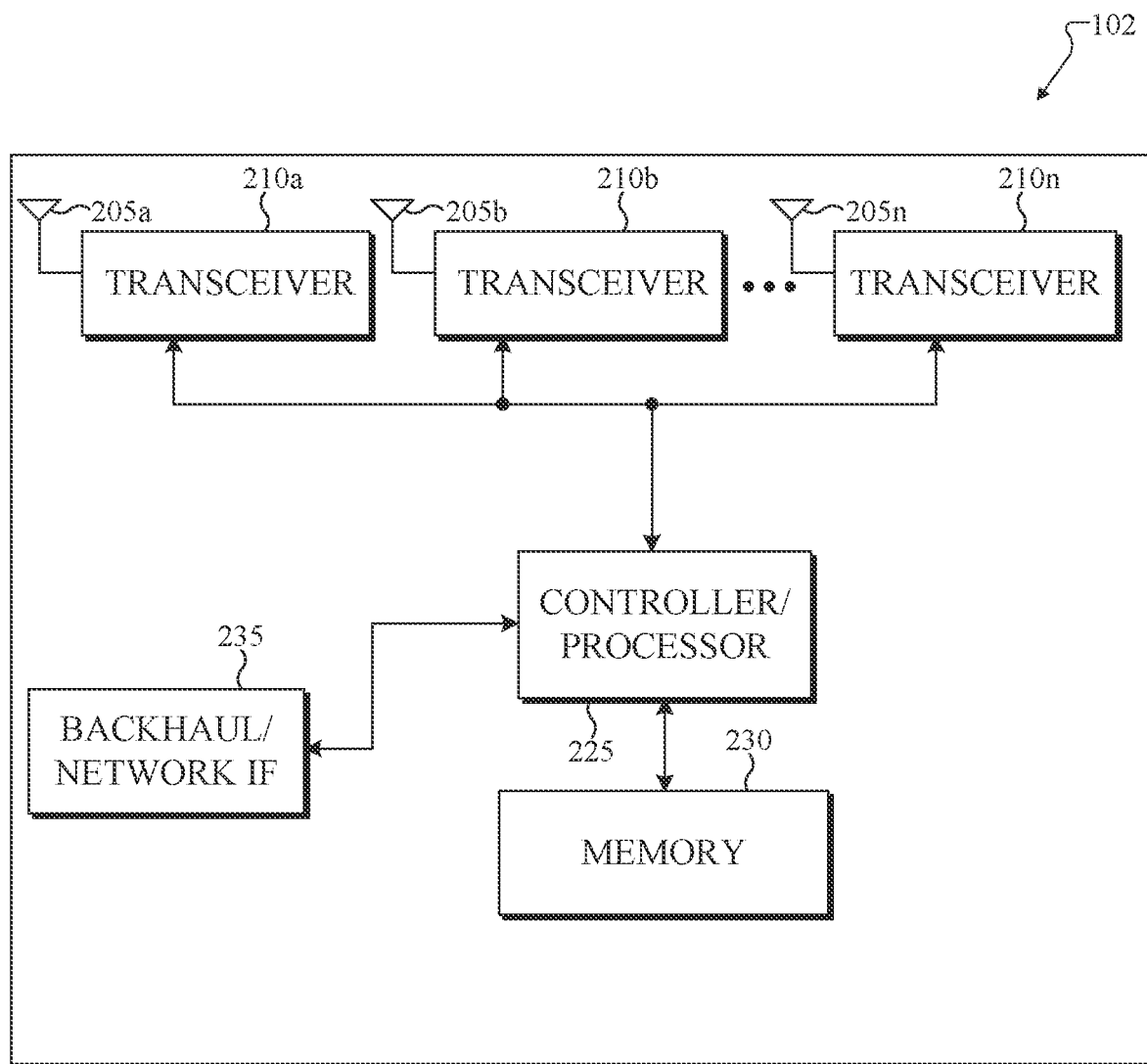
FIG. 2 illustrates an example transmit/receive point (TRP) according to embodiments of the present disclosure.
Figure 3:
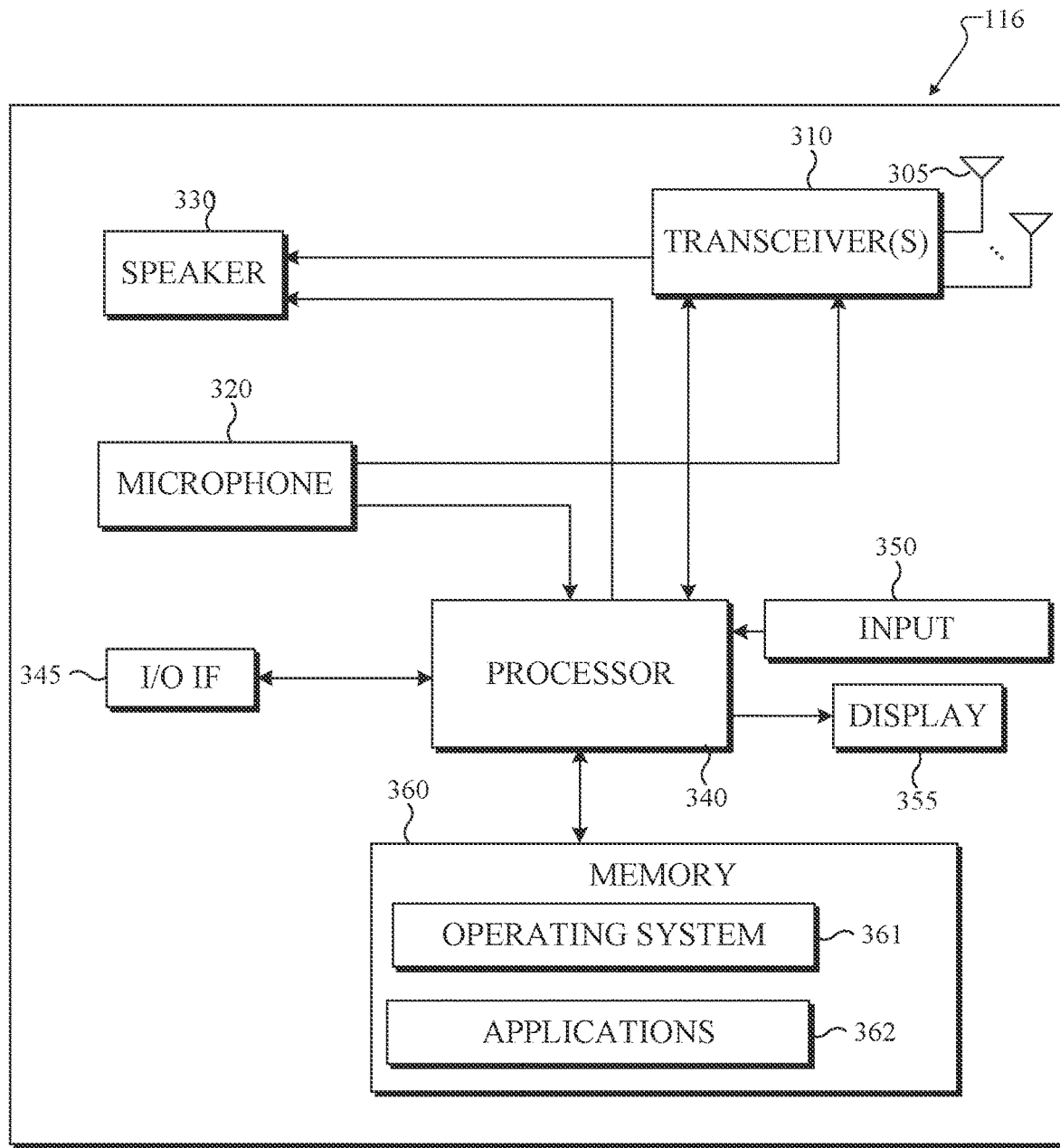
FIG. 3 illustrates an example user equipment (UE) according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103.

The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), a TRP, an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3rd generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof for communicating with repeaters. In certain embodiments, one or more of the BSs 101-103 include circuitry, programing, or a combination thereof for facilitating beam management for repeaters.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example TRP 200 according to embodiments of the present disclosure. The embodiment of the TRP 200 illustrated in FIG. 2 is for illustration only. In various embodiments, the TRP 200 is a base station such as gNBs 101-103 of FIG. 1. In other embodiments, the TRP 200 may be a repeater, such as a network controlled repeater (NCR). TRPs come in a wide variety of configurations, and FIG. 2 does not limit the scope of this disclosure to any particular implementation of a TRP.

As shown in FIG. 2, the TRP 200 includes multiple antennas 205a-205n, multiple transceivers 210a-210n, a controller/processor 225, a memory 230, and a backhaul or network interface 235.

The transceivers 210a-210n receive, from the antennas 205a-205n, incoming RF signals, such as signals transmitted by UEs or gNBs in the network 100. In various embodiments, certain of the transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, decoding, and/or digitizing the baseband or IF signals. The controller/processor 225 may further process the baseband signals. For example, in embodiments where the TRP 200 is a repeater, one or more of the transceivers 210 may be used for an NCR radio unit (NCR-RU) entity or NCR forwarding (NCR-Fwd) entity as a DL connection for signaling over an access link with a UE and/or over a backhaul link with a gNB. In these examples, the associated one(s) of the transceivers 210 for the NCR-RU entity or NCR-Fwd entity may not covert the incoming RF signal to IF or a baseband signal but rather amplify the incoming RF signal and forward or relay the amplified signal, without any down conversion to IF or baseband. In another example, in embodiments where the TRP 200 is a repeater, one or more of the transceivers 210 may be used for an NCR mobile termination (NCR-MT) entity as a DL or UL connection for control signaling over a control link (C-link) with a gNB.

Transmit (TX) processing circuitry in the transceivers 210a-210n and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210a-210n up-converts the baseband or IF signals to RF signals that are transmitted via the antennas 205a-205n.

The controller/processor 225 can include one or more processors or other processing devices that control the overall operation of the TRP 200. For example, the controller/processor 225 could control the reception of UL channel signals and the transmission of DL channel signals by the transceivers 210a-210n in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. As another example, the controller/processor 225 could support methods for facilitating beam management for repeaters. Any of a wide variety of other functions could be supported in the TRP 200 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the TRP 200 to communicate with other devices or systems over a backhaul connection or over a network. The interface 235 could support communications over any suitable wired or wireless connection(s). For example, when the TRP 200 is implemented as part of a cellular communication system (such as one supporting 5G/NR, LTE, or LTE-A), the interface 235 could allow the TRP 200 to communicate with other gNBs over a wired or wireless backhaul connection, for example, using a transceiver, such as described above with regard to transceivers 210. For example, in embodiments where the TRP is a repeater, the interface 235 may be used for an NCR-RU or NCR-Fwd entity as a backhaul connection with a gNB over a backhaul link for control signaling and/or data to be transmitted to and/or received from a UE. When the TRP 200 is implemented as an access point, the interface 235 could allow the TRP 200 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of TRP 200, various changes may be made to FIG. 2. For example, the TRP 200 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives, from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

FIG. 4 and FIG. 5 illustrate example wireless transmit and receive paths according to this disclosure. In the following description, a transmit path 400, of FIG. 4, may be described as being implemented in a BS (such as the BS 102), while a receive path 500, of FIG. 5, may be described as being implemented in a UE (such as a UE 116). However, it may be understood that the receive path 500 can be implemented in a BS and that the transmit path 400 can be implemented in a UE. In various embodiments, one or more of the receive path 500 and/or transmit path 400 may be implemented in a repeater. In some embodiments, the receive path 500 and/or transmit path 400 is configured to facilitate beam management for repeaters as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the BS 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the BS 102 arrives at the UE 116 after passing through the wireless channel, and reverse operations to those at the BS 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the BSs 101-103 and the TRP 200 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the BSs 101-103 or the TRP 200 and may implement the receive path 500 for receiving in the downlink from the BSs 101-103 or the TRP 200.

Each of the components in FIG. 4 and FIG. 5 can be implemented using hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

A communication system can include a downlink (DL) that refers to transmissions from a base station (such as the BS 102) or one or more transmission points to UEs (such as the UE 116) and an uplink (UL) that refers to transmissions from UEs (such as the UE 116) to a base station (such as the BS 102) or to one or more reception points.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of sub-carriers (SCs). For example, a slot can have duration of 1 millisecond or 0.5 millisecond, include 14 symbols and an RB can include 12 SCs with inter-SC spacing of 15 kHz or 30 kHz, and so on.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. For brevity, a DCI format scheduling a PDSCH reception by a UE is referred to as a DL DCI format and a DCI format scheduling a physical uplink shared channel (PUSCH) transmission from a UE is referred to as an UL DCI format.

A gNB (such as the BS 102) transmits one or more of multiple types of RS including channel state information RS (CSI-RS) and demodulation RS (DM-RS). A CSI-RS is primarily intended for UEs to perform measurements and provide channel state information (CSI) to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process consists of NZP CSI-RS and CSI-IM resources.

A UE (such as the UE 116) can determine CSI-RS transmission parameters through DL control signaling or higher layer signaling, such as radio resource control (RRC)

signaling, from a gNB (such as the BS 102). Transmission instances of a CSI-RS can be indicated by DL control signaling or be configured by higher layer signaling. A DM-RS is transmitted only in the BW of a respective PDCCH or PDSCH and a UE can use the DM-RS to demodulate data or control information.

In certain embodiments, UL signals also include data signals conveying information content, control signals conveying UL control information (UCI), DM-RS associated with data or UCI demodulation, sounding RS (SRS) enabling a gNB to perform UL channel measurement, and a RA preamble enabling a UE to perform RA (see also NR specification). A UE transmits data information or UCI through a respective PUSCH or a physical UL control channel (PUCCH). A PUSCH or a PUCCH can be transmitted over a variable number of slot symbols including one slot symbol. The gNB can configure the UE to transmit signals on a cell within an active UL bandwidth part (BWP) of the cell UL BW.

UCI includes HARQ acknowledgement (ACK) information, indicating correct or incorrect detection of data transport blocks (TBs) in a PDSCH, scheduling request (SR) indicating whether a UE has data in a buffer, and CSI reports enabling a gNB to select appropriate parameters for PDSCH or PDCCH transmissions to a UE. HARQ-ACK information can be configured to be with a smaller granularity than per TB and can be per data code block (CB) or per group of data CBs where a data TB includes a number of data CBs.

A CSI report from a UE can include a channel quality indicator (CQI) informing a gNB of a largest modulation and coding scheme (MCS) for the UE to detect a data TB with a predetermined block error rate (BLER), such as a 10% BLER (see NR specification), of a precoding matrix indicator (PMI) informing a gNB how to combine signals from multiple transmitter antennas in accordance with a MIMO transmission principle, and of a rank indicator (RI) indicating a transmission rank for a PDSCH.

UL RS includes DM-RS and SRS. DM-RS is transmitted only in a BW of a respective PUSCH or PUCCH transmission. A gNB can use a DM-RS to demodulate information in a respective PUSCH or PUCCH. SRS is transmitted by a UE to provide a gNB with an UL CSI and, for a TDD system, an SRS transmission can also provide a PMI for DL transmission. Additionally, in order to establish synchronization or an initial higher layer connection with a gNB, a UE can transmit a physical random-access channel (PRACH as shown in NR specifications).

An antenna port is defined such that the channel over which a symbol on the antenna port is conveyed can be inferred from the channel over which another symbol on the same antenna port is conveyed.

For DM-RS associated with a PDSCH, the channel over which a PDSCH symbol on one antenna port is conveyed can be inferred from the channel over which a DM-RS symbol on the same antenna port is conveyed only if the two symbols are within the same resource as the scheduled PDSCH, in the same slot, and in the same precoding resource block group (PRG).

For DM-RS associated with a PDCCH, the channel over which a PDCCH symbol on one antenna port is conveyed can be inferred from the channel over which a DM-RS symbol on the same antenna port is conveyed only if the two symbols are within resources for which the UE may assume the same precoding being used.

For DM-RS associated with a physical broadcast channel (PBCH), the channel over which a PBCH symbol on one antenna port is conveyed can be inferred from the channel over which a DM-RS symbol on the same antenna port is conveyed only if the two symbols are within a SS/PBCH block transmitted within the same slot, and with the same block index.

Two antenna ports are said to be quasi co-located if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial Rx parameters.

The UE (such as the UE 116) may assume that synchronization signal (SS)/PBCH block (also denoted as SSBs) transmitted with the same block index on the same center frequency location are quasi co-located with respect to Doppler spread, Doppler shift, average gain, average delay, delay spread, and, when applicable, spatial Rx parameters. The UE may not assume quasi co-location for any other synchronization signal SS/PBCH block transmissions.

In absence of CSI-RS configuration, and unless otherwise configured, the UE may assume PDSCH DM-RS and SSB to be quasi co-located with respect to Doppler shift, Doppler spread, average delay, delay spread, and, when applicable, spatial Rx parameters. The UE may assume that the PDSCH DM-RS within the same code division multiplexing (CDM) group is quasi co-located with respect to Doppler shift, Doppler spread, average delay, delay spread, and spatial Rx. The UE may also assume that DM-RS ports associated with a PDSCH are QCL with QCL type A, type D (when applicable) and average gain. The UE may further assume that no DM-RS collides with the SS/PBCH block.

The UE can be configured with a list of up to M transmission configuration indication (TCI) State configurations within the higher layer parameter PDSCH-Config to decode PDSCH according to a detected PDCCH with DCI intended for the UE and the given serving cell, where M depends on the UE capability maxNumberConfiguredTCIstatesPerCC. Each TCI-State contains parameters for configuring a quasi-colocation (QCL) relationship between one or two downlink reference signals and the DM-RS ports of the PDSCH, the DM-RS port of PDCCH or the CSI-RS port(s) of a CSI-RS resource.

The quasi co-location relationship is configured by the higher layer parameter qcl-Type1 for the first DL RS, and qcl-Type2 for the second DL RS (if configured). For the case of two DL RSs, the QCL types may not be the same, regardless of whether the references are to the same DL RS or different DL RSs. The quasi co-location types corresponding to each DL RS are given by the higher layer parameter qcl-Type in QCL-Info and may take one of the following values:

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

The UE receives a MAC-CE activation command to map up to [N] (e.g., N=8) TCI states to the codepoints of the DCI field "Transmission Configuration Indication." When the HARQ-ACK corresponding to the PDSCH carrying the activation command is transmitted in slot n, the indicated mapping between TCI states and codepoints of the DCI field "Transmission Configuration Indication" may be applied after a MAC-CE application time, e.g., starting from the first slot that is after slot $(n+3N_{slot}^{subframe,\mu})$ where $N_{slot}^{subframe,\mu}$ is a number of slot per subframe for subcarrier spacing (SCS) configuration $\mu$.

Figure 6:
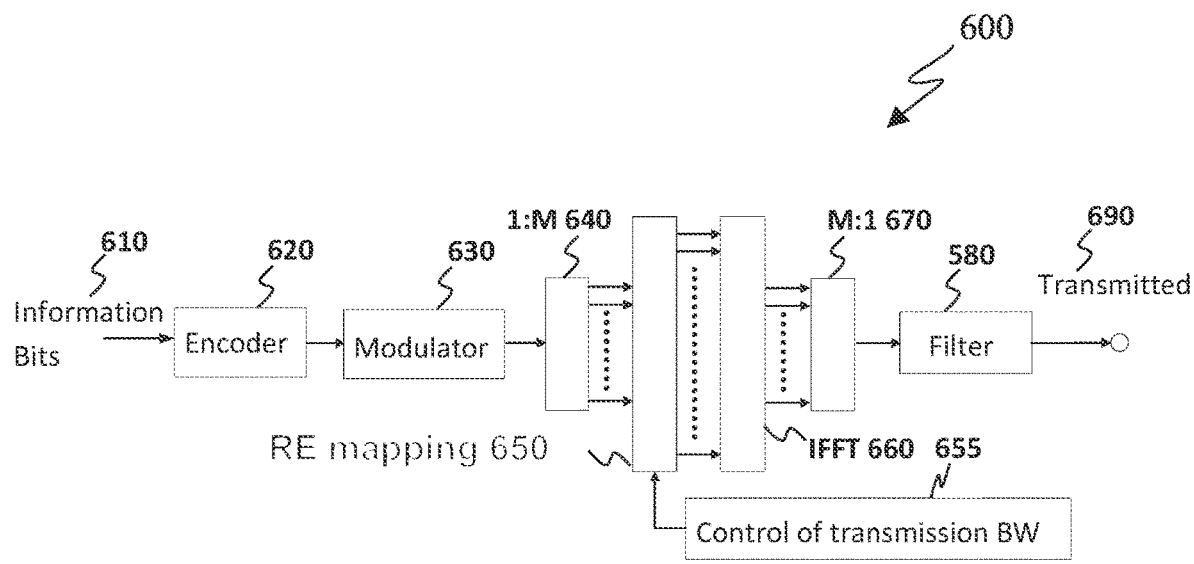
FIG. 6 illustrates a transmitter block diagram for a physical downlink shared channel (PDSCH) in a slot according to embodiments of the present disclosure.

FIG. 6 illustrates a transmitter block diagram 600 for a PDSCH in a slot according to embodiments of the present disclosure. The embodiment of the transmitter block diagram 600 illustrated in FIG. 6 is for illustration only. One or more of the components illustrated in FIG. 6 can be implemented in specialized circuitry configured to perform the noted functions or one or more of the components can be implemented by one or more processors executing instructions to perform the noted functions. FIG. 6 does not limit the scope of this disclosure to any particular implementation of the transmitter block diagram 600.

As shown in FIG. 6, information bits 610 are encoded by encoder 620, such as a turbo encoder, and modulated by modulator 630, for example using quadrature phase shift keying (QPSK) modulation. A serial to parallel (S/P) converter 640 generates M modulation symbols that are subsequently provided to a mapper 650 to be mapped to REs selected by a transmission BW selection unit 655 for an assigned PDSCH transmission BW, unit 660 applies an Inverse fast Fourier transform (IFFT), the output is then serialized by a parallel to serial (P/S) converter 670 to create a time domain signal, filtering is applied by filter 680, and a signal transmitted 690. Additional functionalities, such as data scrambling, cyclic prefix insertion, time windowing, interleaving, and others are well known in the art and are not shown for brevity.

Figure 7:
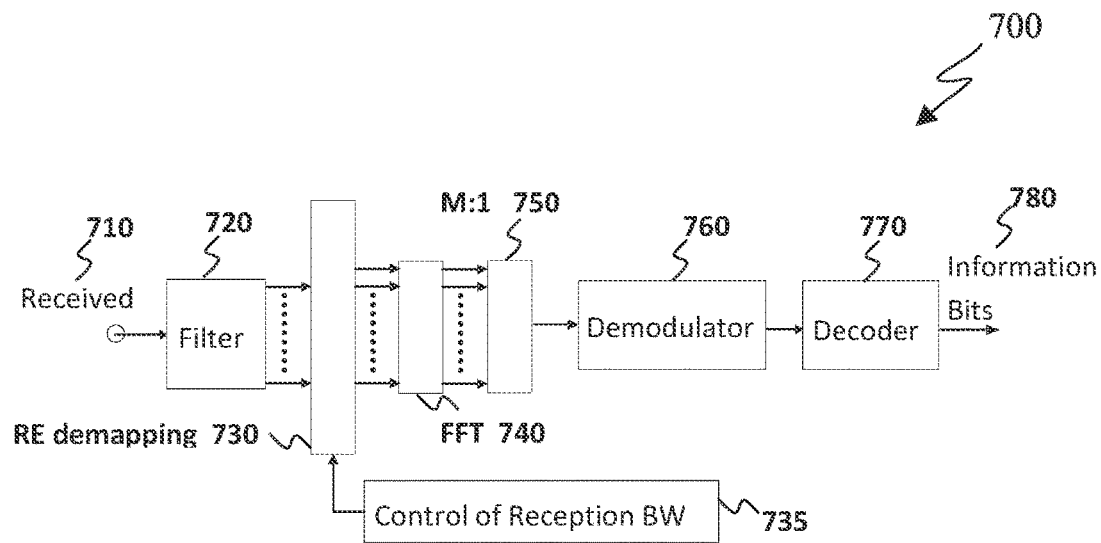
FIG. 7 illustrates a receiver block diagram for a PDSCH in a slot according to embodiments of the present disclosure.

FIG. 7 illustrates a receiver block diagram 700 for a PDSCH in a slot according to embodiments of the present disclosure. The embodiment of the diagram 700 illustrated in FIG. 7 is for illustration only. One or more of the components illustrated in FIG. 7 can be implemented in specialized circuitry configured to perform the noted functions or one or more of the components can be implemented by one or more processors executing instructions to perform the noted functions. FIG. 7 does not limit the scope of this disclosure to any particular implementation of the diagram 700.

As shown in FIG. 7, a received signal 710 is filtered by filter 720, REs 730 for an assigned reception BW are selected by BW selector 735, unit 740 applies a fast Fourier transform (FFT), and an output is serialized by a parallel-to-serial converter 750. Subsequently, a demodulator 760 coherently demodulates data symbols by applying a channel estimate obtained from a DMRS or a CRS (not shown), and a decoder 770, such as a turbo decoder, decodes the demodulated data to provide an estimate of the information data bits 780. Additional functionalities such as time-windowing, cyclic prefix removal, de-scrambling, channel estimation, and de-interleaving are not shown for brevity.

Figure 8:
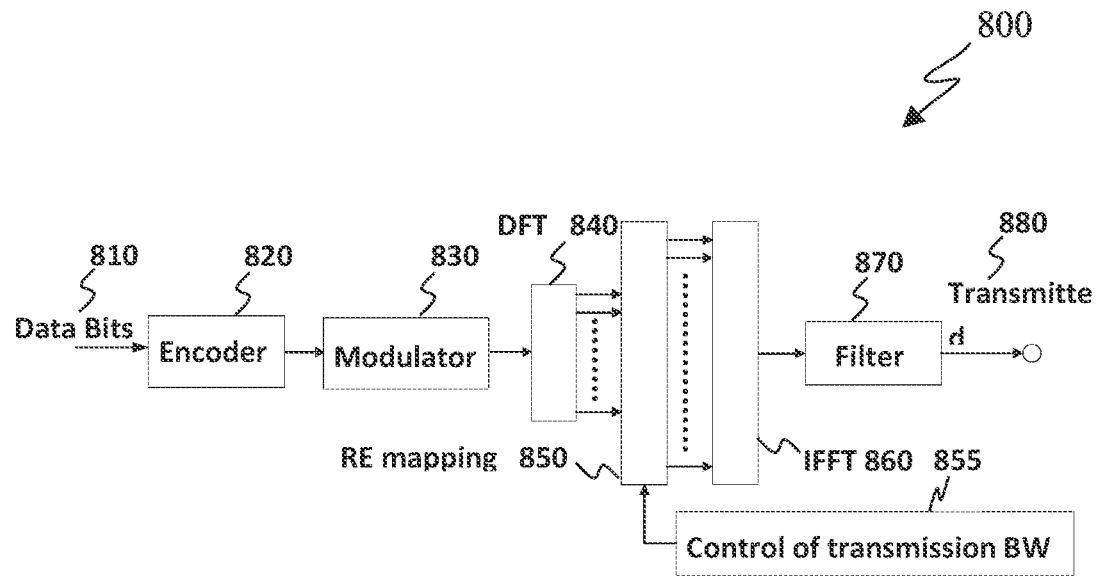
FIG. 8 illustrates a transmitter block diagram for a physical uplink shared channel (PUSCH) in a slot according to embodiments of the present disclosure.

FIG. 8 illustrates a transmitter block diagram 800 for a PUSCH in a slot according to embodiments of the present disclosure. The embodiment of the block diagram 800 illustrated in FIG. 8 is for illustration only. One or more of the components illustrated in FIG. 6 can be implemented in specialized circuitry configured to perform the noted functions or one or more of the components can be implemented by one or more processors executing instructions to perform the noted functions. FIG. 8 does not limit the scope of this disclosure to any particular implementation of the block diagram 800.

As shown in FIG. 8, information data bits 810 are encoded by encoder 820, such as a turbo encoder, and modulated by modulator 830. A discrete Fourier transform (DFT) unit 840 applies a DFT on the modulated data bits, REs 850 corresponding to an assigned PUSCH transmission BW are selected by transmission BW selection unit 855, unit 860 applies an IFFT and, after a cyclic prefix insertion (not shown), filtering is applied by filter 870 and a signal transmitted 880.

Figure 9:
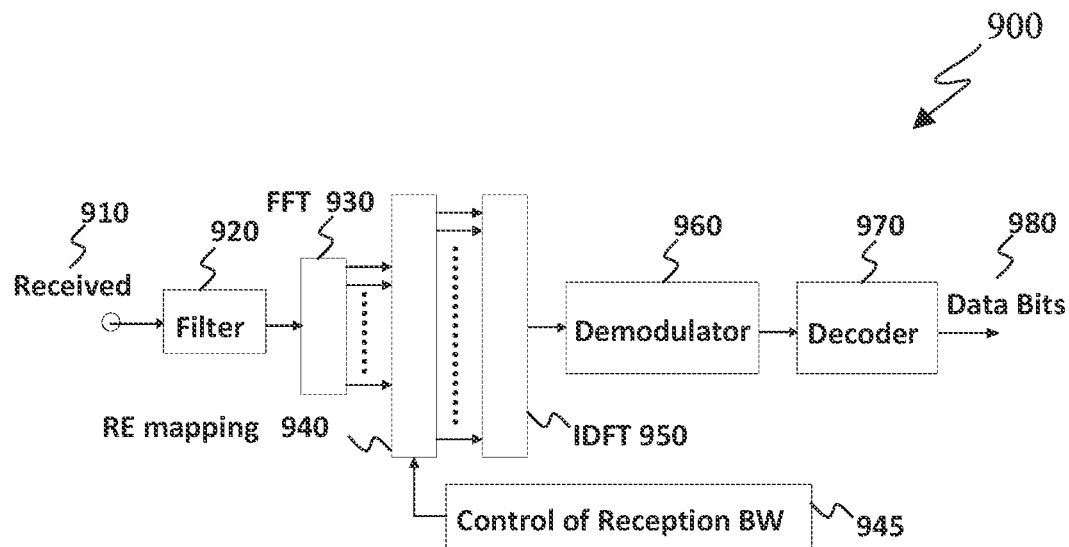
FIG. 9 illustrates a receiver block diagram for a PUSCH in a slot according to embodiments of the present disclosure.

FIG. 9 illustrates a receiver block diagram 900 for a PUSCH in a subframe according to embodiments of the present disclosure. The embodiment of the block diagram 900 illustrated in FIG. 9 is for illustration only. One or more of the components illustrated in FIG. 9 can be implemented in specialized circuitry configured to perform the noted functions or one or more of the components can be implemented by one or more processors executing instructions to perform the noted functions. FIG. 9 does not limit the scope of this disclosure to any particular implementation of the block diagram 900.

As shown in FIG. 9, a received signal 910 is filtered by filter 920. Subsequently, after a cyclic prefix is removed (not shown), unit 930 applies an FFT, REs 940 corresponding to an assigned PUSCH reception BW are selected by a reception BW selector 945, unit 950 applies an inverse DFT (IDFT), a demodulator 960 coherently demodulates data symbols by applying a channel estimate obtained from a DMRS (not shown), a decoder 970, such as a turbo decoder, decodes the demodulated data to provide an estimate of the information data bits 980.

Figure 10:
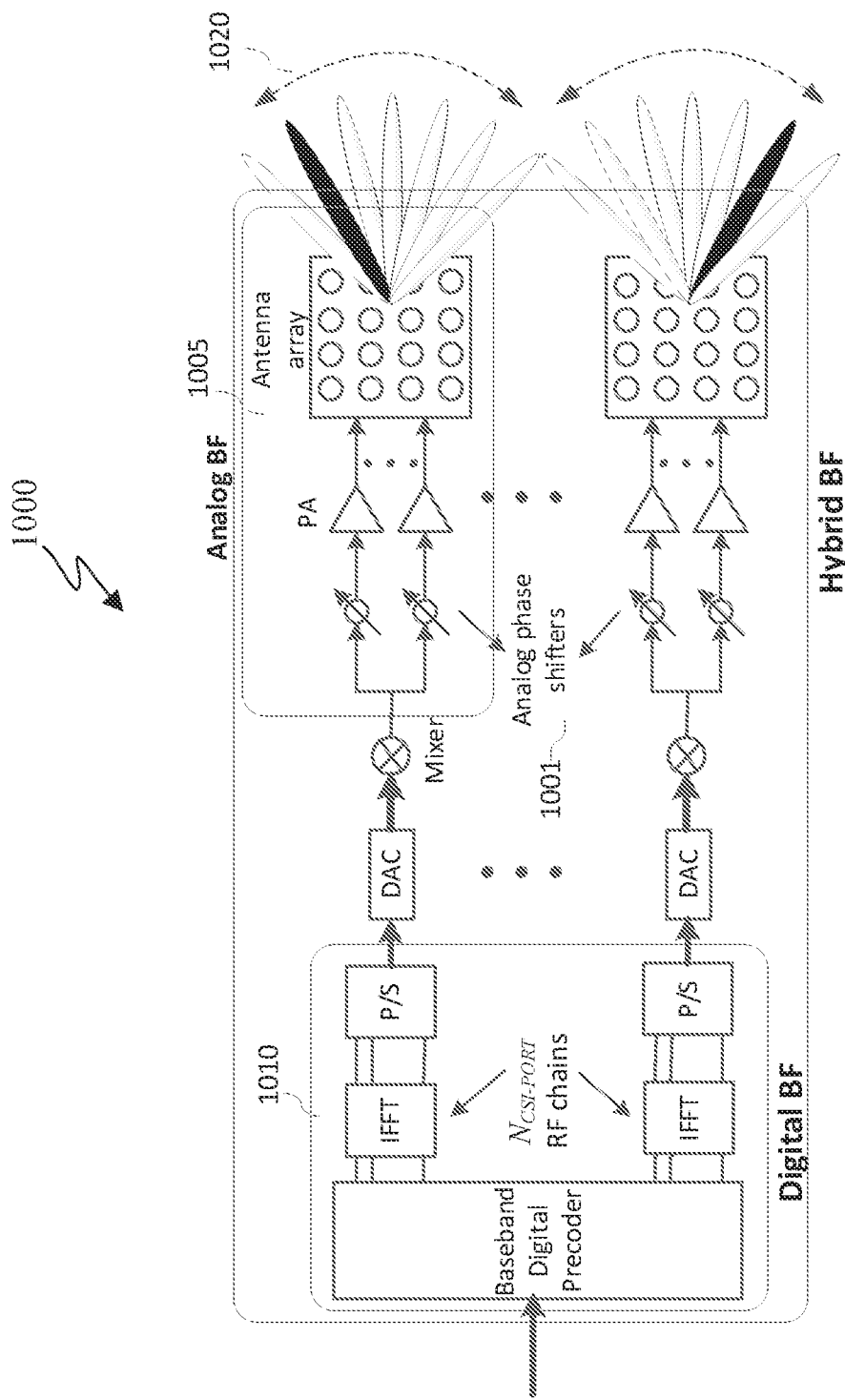
FIG. 10 illustrates an example antenna blocks or arrays forming beams according to embodiments of the present disclosure.

FIG. 10 illustrates an example antenna blocks or arrays 1000 according to embodiments of the present disclosure. For example, in various embodiments, the antenna blocks or arrays 1000 may be implemented in any of the gNBs 101-103, the TRP 200, and/or the UEs 111-116. The embodiment of the antenna blocks or arrays 1000 illustrated in FIG. 10 is for illustration only. FIG. 10 does not limit the scope of this disclosure to any particular implementation of the antenna blocks or arrays.

The 3GPP NR specification supports up to 32 CSI-RS antenna ports which enable a gNB to be equipped with a large number of antenna elements (such as 64 or 128). In this case, a plurality of antenna elements is mapped onto one CSI-RS port.

For FR2, e.g., mmWave bands, although the number of antenna elements can be larger for a given form factor, the number of CSI-RS ports-which can correspond to the number of digitally precoded ports-tends to be limited due to hardware constraints (such as the feasibility to install a large number of ADCs/DACs at mmWave frequencies) as illustrated in FIG. 10. In this case, one CSI-RS port is mapped onto a large number of antenna elements which can be controlled by a bank of analog phase shifters 1001. One CSI-RS port can then correspond to one sub-array which produces a narrow analog beam through analog beamforming 1005. This analog beam can be configured to sweep across a wider range of angles 1020 by varying the phase shifter bank across symbols or subframes. The number of sub-arrays (equal to the number of RF chains) is the same as the number of CSI-RS ports NCSI-PORT. A digital beamforming unit 1010 performs a linear combination across NCSI-PORT analog beams to further increase precoding gain. While analog beams are wideband (hence not frequency-selective), digital precoding can be varied across frequency sub-bands or resource blocks. Receiver operation can be conceived analogously.

Since the above system utilizes multiple analog beams for transmission and reception (wherein one or a small number of analog beams are selected out of a large number, for instance, after a training duration—to be performed from time to time), the term "multi-beam operation" is used to refer to the overall system aspect. This includes, for the purpose of illustration, indicating the assigned DL or UL transmit (TX) beam (also termed "beam indication"), measuring at least one reference signal for calculating and performing beam reporting (also termed "beam measurement" and "beam reporting", respectively), and receiving a DL or UL transmission via a selection of a corresponding receive (RX) beam.

The above system is also applicable to higher frequency bands such as FR2-2, e.g., >52.6 GHz. In this case, the system can employ only analog beams. Due to the O2 absorption loss around 60 GHz frequency (~10 dB additional loss @100 m distance), larger number of and sharper analog beams (hence larger number of radiators in the array) will be needed to compensate for the additional path loss.

In the present disclosure, the frequency resolution (reporting granularity) and span (reporting bandwidth) of CSI or calibration coefficient reporting can be defined in terms of frequency "subbands" and "CSI reporting band" (CRB), respectively.

A subband for CSI or calibration coefficient reporting is defined as a set of contiguous PRBs which represents the smallest frequency unit for CSI or calibration coefficient reporting. The number of PRBs in a subband can be fixed for a given value of DL system bandwidth, configured either semi-statically via higher layer/RRC signaling, or dynamically via L1 DL control signaling or MAC control element (MAC CE). The number of PRBs in a subband can be included in CSI or calibration coefficient reporting setting. The term "CSI reporting band" is defined as a set/collection of subbands, either contiguous or non-contiguous, wherein CSI or calibration coefficient reporting is performed. For example, CSI or calibration coefficient reporting band can include all the subbands within the DL system bandwidth. This can also be termed "full-band". Alternatively, CSI or calibration coefficient reporting band can include only a collection of subbands within the DL system bandwidth. This can also be termed "partial band". The term "CSI reporting band" is used only as an example for representing a function. Other terms such as "CSI reporting subband set" or "CSI or calibration coefficient reporting bandwidth" can also be used.

In terms of UE configuration, a UE can be configured with at least one CSI or calibration coefficient reporting band. This configuration can be semi-static (via higher-layer signaling or RRC) or dynamic (via MAC CE or L1 DL control signaling). When configured with multiple (N) CSI or calibration coefficient reporting bands (e.g., via RRC signaling), a UE can report CSI associated with n≤N CSI reporting bands. For instance, >6 GHz, large system bandwidth may require multiple CSI or calibration coefficient reporting bands. The value of n can either be configured semi-statically (via higher-layer signaling or RRC) or dynamically (via MAC CE or L1 DL control signaling). Alternatively, the UE can report a recommended value of n via an UL channel.

Therefore, CSI parameter frequency granularity can be defined per CSI reporting band as follows. A CSI parameter is configured with "single" reporting for the CSI reporting band with Mn subbands when one CSI parameter for all the Mn subbands within the CSI reporting band. A CSI parameter is configured with "subband" for the CSI reporting band with Mn subbands when one CSI parameter is reported for each of the Mn subbands within the CSI reporting band.

In the following and throughout the disclosure, various embodiments of the disclosure may be also implemented in any type of UE including, for example, UEs with the same, similar, or more capabilities compared to legacy 5G NR UEs. Although various embodiments of the disclosure discuss 3GPP 5G NR communication systems, the embodiments may apply in general to UEs operating with other RATs and/or standards, such as next releases/generations of 3GPP, IEEE WiFi, and so on.

In the following, unless otherwise explicitly noted, providing a parameter value by higher layers includes providing the parameter value by a system information block (SIB), such as a SIB1, or by a common RRC signaling, or by UE-specific RRC signaling.

In the following, for brevity of description, the higher layer provided TDD UL-DL frame configuration refers to tdd-UL-DL-ConfigurationCommon as example for RRC common configuration and/or tdd-UL-DL-Configuration-Dedicated as example for UE-specific configuration. The UE determines a common TDD UL-DL frame configuration of a serving cell by receiving a SIB such as a SIB1 when accessing the cell from RRC_IDLE or by RRC signaling when the UE is configured with SCells or additional SCGs by an IE ServingCellConfigCommon in RRC_CONNECTED. The UE determines a dedicated TDD UL-DL frame configuration using the IE ServingCellConfig when the UE is configured with a serving cell, e.g., add or modify, where the serving cell may be the SpCell or an SCell of an MCG or SCG. A TDD UL-DL frame configuration designates a slot or symbol as one of types 'D', 'U' or 'F' using at least one time-domain pattern with configurable periodicity.

In the following, for brevity of description, SFI refers to a slot format indicator as example that is indicated using higher layer provided IEs such as slotFormatCombination or slotFormatCombinationsPerCell and which is indicated to the UE by group common DCI format such as DCI F2_0 where slotFormats are defined in REF3.

Throughout the present disclosure, the term "configuration" or "higher layer configuration" and variations thereof (such as "configured" and so on) are used to refer to one or more of: a system information signaling such as by a MIB or a SIB (such as SIB1), a common or cell-specific higher layer/RRC signaling, or a dedicated or UE-specific or BWP-specific higher layer/RRC signaling, or a pre-configuration based on other-the-air (OTA) signaling or using other implementation-based or offline methods, such as operation and management (OAM), and so on.

Throughout the present disclosure, the term signal quality is used to refer to e.g., RSRP or RSRQ or RSSI or SNR or SINR, with or without filtering such as L1 or L3 filtering, of a channel or a signal such as a reference signal (RS) including SSB, CSI-RS, or SRS.

The Synchronization Signal and PBCH block (SSB) consists of primary and secondary synchronization signals (PSS, SSS), each occupying 1 symbol and 127 subcarriers, and PBCH spanning across 3 OFDM symbols and 240 subcarriers, but on one symbol leaving an unused part in the middle for SSS. The possible time locations of SSBs within a half-frame are determined by sub-carrier spacing and the periodicity of the half-frames where SSBs are transmitted is configured by the network. During a half-frame, different SSBs may be transmitted in different spatial directions (i.e., using different beams, spanning the coverage area of a cell).

Within the frequency span of a carrier, multiple SSBs can be transmitted. The PCIs of SSBs transmitted in different frequency locations do not have to be unique, i.e., different SSBs in the frequency domain can have different PCIs. However, when an SSB is associated with an RMSI, the SSB is referred to as a Cell-Defining SSB (CD-SSB). A PCell is associated to a CD-SSB located on the synchronization raster.

Polar coding is used for PBCH. The UE may assume a band-specific sub-carrier spacing for the SSB unless a network has configured the UE to assume a different sub-carrier spacing. PBCH symbols carry its own frequency-multiplexed DMRS. QPSK modulation is used for PBCH.

An antenna port is defined such that the channel over which a symbol on the antenna port is conveyed can be inferred from the channel over which another symbol on the same antenna port is conveyed.

For DM-RS associated with a PDSCH, the channel over which a PDSCH symbol on one antenna port is conveyed can be inferred from the channel over which a DM-RS symbol on the same antenna port is conveyed only if the two symbols are within the same resource as the scheduled PDSCH, in the same slot, and in the same PRG.

For DM-RS associated with a PDCCH, the channel over which a PDCCH symbol on one antenna port is conveyed can be inferred from the channel over which a DM-RS symbol on the same antenna port is conveyed only if the two symbols are within resources for which the UE may assume the same precoding being used.

For DM-RS associated with a PBCH, the channel over which a PBCH symbol on one antenna port is conveyed can be inferred from the channel over which a DM-RS symbol on the same antenna port is conveyed only if the two symbols are within a SS/PBCH block transmitted within the same slot, and with the same block index.

Two antenna ports are said to be quasi co-located if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial Rx parameters.

The UE may assume that SS/PBCH blocks transmitted with the same block index on the same center frequency location are quasi co-located with respect to Doppler spread, Doppler shift, average gain, average delay, delay spread, and, when applicable, spatial Rx parameters. The UE shall not assume quasi co-location for any other SS/PBCH block transmissions.

In absence of CSI-RS configuration, and unless otherwise configured, the UE may assume PDSCH DM-RS and SS/PBCH block to be quasi co-located with respect to Doppler shift, Doppler spread, average delay, delay spread, and, when applicable, spatial Rx parameters. The UE may assume that the PDSCH DM-RS within the same CDM group are quasi co-located with respect to Doppler shift, Doppler spread, average delay, delay spread, and spatial Rx. The UE may also assume that DM-RS ports associated with a PDSCH are QCL with QCL Type A, Type D (when applicable) and average gain. The UE may further assume that no DM-RS collides with the SS/PBCH block.

A UE can be configured with a list of up to M TCI-State configurations within the higher layer parameter PDSCH-Config to decode PDSCH according to a detected PDCCH with DCI intended for the UE and the given serving cell, where M depends on the UE capability maxNumberConfiguredTCIstatesPerCC. Each TCI-State contains parameters for configuring a quasi co-location (QCL) relationship between one or two downlink reference signals and the DM-RS ports of the PDSCH, the DM-RS port of PDCCH or the CSI-RS port(s) of a CSI-RS resource. The quasi co-location relationship is configured by the higher layer parameter qcl-Type1 for the first DL RS, and qcl-Type2 for the second DL RS (if configured). For the case of two DL RSs, the QCL types shall not be the same, regardless of whether the references are to the same DL RS or different DL RSs. The quasi co-location types corresponding to each DL RS are given by the higher layer parameter qcl-Type in QCL-Info and may take one of the following values:
 'QCL-TypeA': {Doppler shift, Doppler spread, average delay, delay spread}
 'QCL-TypeB': {Doppler shift, Doppler spread}
 'QCL-TypeC': {Doppler shift, average delay}
 'QCL-TypeD': {Spatial Rx parameter}

The UE receives a MAC-CE activation command to map up to N, e.g., N=8 TCI states to the codepoints of the DCI field 'Transmission Configuration Indication'. When the HARQ-ACK information corresponding to the PDSCH carrying the (MAC-CE) activation command is transmitted in slot n, the indicated mapping between TCI states and codepoints of the DCI field 'Transmission Configuration Indication' should be applied after a MAC-CE application time, e.g., starting from the first slot that is after slot n+ $3N_{slot}^{subframe,\mu}$ where $N_{slot}^{subframe,\mu}$ is a number of slot per subframe for subcarrier spacing (SCS) configuration u.

NR supports a beam failure detection and recovery procedure. For beam failure detection, the gNB configures the UE with beam failure detection reference signals (SSB or CSI-RS) and the UE declares beam failure when the number of beam failure instance indications from the physical layer reaches a configured threshold before a configured timer expires.

SSB-based Beam Failure Detection is based on the SSB associated to the initial DL BWP and can only be configured for the initial DL BWPs and for DL BWPs containing the SSB associated to the initial DL BWP. For other DL BWPs, Beam Failure Detection can only be performed based on CSI-RS.

After beam failure is detected on the PCell, the UE:
 triggers beam failure recovery by initiating a Random Access procedure on the PCell;
 selects a suitable beam to perform beam failure recovery (if the gNB has provided dedicated Random Access resources for certain beams, those will be prioritized by the UE).
 includes an indication of a beam failure on PCell in a BFR MAC CE if the Random Access procedure involves contention-based random access.
Upon completion of the Random Access procedure, beam failure recovery for PCell is considered complete.

After beam failure is detected on an SCell, the UE:
 triggers beam failure recovery by initiating a transmission of a BFR MAC CE for this SCell;
 selects a suitable beam for this SCell (if available) and indicates it along with the information about the beam failure in the BFR MAC CE.
Upon reception of a PDCCH indicating an uplink grant for a new transmission for the HARQ process used for the transmission of the BFR MAC CE, beam failure recovery for this SCell is considered complete.

Integrated access and backhaul (IAB) enables wireless relaying in NG-RAN. The relaying node, referred to as IAB-node, supports access and backhauling via NR. The terminating node of NR backhauling on network side is referred to as the IAB-donor, which represents a gNB with additional functionality to support IAB. Backhauling can occur via a single or via multiple hops.

The IAB-node supports gNB-DU functionality to terminate the NR access interface to UEs and next-hop IAB-nodes, and to terminate the F1 protocol to the gNB-CU functionality on the IAB-donor. The gNB-DU functionality on the IAB-node is also referred to as IAB-DU.

In addition to the gNB-DU functionality, the IAB-node also supports a subset of the UE functionality referred to as IAB-MT, which includes, e.g., physical layer, layer-2, RRC and NAS functionality to connect to the gNB-DU of another IAB-node or the IAB-donor, to connect to the gNB-CU on the IAB-donor, and to the core network.

The IAB-node can access the network using either SA mode or EN-DC. In EN-DC, the IAB-node connects via E-UTRA to a MeNB, and the IAB-donor terminates X2-C as SgNB.

All IAB-nodes that are connected to an IAB-donor via one or multiple hops form a directed acyclic graph (DAG) topology with the IAB-donor as its root. In this DAG topology, the neighbor node of the IAB-DU or the IAB-donor-DU is referred to as child node and the neighbor node of the IAB-MT is referred to as parent node. The direction toward the child node is referred to as downstream while the direction toward the parent node is referred to as upstream. The IAB-donor performs centralized resource, topology and route management for the IAB topology.

F1-U and F1-C use an IP transport layer between IAB-DU and IAB-donor-CU. F1-U and F1-C need to be security-protected.

On the wireless backhaul, the IP layer is carried over the Backhaul Adaptation Protocol (BAP) sublayer, which enables routing over multiple hops. The IP layer can also be used for non-F1 traffic, such as OAM traffic.

On each backhaul link, the BAP PDUs are carried by BH RLC channels. Multiple BH RLC channels can be configured on each BH link to allow traffic prioritization and QoS enforcement. The BH-RLC-channel mapping for BAP PDUs is performed by the BAP entities on each IAB-node and the IAB-donor-DU.

The IAB-MT further establishes SRBs (carrying RRC and NAS) with the IAB-donor-CU. For IAB-nodes operating in EN-DC, the IAB-MT establishes one or more DRBs with the eNB and one or more DRBs with the IAB-donor-CU, which can be used, e.g., to carry OAM traffic. For SA mode, the establishment of DRBs is optional. These SRBs and DRBs are transported between the IAB-MT and its parent node over Uu access channel(s).

Coverage is a fundamental aspect of cellular network deployments. Cellular operators rely on different types of network nodes to offer blanket coverage in their deployments. Deployment of regular full-stack cells, e.g., cells served by a gNB type base stations usually based results in expensive implementation, high cost for equipment and backhaul connectivity. Their deployment is subjected to a variety of constraints such as expensive site leases. While this is the predominant deployment type encountered in practice, it is not always preferred cost-wise. As a result, other types of network nodes have been considered to increase cellular operators' economic flexibility for their network deployments.

For example, Integrated Access and Backhaul (IAB) was introduced in 5G NR Rel-16 and enhanced in Rel-17 as a new type of network node not requiring a wired backhaul. IAB nodes can be considered full-stack cells similar to gNBs. The IAB node is a new type of relay node building over the front-haul architecture and constituting a node with a dual role consisting of an IAB Distributed Unit (DU) component making it possible to appear as a regular cell to the UEs which it serves, and an IAB Mobile Terminal (MT) component inheriting many properties of a regular UE whereby the IAB node connects to its donor parent node(s) or a gNB. The IAB node is based on a Layer 2 architecture with end-to-end PDCP layer from the donor IAB node to the UE for Control Plane (CP) and User Plane (UP). IAB nodes can also be classified as re-generative relays. Every packet traversing the link between the donor node and the IAB-MT component of the IAB node, i.e., the backhaul-link, must be properly decoded and re-encoded by the IAB node for further transmission to the UE on the access link. The first version of IAB in Rel-16 NR assumes half duplex operation in TDM between access and backhaul links for transmission and reception by the IAB node but includes features for forward compatibility towards evolving IAB using full duplex operation. Rel-17 NR further enhances IAB operation with better support of full duplex implementations of IAB nodes.

Another type of network node is the RF repeater which amplifies-and-forwards any signal that it receives. RF repeaters have seen a wide range of deployments in 2G GSM/(E) GPRS, 3G WCDMA/HSPA and 4G LTE/LTE-A to supplement the coverage provided by regular full-stack cells. RF repeaters constitute the simplest and most cost-effective way to improve network coverage. The main advantages of RF repeaters are their low-cost, their ease of deployment and the fact that they do not much increase latency. The main disadvantage is that they amplify both desired signal(s) and (undesired) noise and hence, often contribute to an increase of interference levels observed at system level. Within RF repeaters, there are different categories depending on the power characteristics and the amount of spectrum that they are configured to amplify, e.g., single band, multi-band, etc. RF repeaters are considered non-regenerative type of relay nodes. RF repeaters are typically full-duplex nodes and they do not differentiate between UL and DL transmissions or receptions. LTE specifies RF repeater requirements in 36.106. Their use is limited to LTE FDD bands.

In Rel-17 NR, RF and EMC requirements in FR1 and FR2 for RF repeaters using NR were introduced. As NR often uses higher frequencies, e.g., 3-4 GHz in FR1 and above 24 GHz for FR2, propagation conditions are degraded when compared to lower frequencies in use by LTE. This exacerbates the coverage challenges for NR. More densification of cells becomes necessary. Massive MIMO operation in FR1, analog beamforming in FR2 and multi-beam operation with associated beam management in FR1 and FR2 are integral part of the NR design to cope with the challenging propagation conditions of these higher frequencies. Note that these NR frequency bands are TDD. In consequence, simultaneous or bi-directional amplify-and-forward as employed by traditional RF repeaters is not always necessary (unlike in the FDD LTE case) and can therefore be avoided. This much reduces the noise pollution problem of regular RF repeaters which amplify both (undesired) noise and desired signal(s). Beamformed transmissions and receptions to/from individual NR users are a fundamental feature and inherent to NR operation. However, the use of a simple RF repeater operating in the NR network implies that the prerequisite beamforming gains for NR operation to provide coverage are not available when relaying the NR transmissions and receptions. While a conventional RF repeater presents a very cost-effective means of extending network coverage, it has limitations when considering NR.

Therefore, a new type of network node, somewhere in-between RF repeaters and IAB nodes is a compelling proposition to try to leverage the main advantages of both. That new type of network node, i.e., a smart repeater (SR) or network-controlled (NETCON) repeater (NCR) can make use of some side control information (SCI) or NCR control information (NCI) to enable a more intelligent amplify-andforward operation in a system with TDD access and multi-beam operation. SCI allows a network-controlled or smart repeater to perform the amplify-and-forward operation in a more efficient manner. Potential benefits include mitigation of unnecessary noise amplification, transmissions and receptions with better spatial directivity, and much simplified network integration. In the control plane (C-plane), a SR may be provided or configured by the gNB with information on semi-static and/or dynamic downlink/uplink configuration, adaptive transmitter/receiver spatial beamforming, Tx ON/OFF status, etc. In the user plane (U-plane), the SR is still non-regenerative, e.g., it employs amplify-and-forward to relay the actual UE signals from/to the gNB. SCI transmission and requires only low capacity for the control backhaul between the donor cell(s), e.g., gNB and the SR. As a result, the low-complexity and low-cost properties of RF repeaters are mostly preserved while a degree of network configurability and control is enabled similar to eIAB nodes.

Figure 11:
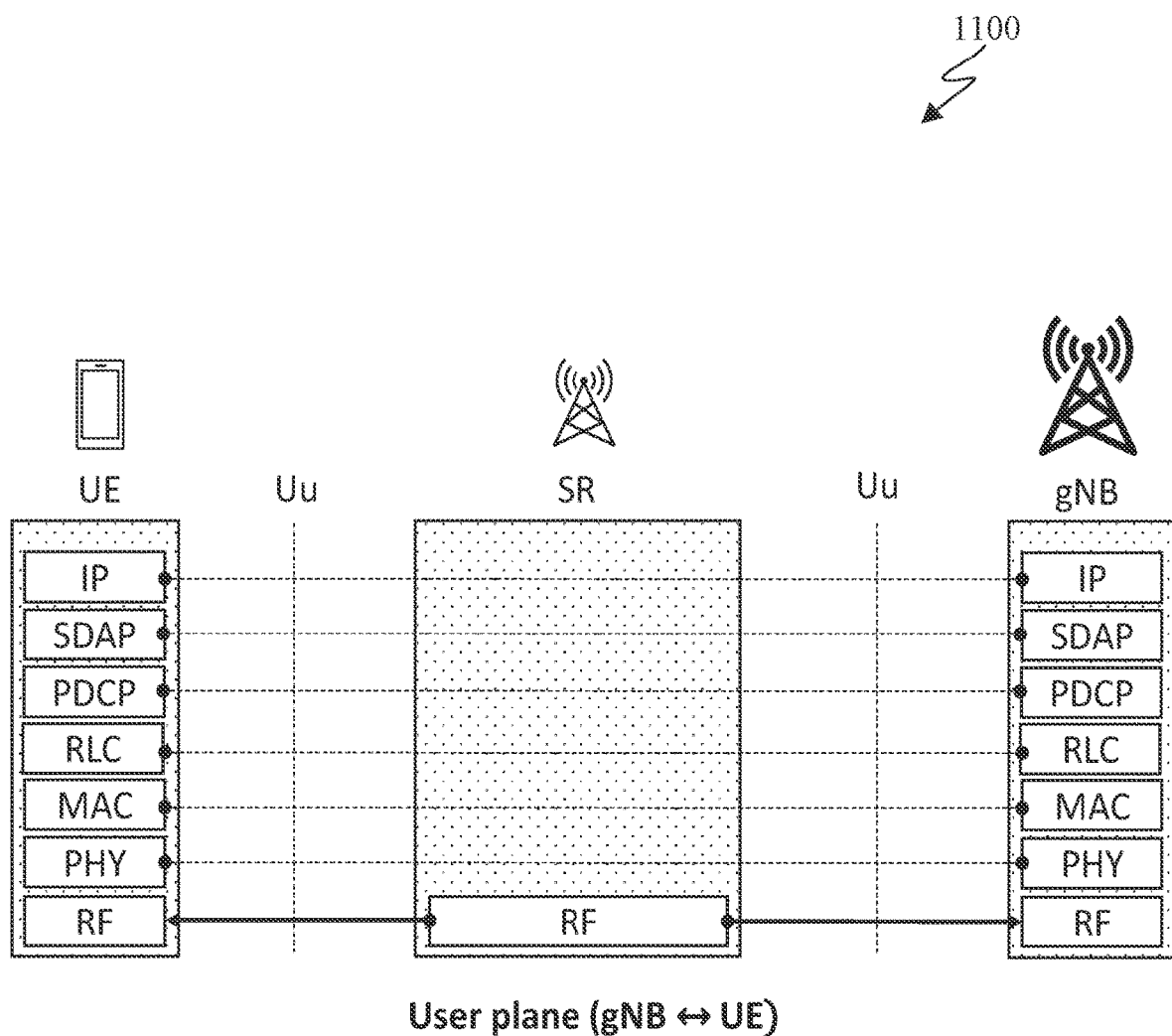
FIG. 11 illustrates an example user plane protocol architecture for smart repeater according to embodiments of the present disclosure.

FIG. 11 illustrates an example user plane protocol architecture for a smart repeater 1100 according to embodiments of the present disclosure. The embodiment of the user plane protocol architecture for the smart repeater 1100 illustrated in FIG. 11 is for illustration only. FIG. 11 does not limit the scope of this disclosure to any particular implementation of the user plane protocol architecture for the smart repeater 1100.

Figure 12:
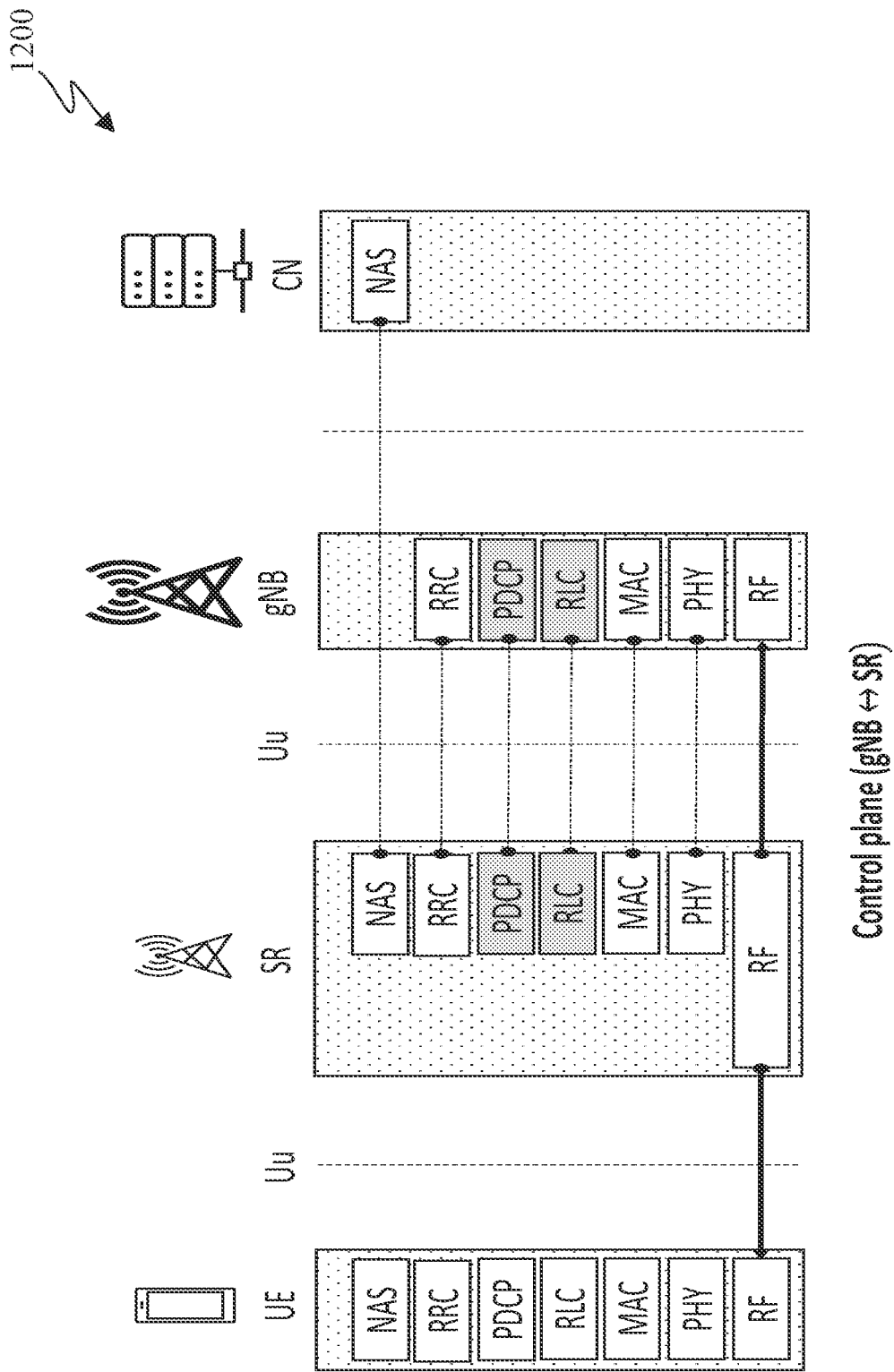
FIG. 12 illustrates an example control plane protocol architecture for smart repeater according to embodiments of the present disclosure.

FIG. 12 illustrates an example control plane protocol architecture for a smart repeater 1200 according to embodiments of the present disclosure. The embodiment of the control plane protocol architecture for the smart repeater 1200 illustrated in FIG. 12 is for illustration only. FIG. 12 does not limit the scope of this disclosure to any particular implementation of the control plane protocol architecture for the smart repeater 1200.

Figure 13:
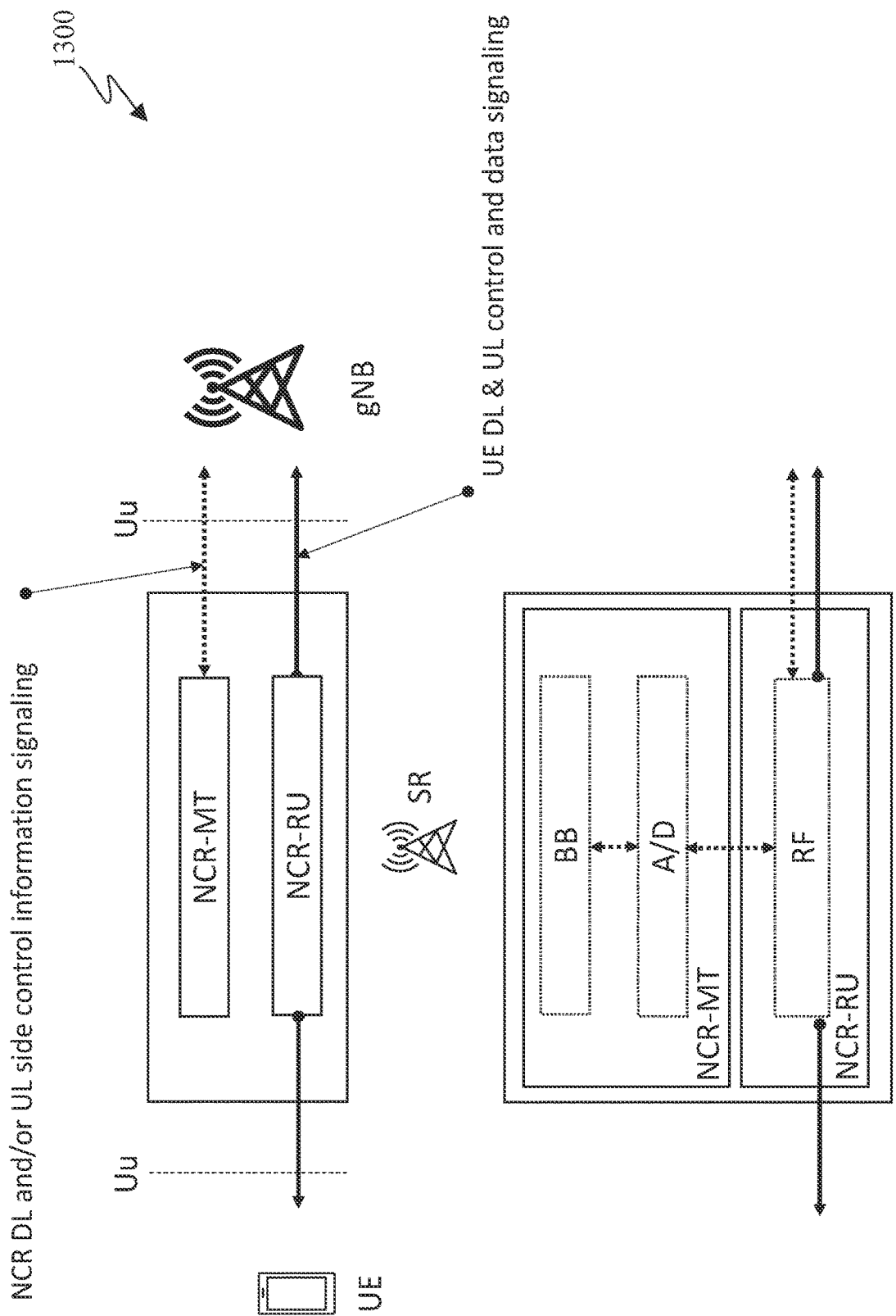
FIG. 13 illustrates an example functional architecture for smart repeater according to embodiments of the present disclosure.

FIG. 13 illustrates an example functional architecture for a smart repeater 1300 according to embodiments of the present disclosure. The embodiment of the functional architecture for the smart repeater 1300 illustrated in FIG. 13 is for illustration only. FIG. 13 does not limit the scope of this disclosure to any particular implementation of the functional architecture for the smart repeater 1300.

FIGS. 11-13 show an example for the functional and protocol architectures of a SR, such as may be implemented by the TRP 200. In the user plane (FIG. 11), the SR receives the incoming RF signal from the gNB, such as gNB 102, (or the UE, such as UE 116) at its ingress antenna port, then amplifies-and-forwards the RF signal to its egress antenna port to the UE (or gNB). Note that similar to an RF repeater, the amplified-and-forwarded signal traverses the RF path, e.g., is the signal is processed in analog domain. In the control plane (FIG. 12), e.g., when transmitting DL side control information (DL SCI) from the gNB to the SR, or when transmitting UL side control information (UL SCI) from the SR to the gNB, the signal processing by the SR differs. For transmission of DL SCI, the gNB can use one or a combination of signaling options. DL SCI can be transmitted in L1, e.g., by DCI or in any DL control channel, in L2 MAC, e.g., by MAC CE(s) or as part of any DL data channel, in L2 RRC, e.g., by RRC signaling messages and/or IEs. Without loss of generality and illustration purposes, it may be assumed that the SR converts part of the incoming (DL) RF signal from the gNB to digital domain to determine presence and further process the received signaling contents of DL SCI. For transmission of UL SCI to the gNB, it may be assumed that the SR receives the incoming RF signal from the UE at its ingress antenna port, then amplifies-and-forwards the RF signal while adding the UL SCI following its conversion from digital signaling processing to analog domain for transmission at the egress antenna port (FIG. 13). For transmission of UL SCI, the SR can use one or a combination of signaling options. UL SCI can be transmitted in L1, e.g., by an UL control or data channel, in L2 MAC, e.g., by MAC CE(s) or as part of any UL data channel, in L2 RRC, e.g., by RRC signaling messages and/or IEs. Note that the SR may also be configured or provisioned or receive or transmit signaling messages using non-access stratum (NAS) protocol messages, e.g., CM, SM, etc., and/or by O&M signaling. Furthermore, transmission and reception of DL and UL SCI may occur using in-band signaling, e.g., using the same frequency band/channel as the amplified-and-forwarded UE signal(s), or may occur using out-of-band signaling, e.g., SCI is transmitted and received using a different band, channel or frequency range than the amplified-and-forwarded UE signal(s).

Figure 14:
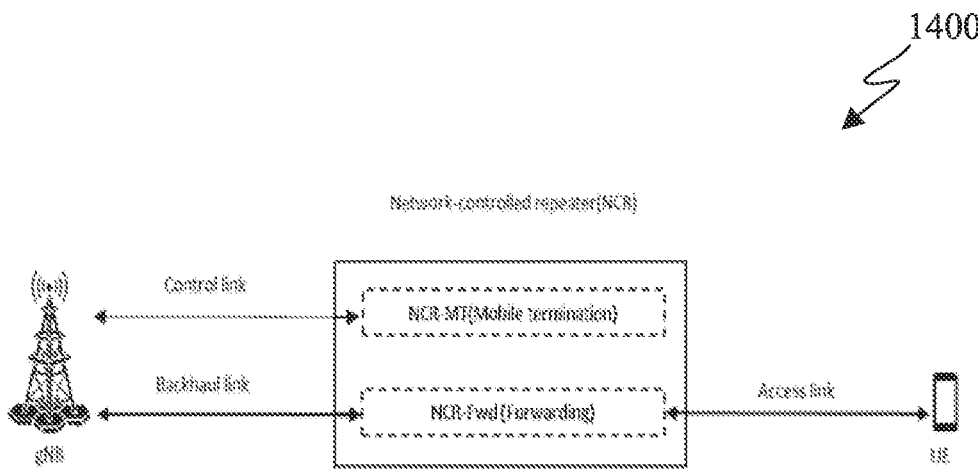
FIG. 14 illustrates an example of a conceptual model or a functional architecture of a network controlled repeater according to embodiments of the present disclosure.

FIG. 14 illustrates an example of a functional architecture of a smart repeater or network controlled repeater 1400 according to embodiments of the present disclosure. The embodiment of the functional architecture of a network controlled repeater 1400 illustrated in FIG. 14 is for illustration only. FIG. 14 does not limit the scope of this disclosure to any particular implementation of the functional architecture of a network controlled repeater 1400.

A network-controlled repeater is an enhancement over conventional RF repeaters with the capability to receive and process side control information from the network/gNB. Side control information could allow a network-controlled repeater to perform the amplify-and-forward operation in a more efficient manner. Potential benefits include mitigation of unnecessary noise amplification, transmissions and receptions with better spatial directivity, and simplified network integration.

As illustrated in FIG. 14, the NCR includes the NCR-MT and NCR-Fwd. The NCR-MT is defined as a functional entity to communicate with a gNB via a Control link (C-link) to enable exchange of control information (e.g., side control information at least for the control of NCR-Fwd). The C-link is based on NR Uu interface.

The NCR-Fwd is defined as a functional entity to perform the amplify-and-forwarding of UL/DL RF signal between gNB and UE via backhaul link and access link. The behaviour of the NCR-Fwd will be controlled according to the received side control information from gNB.

Throughout the present disclosure an NCR-MT is also referred to as SR-MT, an NCR-Fwd is also referred to as SR-RU or NCR-RU, an NCR backhaul link or an NCR control-link (C-link) is also referred to as NCR-to-gNB link, and the NCR access link is also referred to as NCR-to-UE(s) link.

In some realizations, at least one of the NCR-MT's carrier(s) operates in the frequency band forwarded by the NCR-Fwd. NCR-MT and NCR-Fwd operating in a same frequency band is used as reference for the descriptions in the disclosure. In general, an NCR-Fwd may operate with multiple passbands/carriers in same or different frequency band, and a corresponding NCR-MT may operate in one or more passbands/carriers from the multiple passbands/carriers for NCR-Fwd operation in one or more frequency bands. In one example, the NCR-MT may additionally or alternatively operate in carrier(s) outside the frequency bands in which NCR-Fwd operates. Herein, a passband can refer to a frequency range in which a repeater/NCR_Fwd operates in with operational configuration. Such frequency range can correspond to one or several consecutive nominal channels. When an operating frequency for an NCR-Fwd is not consecutive, each subset of channels may be considered as an individual passband. An NCR-Fwd can have one or several passbands.

In some realizations, same large-scale properties of the channel, i.e., channel properties in Type-A and Type-D (if applicable) QCL, can be experienced by C-link and backhaul link (at least when the NCR-MT and NCR-Fwd are operating in a same frequency band).

For the transmission/reception of C-link and backhaul link by NCR,

Signalling on the DL of C-link and DL of backhaul link can be performed simultaneously or in TDM way
Signalling on the UL of C-link and UL of backhaul link can be performed in TDM way.

The multiplexing can be under the control of gNB with consideration for NCR capability and simultaneous transmission of the UL of C-link and UL of backhaul link can be also subject to NCR capability.

The term 'beam' is used to refer to a spatial filter for transmission or reception of a signal or a channel. For example, a beam (of an antenna) can be a main lobe of the radiation pattern of an antenna array, or a sub-array or an antenna panel, or of multiple antenna arrays, sub-arrays or panels combined, that are used for such transmission or reception.

Various embodiments, methods, and examples described in the present disclosure can apply beyond NCR/smart repeaters nodes to other nodes with a repeater/relay-like functionality in a wireless network, such as reconfigurable intelligent surfaces (RIS), or to stationary or non-stationary repeater/relay-like nodes in the sky/sea or other not-on-the-ground situations, for example, satellites in non-terrestrial networks (NTN), or mobile repeaters on buses/trains/vessels/ships/aircrafts/drones, and so on.

Throughout the present disclosure, a gNB-to-NCR link is used to refer to one or both of an NCR control link (C-link) or an NCR backhaul link. Throughout the present disclosure, an NCR-to-UE link is used to refer to an NCR access link.

One embodiment includes establishing the identity and capabilities of the NCR. When an NCR node is deployed in a wireless communication system, the NCR needs to first establish its identity and capabilities for operation in the system. For example, the NCR needs to be identified and/or authenticated by the radio access network (RAN), including one or more gNB(s), or the Core Network (CN), using methods such as those discussed below. For example, the NCR needs to indicate capabilities of the corresponding NCR-MT and NCR-Fwd to the gNB using methods such as those discussed below.

One embodiment includes identification of the NetCon Repeater (NCR) by the gNB. An NCR-MT can indicate its identity as an NCR node (separate from UEs, IAB nodes, and so on) to the gNB using various steps of a random access procedure, such as by Msg1/A PRACH transmission, or by Msg2/B random access response, or by an indication in a Msg3/A PUSCH transmission, or using higher layers such as RRC messages, if applicable.

In one example, the gNB can provide a second PRACH configuration dedicated to NCR nodes, that is different from a first RPACH configuration provided for/applicable to other entities in the network, such as UEs, IAB nodes, and so on. The second PRACH configuration can include configuration of a second set of PRACH preambles, a second set of RACH occasions (ROs), and so on. When a gNB receives a Msg1/A PRACH based on the second PRACH configuration, such as a PRACH preamble from the second set of PRACH preambles, or in a RO from the second set of ROs, then the gNB can determine that the entity performing random access is an NCR node. In one example, the second PRACH configuration dedicated to NCR nodes can be provided by higher layer signaling such as a SIB1, or a SIB1 extension, or a new SIBx message, where x>1. The scheduling information for the new SIBx message can be provide by the SIB1 (extension).

In one example, NCR nodes can be provided information of a second initial DL/UL BWP that is different from the initial DL/UL BWP indicated by SIB1 for initial access of UEs. The second initial DL/UL BWP can be provided by higher layer signaling such as the SIB1, the SIB1 extension, or the new SIBx. For example, an NCR can perform transmission or reception in the second initial DL/UL BWP, for example for Msg1/A PRACH transmission, or for Msg2/B random access response (RAR) reception, or for Msg3/A PUSCH transmission, or for Msg4 PDCCH/PDSCH reception. Accordingly, the gNB can determine that the entity performing random access is an NCR node. In one example, the NCR can additionally or alternatively transmit or receive in the second initial DL/UL BWP after initial/random access, such as transmit of PUCCH/PUSCH or receive of PDCCH/PDSCH, such as for exchange of side control information between the NCR-MT and the gNB.

Figure 15:
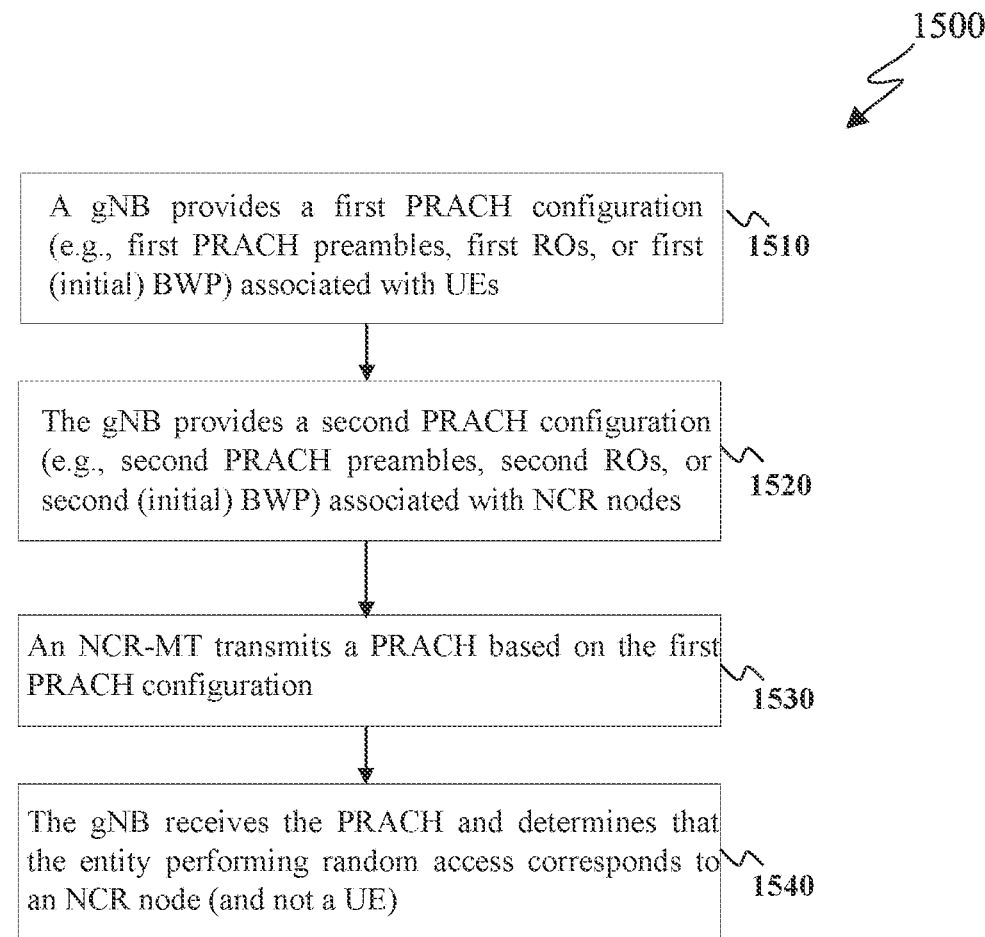
FIG. 15 illustrates an example flowchart for identification of an NCR by the gNB according to embodiments of the present disclosure.

FIG. 15 illustrates an example flowchart for identification of an NCR by the gNB 1500 according to embodiments of the present disclosure. The embodiment of the flowchart for identification of an NCR by the gNB 1500 illustrated in FIG. 15 is for illustration only. FIG. 15 does not limit the scope of this disclosure to any particular implementation of the flowchart for identification of an NCR by the gNB 1500.

As illustrated in FIG. 15, at step 1510, a gNB (such as the gNB 102) provides a first PRACH configuration (e.g., first PRACH preambles, first ROs, or first (initial) BWP) associated with UEs. At step 1520, the gNB provides a second PRACH configuration (e.g., second PRACH preambles, second ROs, or second (initial) BWP) associated with NCR nodes. At step 1530, an NCR-MT transmits a PRACH based on the first PRACH configuration. At step 1540, the gNB receives the PRACH and determines that the entity performing random access corresponds to an NCR node (and not a UE).

In one example, for an NCR that uses a first RACH configuration that is same as for UEs or uses a second PRACH configuration that is dedicated to NCR nodes, the NCR node can indicate an NCR identity (ID) in the Msg3/A PUSCH transmission. In one example, an NCR ID can be an ID associated with a subscriber identification module (SIM) card that is used for NCR operation. In one example, NCR nodes can be (pre-) configured with other dedicated IDs that are known to the RAN/gNB, and the NCR can indicate such ID in the Msg3/A PUSCH transmission. For example, the NCR can include a field or an information element (IE) corresponding to such ID in the Msg3/A PUSCH transmission to indicate that the entity performing the random access procedure is an NCR node. In another example, there can be pre-configuration or prior coordination (for example, between the Core Network and the RAN/gNB(s)) on a set of Contention Resolution IDs (CR-IDs) that are dedicated to NCR nodes. When an entity performing initial/random access includes a CR-ID from the set of CR-IDs dedicated to NCR nodes, the gNB can determine that the entity is an NCR.

Figures 16, 18:
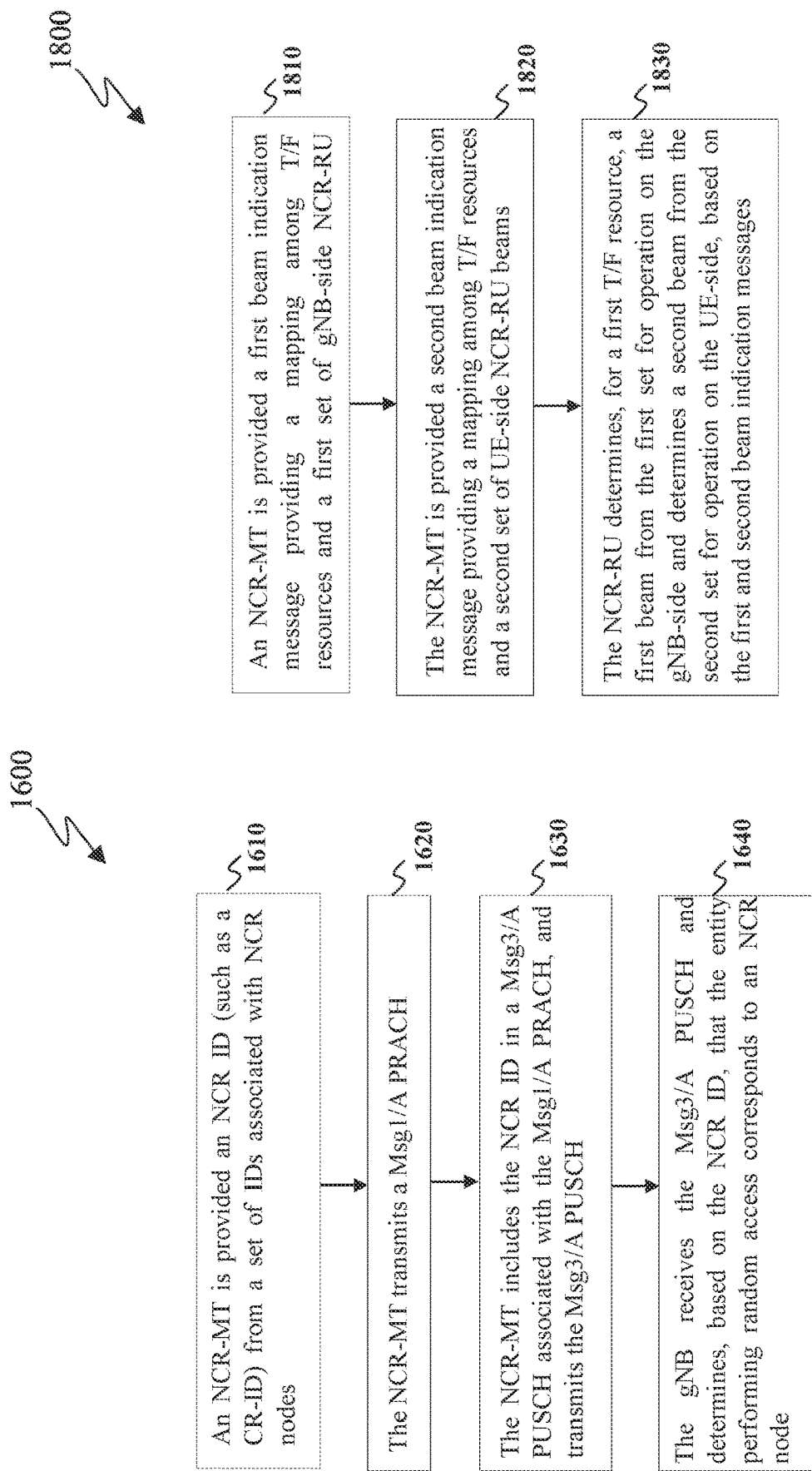
FIG. 16 illustrates an example flowchart for identification of an NCR by the gNB based on NCR identity that is included in a Msg3/A PUSCH according to embodiments of the present disclosure.
FIG. 18 illustrates an example flowchart for beam selection by the NCR-RU on the gNB-side and the UE-side of the NCR according to embodiments of the present disclosure.

FIG. 16 illustrates an example flowchart for identification of an NCR by the gNB based on NCR identity that is included in a Msg3/A PUSCH 1600 according to embodiments of the present disclosure. The embodiment of the flowchart for identification of an NCR by the gNB based on NCR identity that is included in a Msg3/A PUSCH 1600 illustrated in FIG. 16 is for illustration only. FIG. 16 does not limit the scope of this disclosure to any particular implementation of the flowchart for identification of an NCR by the gNB based on NCR identity that is included in a Msg3/A PUSCH 1600.

As illustrated in FIG. 16, at step 1610, an NCR-MT is provided an NCR ID (such as a CR-ID) from a set of IDs associated with NCR nodes. At step 1620, the NCR-MT transmits a Msg1/A PRACH. At step 1630, the NCR-MT includes the NCR ID in a Msg3/A PUSCH associated with the Msg1/A PRACH, and transmits the Msg3/A PUSCH. At step 1640, the gNB receives the Msg3/A PUSCH and determines, based on the NCR ID, that the entity performing random access corresponds to an NCR node (and not a UE).

In one example, when an architecture of an NCR-MT supports limited protocols compared to a UE, such as support only for physical (PHY) or medium access control (MAC) layers, the NCR-MT can perform initial/random access, for example for the purpose of establishing beam, timing, or identification, without establishing an RRC connection (over the air). In one example, the NCR does not support any RRC protocol procedures/signaling. In another example, the NCR supports a simplified RRC configuration, such as one with a limited set of IEs, that are provided to the NCR-MT using PHY or MAC signaling or using SIB messages. For example, the simplified RRC configuration can be based on cell-specific reference signals such as SSBs, without any NCR-specific reference signals such as CSI-RS or SRS. In yet another example, the NCR-MT is provided pre-configuration for higher layers, such as for RRC layer/protocol, or via OAM signaling for example via an OAM entity at the time of deployment, instead of establishing the RRC connection over the air.

In one example, an architecture for the NCR-MT includes a full protocol stack, including RRC configuration/signaling. In this case, once NCR-MT establishes an RRC connection/configuration, the NCR-MT can exchange RRC messages with the gNB for the purpose of identification.

One embodiment includes reporting NCR capability information to the gNB. An NCR-MT can report NCR capabilities to the gNB, wherein the NCR capabilities include those of the NCR-MT or those of the corresponding NCR-RU. For example, when an NCR is identified and authenticated by the gNB, the NCR-MT can receive a PDCCH that schedules a PUSCH, wherein the NCR-MT transmits the NCR capability information in the PUSCH. In one example, the NCR can indicate its capabilities within a Msg3/A PUSCH that is scheduled by a random access response (RAR) or by a DCI format 1_0 for a Msg3 PUSCH retransmission.

In the following, "beam" refers to a spatial transmission/reception filter that an entity such as an NCR-Fwd or NCR-MT or a UE can generate for corresponding transmissions/receptions.

In one example, the NCR capabilities include NCR-Fwd capabilities, such as the following:

A spatial coverage angle/area by the NCR-Fwd at least on the UE side of the NCR (also referred to as, the UE-side radio interface bearer or UE-side RIB, or UE-side connector, or the access link) that the NCR-Fwd can use for transmission or reception to/from the UE(s).

For example, the spatial coverage angle/area can be in terms of geographical points/locations/areas wherein a transmit-power profile/density of any spatial filter applied/operated by the NCR-Fwd is above a certain threshold. The threshold can be predetermined in the specifications of the system operation or can be provided by the gNB signaling such as by SIB1 or SIBx dedicated to NCR nodes or by NCR-specific RRC signaling.

For example, the spatial coverage angle can be in absolute units such as degrees or steradians.

A first number of antenna panels/arrays/sub-arrays or RF chains on the gNB side of the NCR (also referred to as, the base-station-side radio interface bearer or BS-side RIB, or BS-side connector, or alternatively gNB-side RIB/connector, or the backhaul link) that the NCR-RU can use for transmission or reception to/from the gNB.

In one example, the NCR-Fwd can generate only one beam at a time using each of the first number of antenna panels/RF chains;

In one example, the NCR-Fwd can simultaneously generate a first beam from a first antenna panel/RF chain and a second beam from a second antenna panel/RF chain, so the NCR-Fwd can generate N beams at a time using N antenna panels/RF chains.

In one example, instead of reference to physical entities such as antenna panels or RF chains, the NCR reports capability with respect to logical entities such as a supported number of simultaneous beams/spatial filters that the NCR can generate, or a supported number of antenna port groups, and so on.

A second number of antenna panels/arrays/sub-arrays or RF chains on the UE side of the NCR (also referred to as the UE-side radio interface bearer or UE-side RIB, or UE-side connector) that the NCR-Fwd can use for transmission or reception to/from the UE(s).

Similar notes as above (for gNB-side RIB/connector or backhaul link) apply to a number of beams generated at each time by UE-side antenna panels/RF chains of the NCR-Fwd (on access link)

A third number of distinct beams that an NCR-Fwd can generate using a BS-side or UE-side antenna panel/array/sub-array or RF chain.

The NCR-Fwd can generate the third number of distinct beams at different times, such as M different beams in M time instances.

A first beam is considered distinct from a second beam when the first and second beams have different beam directions/directivities, for example, targeting different spatial angles, and the first and second beams have sufficiently separate beam patterns, such as no overlap between the corresponding main lobes (as defined, for example, by 3 dB threshold of the power/energy profile of the spatial filter/beam) or an overlap less than a certain predetermined/preconfigured or configured threshold.

In one example, the NCR-MT can report one or multiple values for the third number of distinct beams for the NCR-RU, wherein each report includes a pair (M, W). Herein, W refers to a beam-width or beam-directivity parameter, such as a spatial angle corresponding to the main lobe of each beam. Therefore, M can correspond to a number of beams that the NCR-Fwd (on the UE-side or BS-side) can generate with a beam-width or beam-directivity indicated by the parameter W. Herein, the parameter W can take values from a list of attributes such as 'wide' or 'narrow', or can take values from a numerical set of spatial coverage angles (for example, in degrees or in steradians), or fractions of a reference spatial coverage angle. In one example, the reference spatial coverage can refer to a total spatial angle covered by the NCR, and the fractions can be from a predetermined or (pre-) configured set of fractions, such as {1,½, ¼, ⅛}, from the total spatial angle covered by the NCR. In one example, an attribute 'wide' can refer to a first fraction such as 1 or ½, and another attribute 'narrow' can refer to a second fraction such as ¼ or ⅛, of the total spatial angle covered by the NCR. For example, an NCR-MT can report (M, W)=(1, 'wide') and (M, W)=(4, 'narrow') implying that the NCR-RU can generate M=1 wide beam that covers the entire coverage area of the NCR, while the NCR-RU can generate M=4 narrow beams that collectively cover the entire coverage area of the NCR. In one example, there can be an association or rule between the paraments M and W, such as W=1/M, so indication of only one parameter, for example M, is sufficient. For example, the NCR-MT can report M={1,2,4}.

A fourth number of symbols or an absolute time duration for beam switching latency of the NCR-Fwd.
  For example, the number of symbols or slots can be with respect to the SCS configuration of the initial DL/UL BWP or active DL/UL BWP of the NCR-MT or with respect to a reference SCS, such as 30 kHz for FR1, 120 kHz for FR-2-1 and 480 kHz for FR-2-2, or can be with respect to an SCS explicitly provided by SIB1 or by a SIBx dedicated to NCR nodes.
  For example, the absolute time duration can be in units of milliseconds or nanoseconds.
  In one example, a beam switching latency can be from a time that the NCR-MT receives a command or side control information signaling from the gNB to the time that NCR-RU is ready/operational to receive/transmit with a new beam indicated by the gNB.
  In another example, a beam switching latency can be from a time that the NCR-Fwd stops receiving/transmitting using a previous/old beam until a time NCR-Fwd is ready/operational to receive/transmit with a new beam indicated by the gNB.
  For example, a beam switching latency can be based on a beam application time, such as a BeamAppTime_r17 timing per UE capability as described in TS 38.331 v17.1.0.

NCR capability can include other beam generation capabilities of the NCR-RU, such as beam pattern, beam sensitivity, beam directivity, and so on.

In one example, the NCR capabilities include NCR-MT capabilities, that can be based on or a simplification of UE capabilities or feature groups as captured in TR 38.822 v16.2.0.

One embodiment includes beam management (BM), beam failure recovery (BFR), and radio link monitoring/failure (RML/RLF) for the gNB-to-NCR link (also referred to as the NCR C-link and the NCR backhaul link). The NCR behavior for handling beam management (BM), beam failure recovery (BFR) also referred to as link recovery procedure, and radio link monitoring/failure (RLM/RLF) on the gNB-to-NCR link (that is, between the gNB and the gNB-side RIB/connector of the NCR-MT, also referred to as the NCR C-link) can be same as those for a UE in a UE-to-gNB communication in NR Rel-17, or can be a simplified version of such procedures, for example based on SSBs only. In addition, NCR-Fwd can use a same beam on the NCR backhaul link as the corresponding NCR-MT on the C-link, for example, when NCR-MT is provided only one beam for the C-link, or NCR-Fwd can be provided a (separate) indication of beam index(es) to use on the backhaul link, for example, when NCR-MT is provided multiple beams for the NCR C-link. In one realization, a first set of beams/spatial filters or reference signals for NCR-Fwd on the backhaul link is same as a second set of beams/spatial filters or reference signals for NCR-MT on the C-link. For example, an NCR-Fwd beam for backhaul link can be a predetermined or reference beam or a (pre-) configured or indicated beam from the first set of configured/indicated beams for NCR-MT on the C-link. In another realization, the first and second sets of beams/spatial filters or reference signals can be different (such as when the second set is a subset of the first set), and the NCR can be provided information of the second set by gNB signaling, such as pre-configuration or higher layer configuration.

In a first realization, the NCR-MT procedures for BM/BFR/RLM/RLF for the gNB-to-NCR link (namely, the C-link) can be same as corresponding procedures for a UE in a UE-to-gNB communication over the Uu interface, for example based on procedures considered in TS 38.213 v17.1.0 and TS 38.214 v17.1.0. Such methods can be beneficial, for example, when NCR-MT supports a full protocol stack, such as MAC and RRC layers. For example, an NCR-MT can be provided SSB(s) or CSI-RS(s) to perform the BM/BFR/RLM/RLF procedures. For example, CSI-RS(s) can be NCR-specific. For example, NCR-MT can be provided higher layer configuration for counters and timers associated with BM/BFR/RLM/RLF procedures. For example, the NCR-MT can be provided higher layer configuration for cell/beam/CSI measurements and resources for PUCCH/PUSCH transmissions for reporting such measurements. For example, NCR-MT can be provided a higher layer configuration, or corresponding L1/L2 indication(s) by DCI format(s) or MAC-CE(s), for spatial relations or TCI states for reception of PDCCH/PDSCH or for transmission of PUSCH/PUSCH/SRS and so on. In one example, same or similar methods can apply for NCR-Fwd on backhaul link. For example, when NCR-MT updates parameters, such as updated reference signals or spatial filters for the described procedures, the NCR-Fwd applies the updated parameters, such as the updated reference signals or spatial filters, for operation on the backhaul link.

In a second realization, the NCR-MT procedures for BM/BFR/RLM/RLF for the gNB-to-NCR link (namely, the C-link) can be a simplified version of corresponding procedures for a UE in a UE-to-gNB communication over the Uu interface, for example a simplified version of procedures considered in TS 38.213 v17.1.0 and TS 38.214 v17.1.0. Such methods can be beneficial, for example, when NCR-MT supports a limited protocol stack, such as PHY or MAC only, and does not support a protocol stack for higher layers such as RRC. For example, NCR-MT can be provided only SSB(s), but not CSI-RS(s), to perform the BM/BFR/RLM/RLF procedures for the C-link or backhaul link. For example, periodic the NCR-MT can be provided CSI-RS may, such as cell-specific non-zero-power (NZP) CSI-RS, and not provided semi-persistent or aperiodic CSI-RS. For example, the NCR-MT can be provided only aperiodic CSI-RS and not provided semi-persistent or periodic CSI-RS for the C-link or backhaul link. For example, a full configuration for BM/BFR/RLM/RLF procedure may not be provided to the NCR-MT. For example, only some parameters and information elements (IEs) for a BM/BFR/RLM/RLF procedure can be provided by a SIB1 or a SIB1 extension or by a SIBx (x>1) dedicated to NCR nodes, and some other parameters and IEs for those procedures may not be provided. For example, only periodic cell/beam/CSI reporting may be supported for NCR, and semi-persistent or aperiodic cell/beam/CSI reporting may not be supported. For example, only aperiodic cell/beam/CSI reporting may be supported for NCR, and semi-persistent or periodic cell/beam/CSI reporting may not be supported for the C-link or backhaul link. For example, periodic SRS may be supported for NCR, and semi-persistent or aperiodic SRS may not be supported for the NCR. For example, aperiodic SRS may be supported for NCR, and semi-persistent or periodic SRS may not be supported for the NCR on the C-link or the backhaul link. For example, certain MIMO operations such as spatial multiplexing may not be supported for the NCR. For example, only single-rank PDSCH/PUSCH may be supported, and PDSCH/PUSCH with rank>1 may not be supported for NCR-MT. For example, when side control information is provided by PDSCH to NCR, only a DCI format 1_0 may be provided, while DCI format 1_1 or DCI formats 1_2, as described in TS 38.212 v 17.2.0, may not be supported for the NCR. For example, the NCR may support only a PRACH-based BFR procedure and may not support a PUCCH-based BFR procedure. In one example, similar methods can be applied to NCR-Fwd on backhaul link. For example, when NCR-MT updates parameters, such as updated reference signals or spatial filters for the described procedures, the NCR-Fwd applies the updated parameters, such as the updated reference signals or spatial filters, for operation on the backhaul link.

According to the first or second realization, PDCCH/PDSCH from gNB to the NCR can correspond to reception by NCR-MT of (side) control information from gNB for:
  reception of communication from gNB to UE(s) served though the NCR that the NCR-Fwd is to receive from gNB, amplify-and-forward, and transmit to the corresponding UE(s), or.
  transmission of communication from such UE(s) to the gNB, that the NCR-Fwd is to receive from the UE(s), amplify-and-forward, and transmit to the gNB, or
  operation of NCR itself, such as for BM/BFR/RLM/RLF procedures for NCR-MT.

Similar, PUSCH/PUCCH from the NCR-MT to the gNB can correspond to transmission by NCR-MT of NCR measurement reports or assistance information to the gNB for:
  configuration or scheduling of UE(s) served though the NCR, or
  operation of NCR itself, such as for BM/BFR/RLM/RLF procedures for NCR-MT.

In one realization, when NCR-MT is provided only one beam/spatial filter for the gNB-to-NCR link, NCR-RU uses a same beam/spatial filter for reception from gNB or transmission to gNB of the UE-with-gNB communication that is AF by the NCR for UE(s) served through the NCR. Such scenario may be referred to as a C-link or backhaul link with fixed beam.

In another realization, when NCR-MT is provided multiple beams/spatial filters for the gNB-to-NCR link, gNB provides indication of which beam to use by the NCR-Fwd for communication on the gNB-to-NCR link (also referred to as the backhaul link). Such scenario may be referred to as a C-link or backhaul link with adaptive or configurable beam.

In one example, NCR-Fwd on the backhaul link follows a same beam as that for NCR-MT (in a most recent communication with the gNB on the C-link). For example, when NCR-MT is indicated a first beam for communication with the gNB on the C-link, NCR-Fwd uses the first beam for transmission/reception on the gNB-to-NCR link (the backhaul link) until NCR-MT is indicated a second beam for communication with the gNB on the C-link, at which point the NCR-Fwd uses the second beam for transmission/reception on the gNB-to-NCR link (the backhaul link). In another example, NCR-Fwd on the backhaul link uses a predetermined/reference beam, from a set of beams configured for NCR-MT on the C-link, wherein the predetermined/reference beam can be same as or different from a most recent beam used by NCR-MT on the C-link.

Figure 17:
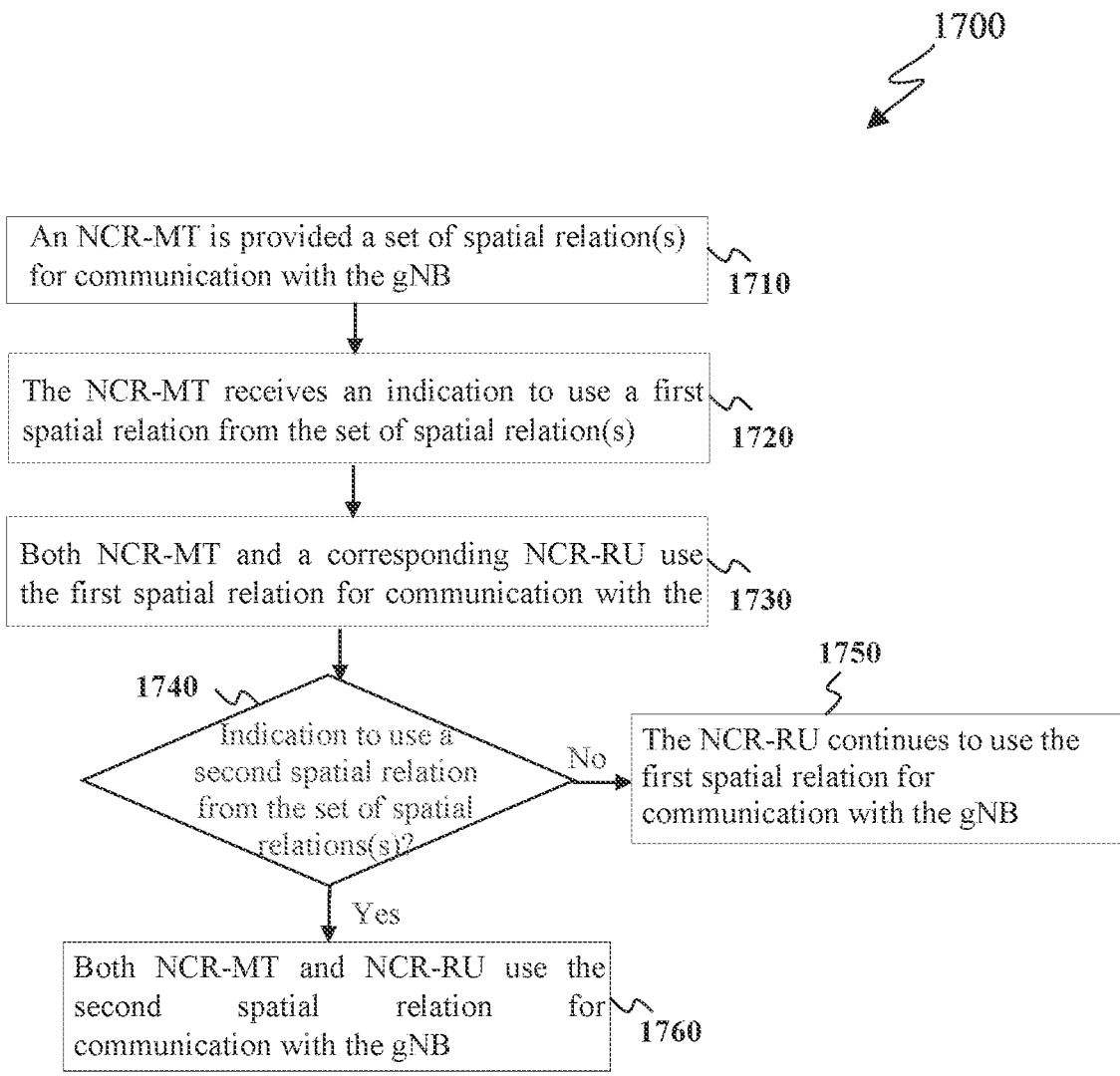
FIG. 17 illustrates an example flowchart for beam selection for NCR-Fwd on the gNB-to-NCR link according to embodiments of the present disclosure.

FIG. 17 illustrates an example flowchart for beam selection for NCR-Fwd on the gNB-to-NCR link 1700 according to embodiments of the present disclosure. The embodiment of the flowchart for beam selection for NCR-Fwd on the gNB-to-NCR link 1700 illustrated in FIG. 17 is for illustration only. FIG. 17 does not limit the scope of this disclosure to any particular implementation of the flowchart for beam selection for NCR-Fwd on the gNB-to-NCR link 1700.

As illustrated in FIG. 17, at step 1710, an NCR-MT is provided a set of spatial relation(s) for communication with the gNB. At step 1720, the NCR-MT receives an indication to use a first spatial relation from the set of spatial relation(s) on the C-link. At step 1730, both NCR-MT and a corresponding NCR-Fwd use the first spatial relation for communication with the gNB on the C-link and the backhaul link, respectively. At step 1740, the NCR-MT determines whether the NCR has received an indication to use a second spatial relation from the set of spatial relations(s). When the NCR-MT has not received such indication, then at step 1750 the NCR-Fwd continues to use the first spatial relation for communication with the gNB on the backhaul link. When the NCR-MT receives such new/second indication, then at step 1760 both NCR-MT and NCR-RU use the second spatial relation for communication with the gNB on the C-link and the backhaul link, respectively.

In another example, the NCR-MT can be provided a separate indication that provides a third beam index from the multiple beams on the gNB-to-NCR link (C-link), and NCR-Fwd uses the third beam for transmission/reception on the gNB-to-NCR link (backhaul link) until the NCR-Fwd is provided a new indication. For example, the third beam index for the backhaul link can be same or different from the first or second beam index that is indicated for communication of NCR-MT with the gNB on the C-link.

In yet another example, NCR-MT is provided a first 'beam indication message' for the gNB-side RIB/connector of NCR-RU beam selection (that is, for beam selection for the C-link or backhaul link) that includes a mapping from T/F resources to a set of multiple beams/spatial filters for the gNB-to-NCR link (C-link or backhaul link). A structure for the first beam indication message can be same/similar to that of a second beam indication message for the UE-side RIB/connector of NCR-RU beam selection, as described herein. Therefore, the NCR-Fwd is to use a first beam for a first T/F resource, and a second beam for a second T/F resource.

In one example, the first beam indication message includes only one beam from the multiple beams for each time resource, such as each symbol/slot. For example, the NCR-Fwd uses a first indicated beam for a first symbol/slot in all corresponding RBs (such as all RBs within a pass band of the NCR-Fwd) or in an indicated set of RBs for the first symbol/slot, while the NCR-Fwd performs no transmission/reception in remaining RBs for the first symbol/slot.

In one example, when an NCR-MT is provided multiple beams/spatial filters for the gNB-to-NCR link, there can be a mapping between the first beam indication message for the gNB-side RIB/connector of NCR-Fwd beam selection (i.e., a beam for the backhaul link) and the second beam indication message for the UE-side RIB/connector of NCR-Fwd beam selection (i.e., a beam for the access link). For example, the UE can be provided a joint beam indication message that maps an 'incoming' beam of the NCR-Fwd to an 'outgoing' beam of the NCR-Fwd, such as mapping a first beam on the gNB-side RIB/connector of NCR-RU (or backhaul beam) to a second beam on the UE-side RIB/connector of NCR-RU (or access beam). For example, the interpretation of incoming and outgoing beams can be based on, for example, the TDD configuration provided to the NCR. For example, the joint beam indication message can be based on T/F resources. For example, the joint beam indication message can indicate that the NCR-Fwd is to use a first beam on the gNB-side of NCR-Fwd (i.e., the backhaul link) and a second beam on the UE-side of NCR-RU (i.e., the access link) for a first T/F resource, while the NCR-RU is to use the first beam (or a fourth beam) on the gNB-side of NCR-Fwd (i.e., the backhaul link) and a third beam on the UE-side of NCR-Fwd (i.e., the access link) for a second T/F resource, wherein the second and third beams are different (and the first and fourth beams are different).

FIG. 18 illustrates an example flowchart for beam selection by the NCR-RU on the gNB-side and the UE-side of the NCR 1800 according to embodiments of the present disclosure. The embodiment of the flowchart for beam selection by the NCR-RU on the gNB-side and the UE-side of the NCR 1800 illustrated in FIG. 18 is for illustration only. FIG. 18 does not limit the scope of this disclosure to any particular implementation of the flowchart for beam selection by the NCR-RU on the gNB-side and the UE-side of the NCR 1800.

As illustrated in FIG. 18, at step 1810, an NCR-MT is provided a first beam indication message providing a mapping among T/F resources and a first set of gNB-side NCR-RU beams (i.e., the backhaul link). At step 1820, the NCR-MT is provided a second beam indication message providing a mapping among T/F resources and a second set of UE-side NCR-RU beams (i.e., access beams). At step 1830, the NCR-RU determines, for a first T/F resource, a first beam from the first set for operation on the gNB-side and determines a second beam from the second set for operation on the UE-side, based on the first and second beam indication messages.

In one example, methods and examples described above can be extended to the scenario considered in one or more embodiments described herein, wherein the NCR-MT determines that the corresponding NCR-Fwd is able to receive or transmit from the gNB on the backhaul link on multiple beams (such as multiple SSB indexes) that can be different/separate from the one or more beam(s) that is provided/configured for NCR-MT operation on the C-link. For example, the above methods and examples can be applied to the set of multiple beams for gNB-side NCR-Fwd (namely, the backhaul link), or can be applied to a union of the one or more beam(s) for NCR-MT on the C-link and the set of multiple beams for gNB-side NCR-Fwd (namely, the backhaul link).

In one example, an NCR-MT is provided information of a first set of spatial filters/beams or reference signals for C-link. For example, a corresponding NCR-Fwd can operate on the backhaul link with a same set of spatial filters/beams as the first set. For example, the NCR-Fwd can operate with a second set of spatial filters/beams or reference signals for the backhaul link, which is different from the first set. For example, the NCR-MT can be provided information of the second set of spatial filters/beams or reference signals for NCR-Fwd operation. Such distinction between the first and second set of beams/spatial filters can be beneficial, for example, when the gNB determines certain beams, such as the first set of beams/spatial filters or reference signals for stable and reliable communication with the NCR-MT on the C-link, and the gNB determines additional beams, such as those in the second set of beams/spatial filters or reference signals, to be beneficial for coverage of UEs that are being served through the NCR-Fwd. Herein, spatial filters/beams can be based on DL/UL/joint TCI states or QCL relationships or spatial relations configured to NCR-MT for the C-link. For example, spatial filters/beams can be based spatial transmission or reception beams that NCR-MT uses for corresponding reference signals such as SSBs, or CSI-RSs, or SRSs. For example, a first set of spatial filters can include wide SSB beams for reliable communication with NCR-MT on the C-link, and a second set of spatial filters on the backhaul link can include narrow CSI-RS beams for increased coverage of UEs being served by NCR-Fwd on the corresponding access link.

One embodiment includes exchange of information between the NCR-MT and the gNB regarding reference signals operated for amplify-and-forward (AF) by the NCR-Fwd. An NCR-MT can report to the gNB a set of reference signals, such as SSB(s), that are operated by the NCR-Fwd, for example, for performing amplify-and-forward (AF) operation towards the gNB or towards UE(s) that are in the coverage area of the NCR. For example, the NCR-MT determines (or, is provided) time/frequency resources configured for reference signals, at least including cell-specific RSs such as SSB(s). Accordingly, NCR-MT determines and reports a set of RSs that NCR-Fwd is able to receive/transmit for AF operation. Alternatively, the NCR can be provided information of a second set of beams/spatial filters or reference signals such as SSBs for NCR-Fwd operation on the backhaul link (that is, for amplify and forward operation) that can be different from a first set of beams/spatial filters or reference signals such as SSBs for NCR-MT operation on the C-link. The NCR can be provided such information by gNB signaling, such as pre-configuration or higher layer configuration.

For example, the NCR determines that NCR-Fwd is able to receive a set of SSB indexes, such as SSB indexes {4, 5, 6}, from a number of configured SSB indexes, such as SSB indexes 0 through 7. In one example, the set of SSB indexes operated by NCR-RU can be same as or different from a second set of SSB indexes that NCR-MT uses for initial/random access or for transmission/reception to/from the gNB. For example, NCR-MT is operating with SSB index #5, and is not using SSB indexes {4, 6}.

In one example, any RS(s) used by NCR-MT for initial/random access or for transmission/reception to the gNB is already known to the gNB and need not be reported. For example, NCR-MT does not report SSB index #5 among the RS(s) operated by the NCR-RU, as it is automatically considered to be used by NCR-Fwd. Therefore, NCR-MT only reports those RS(s) that are AF by the NCR-RU, but not used by NCR-MT, for example SSB indexes {4, 6}.

In one example, NCR-MT can determine configuration information of cell-specific RS(s) such as SSB(s) from reception and decoding a SIB1, an extended SIB1, or a SIBx (x>1) that is dedicated to NCR nodes. Therefore, no new signaling is needed for NCR-MT. Same can apply to RS(s) that are NCR-specific and correspond to the NCR-MT. In another example, information of candidate RS(s) are provided to the NCR-MT using L1/L2 signaling or using (pre-) configuration. For example, when RS(s) correspond to UE-specific RS(s) for UE(s) that are in coverage area of the NCR-RU (or possibly for time-varying NCR-specific RS(s)), the NCR-MT is provided configuration information of the RS(s) via L1/L2 signaling.

Herein, configuration information refers, for example, to time/frequency resources of the RS(s) along with other information that is needed for detection of the RS(s), such as initialization parameter(s) for sequence generation/detection, or quasi co-location (QCL) relationship/assumption information, and so on.

Figures 19, 20:
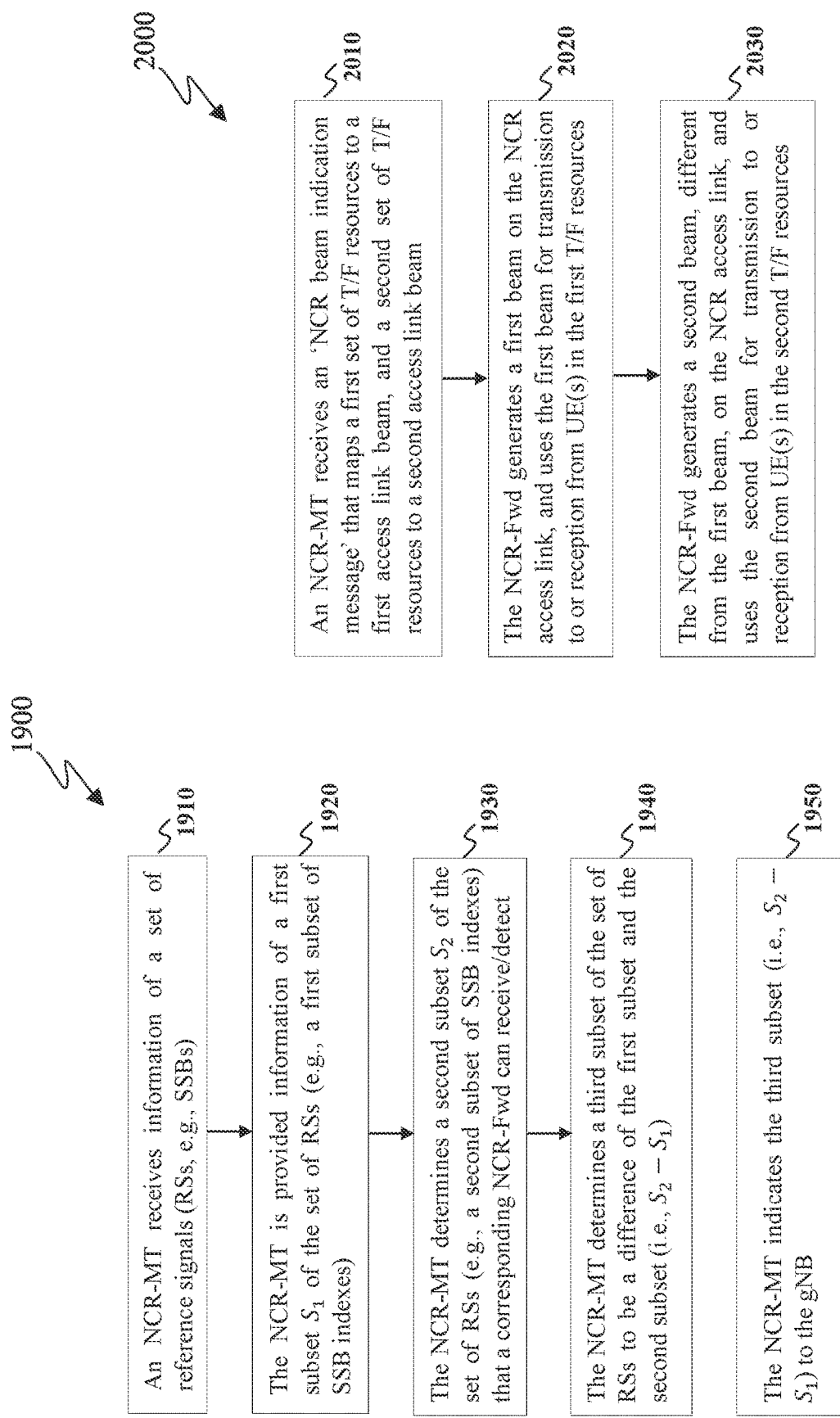
FIG. 19 illustrates an example flowchart for exchange of RSs (such as SSB indexes) that the NCR-RU can receive/detect according to embodiments of the present disclosure.
FIG. 20 illustrates an example flowchart for NCR-RU beam selection based on a beam indication message according to embodiments of the present disclosure.

FIG. 19 illustrates an example flowchart for exchange of RSs (such as SSB indexes) that the NCR-RU can receive/detect 1900 according to embodiments of the present disclosure. The embodiment of the flowchart for exchange of RSs (such as SSB indexes) that the NCR-RU can receive/detect 1900 illustrated in FIG. 19 is for illustration only. FIG. 19 does not limit the scope of this disclosure to any particular implementation of the flowchart for exchange of RSs (such as SSB indexes) that the NCR-RU can receive/detect 1900.

As illustrated in FIG. 19, at step 1910, an NCR-MT receives information of a set of reference signals (RSs, e.g., SSBs). At step 1920, the NCR-MT is provided information of a first subset $S_1$ of the set of RSs (e.g., a first subset of SSB indexes). At step 1930, the NCR-MT determines a second subset $S_2$ of the set of RSs (e.g., a second subset of SSB indexes) that a corresponding NCR-RU can receive/detect. At step 1940, the NCR-MT determines a third subset of the set of RSs to be a difference of the first subset and the second subset (i.e., $S_2-S_1$). At step 1950, the NCR-MT indicates the third subset (i.e., $S_2-S_1$) to the gNB.

One embodiment includes beam indication and beam management for the NCR-to-UE link (also referred to as the NCR access link): Exchange of information between NCR-MT and gNB about beam selection for/by the NCR-Fwd on the access link. The NCR-MT can be provided by the gNB information about selection of beams by the NCR-Fwd for the NCR-to-UE link (also referred to as the NCR access link) for UE(s) that are served through the NCR. Such beams can be used by the NCR-Fwd, for example, when performing amplify-and-forward (AF) for transmissions from the gNB to the UE(s) served through the NCR, or for receptions from such UE(s) to the gNB.

In a first approach, the gNB applies an indication mechanism for NCR-Fwd beam selection that is agnostic to different signals or channels, or downlink or uplink, and so on. According to this approach, an NCR-Fwd beam is associated with a respective time/frequency resource regardless of the presence of, for example, any SSB(s) or CSI-RS(s) and so on. The first approach is described further herein.

In a second approach, the gNB applies a two-stage beam indication mechanism for NCR that distinguishes between signals and channels. Accordingly, the NCR is first provided beam indication for transmission/AF of reference signals (RSs), such as SSB(s), to the UE(s) served thorough the NCR, or the NCR-Fwd determines reference beams for such reference signals, such as SSB(s), indicated by the gNB and then the NCR is provided beam indication for other time/frequency resources (for example, corresponding to UEs' data/control channels in a transparent manner) based on/with respect to reference beams established for such RS(s). The second approach is described further herein.

In the second approach to beam indication for NCR-RU for the NCR-to-UE link (namely, the access link), in a first stage, the gNB indicates to the NCR-MT a set of reference UE-side NCR beams for a first set of time/frequency (T/F) resources or signals/channels or the NCR-Fwd determines reference beams for a first set of time/frequency (T/F) resources or signals/channels indicated by the gNB, and in a second stage, the gNB provides an indication for association of target beams corresponding to a second set of T/F resources or signals/channels with the set of reference beams. In one realization, the first set includes a first set of reference signals (RSS), such as SSBs or CSI-RSs, for which the reference beams are indicated to the NCR or determined by the NCR, and then beams for other T/F resources corresponding to other signals or channels are indicated based on the reference beams for the first set of RSs/SSBs/CSI-RSs. The NCR-Fwd generates separate or non-overlapping beams for the first set of RSs. The NCR-RU uses a same beam for a target T/F resource as an indicated reference beam for an RS from the first set of RSs.

Regardless of using the first approach or the second approach (or any other approach) for indication of NCR-Fwd beams on the NCR access link, various methods can be used for association among beam indexes provided by the gNB with different spatial filters/beam patterns that the NCR-Fwd can generate on the access link. Such methods are described further herein.

The gNB provides the beam indication for NCR-Fwd beam selection to a corresponding NCR-MT using a 'beam indication message' which is one of various side control information messages exchanged between gNB and the NCR for controlling the NCR operation by the gNB. The beam indication message can be provided by L1/L2 signaling such as by a MAC-CE or a DCI format. The beam indication message provides a mapping from time-frequency (T/F) resources to a set of NCR-Fwd beams, wherein the mapping can be based on the first approach or the second approach described above (or any other approach). For example, the T/F resource can be generic without reference to any particular signal or channel (for example, when considered in the first approach above) or can correspond to an RS such as SSB or data/control channel such as PDCCH for system information or paging that the NCR is aware of its presence (for example, when considered in the second approach). Various aspects about the structure of the beam indication message, including methods for indication of T/F resources, are described further herein.

Once NCR beam indication for the access link is coordinated between NCR and gNB, the gNB configures, for UEs served by the NCR, all spatial relations, QCL assumptions, TCIs states, and so on, based on such coordinated beam indication and association. Therefore, UE procedures such as BM/BFR/CSI/RLM/RLF can continue to operate per existing methods in NR Rel-17, such as those in TS 38.213 v17.0.0 and TS 38.214 v17.0.0, and NCR operation remains transparent to the UE.

One embodiment includes a first approach to beam indication for the access link: Association of NCR beams with T/F resources, with NCR transparency to signals/channels. In the first approach to beam indication for NCR on the access link, the gNB provides the NCR-MT a mapping from time/frequency resources to a set of UE-side NCR-Fwd spatial filters (namely, NCR spatial filters for the access link), without indicating whether the time/frequency (T/F) resources correspond to signals or channel, downlink or uplink, and so on. The mapping includes a list of T/F resource indexes along with associated beam indexes/indications. The NCR-Fwd generates a first beam for a first set of T/F resources and generates a second beam, separate from the first beam, for a second set of T/F resources.

The mapping includes a number of entries for the beam indication, based on a reported NCR-Fwd capability for generating separate beams at the UE-side RIB/connector, as described herein. For example, when an NCR reports a capability for generating 4 beams by the NCR-Fwd, the mapping can include entries {1, 2, 3, 4} corresponding to separate spatial filters #1, #2, #3, and #4, respectively. Accordingly, the mapping includes entry 1 associated with spatial filter #1 for a first number of T/F resources, entry 2 associated with spatial filter #2 for a second number of T/F resources, and so on. For example, the NCR-Fwd is expected to use a same (first) beam for all the first number of T/F resources that are associated with the entry 1 in the beam indication mapping. Similar, the NCR-RU is expected to use a same (second) beam, different from the first beam, for all the second number of T/F resources that are associated with the entry 2 in the beam indication mapping, and so on. In one example, a number of access beams provided by the mapping for access link beams can be smaller than a number of NCR-Fwd beams on the access link that the NCR reports a capability for. For example, when an NCR reports a capability for generating 4 beams by the NCR-Fwd, the mapping can include entries {1, 2} corresponding to separate spatial filters #1, #2.

There are various methods, as described herein, for how the NCR-Fwd interprets a beam indication message and determines a beam on the access link associated with an indicated beam index/entry (for example, to determine which beam pattern corresponds to entry/beam index #2).

The NCR-RU can use the indicated beam for transmitting (after AF operation on) DL receptions of the UE(s) from the gNB, or for receiving (before AF operation of) UL transmissions from the UE(s) to the gNB, based on the FDD band configuration or TDD DL/UL configuration information that is provided to the NCR.

FIG. 20 illustrates an example flowchart for NCR-RU beam selection based on a beam indication message 2000 according to embodiments of the present disclosure. The embodiment of the flowchart for NCR-RU beam selection based on a beam indication message 2000 illustrated in FIG. 20 is for illustration only. FIG. 20 does not limit the scope of this disclosure to any particular implementation of the flowchart for NCR-RU beam selection based on a beam indication message 2000.

As illustrated in FIG. 20, at step 2010, an NCR-MT receives an 'NCR beam indication message' that maps a first set of T/F resources to a first NCR access link beam, and a second set of T/F resources to a second NCR access link beam. At step 2020, the NCR-Fwd generates a first beam on the NCR access link, and uses the first beam for transmission to or reception from UE(s) in the first T/F resources. At step 2030, the NCR-RU generates a second beam, different from the first beam, on the NCR access link, and uses the second beam for transmission to or reception from UE(s) in the second T/F resources.

One embodiment includes a second approach to beam indication for the access link: Association of NCR beams with T/F resources, based on NCR beams for RS(s). In the second approach to beam indication for NCR-RU for the NCR-to-UE link (namely, the access link), in a first stage, the gNB indicates to the NCR-MT a set of reference UE-side NCR beams for a first set of time/frequency (T/F) resources or signals/channels or the NCR-Fwd determines reference beams for a first set of time/frequency (T/F) resources or signals/channels indicated by the gNB, and in a second stage, the gNB provides an indication for association of target beams corresponding to a second set of T/F resources or signals/channels with the set of reference beams. In one realization, the first set includes a first set of reference signals (RSs), such as SSBs or CSI-RSs, for which the reference beams are indicated to the NCR or determined by the NCR, and then beams for other T/F resources corresponding to other signals or channels are indicated based on the reference beams for the first set of RSs/SSBs/CSI-RSs. The NCR-Fwd generates separate or non-overlapping beams for the first set of RSs. The NCR-RU uses a same beam for a target T/F resource as an indicated reference beam for an RS from the first set of RSs.

In a first realization, the gNB does not indicate or disclose to the NCR the type of transmissions/receptions for the first set of T/F resources, so the NCR is not aware whether the first set of T/F resources are signals/channels or downlink/uplink, and so on. However, the NCR distinguishes the first set of T/F resources as reference T/F resources (which may or may not be RSs), and accordingly maps the beams for target T/F resources to the beams for the reference T/F resources.

For example, the NCR-MT need not know that the first set of time/frequency resources are associated with RS(s), for example instead of being data/control channels. The only relevant information for the NCR-MT can be whether independent beam selection is applied by NCR-Fwd for a time/frequency resource or whether beam selection by NCR-RU for a 'target' time/frequency resource follows beam selection for a 'reference' time/frequency resource-without NCR knowledge that the 'reference' or 'target' time/frequency resources correspond to signals or channels, and so on.

In that case, the beams for the first set can be considered as an 'independent basis' for NCR operation, and the beams for the second set are determined based on beams from the first set/the 'independent basis'. Accordingly, beam indication for NCR-Fwd is associated only with time/frequency resource configuration information, and is agnostic to any knowledge of physical or logical elements/entities within NCR implementation (except for knowledge of NCR capability about beam generation, as outlined herein).

In a second realization, the NCR is indicated that reference beams correspond to a first set of RSs, such as first SSB(s) or CSI-RS(s). Herein, reference beams can refer to spatial filters for transmission (after AF operation) of the first RSs from the NCR-Fwd to the UE(s) served through the NCR. Then, the NCR is provided a mapping or association among other T/F resources, such as other downlink or uplink signals/channels (whose type/nature is transparent to the NCR), and the reference beams. The NCR-Fwd uses the indicated reference beams as spatial filters for transmissions by the NCR-Fwd (after AF operation) of DL receptions to the UE(s) served through the NCR, or uses corresponding spatial filters for reception by the NCR-Fwd (before AF of) UL transmissions by such UE(s).

In one example, the NCR may or may not know the type of an RS from the first set of RSs, such as whether the RS is cell-specific or UE-specific, or that the RS is an SSB or a CSI-RS, or that the RS corresponds to an SSB index or a CSI-RS resource ID, and so on. The NCR is provided only information for RS reception/detection, such as time/frequency configuration information.

For example, the NCR-MT can be provided information of T/F resources for the first set of RS(s) by the gNB. For example, the NCR-MT can determine T/F resources for SSB(s) based on configuration information provided by MIB or SIB1. In another example, information of T/F resources for the first RS(s) can be indicated by pre-configuration including OAM signaling via an OAM entity or by higher layer configuration, or by dedicated L1/L2 signaling as part of side control information. The information for T/F resources for the first set of RS(s) can include explicit information of T/F resources, such as an indication of slots/symbols/REs/RBs of (each occurrence/repetition of) each RS from the first RS(s), or the indication can be based on parameters needed for such determination, such as periodicity, offset, number of repetitions, sequence generation parameters such as initial values/seeds for random generation determination, relevant IDs, and so on.

In another example, the NCR can receive/determine the type of an RS from the first set of RSs, such as SSB or CSI-RS. For example, the NCR-Fwd (on the gNB-side) receives an SSB or CSI-RS from the gNB, and the NCR-MT is indicated a beam to be used by NCR-RU (on the UE-side) to perform AF on the SSB or the CSI-RS. The NCR-MT can receive/determine configuration information of the RS(s), such as time/frequency resource(s) and other sequence detection parameters, as described herein.

According to the second approach, the NCR-RU is indicated to generate a set of independent/separate spatial filters as reference beams. For example, for an NCR that reports a capability to generate 4 beams on the UE-side RIB/connector of NCR (namely, for the NCR access link), as discussed herein, the NCR can be indicated first and second and third and fourth RSs associated with spatial filters #1, #2, #3, and #4, respectively. Herein, "independent" beams refers to the NCR behavior based on which the NCR-RU is expected to generate separate spatial filters for different RSs, for example different beam directions, such as non-overlapping spatial power density/profile up/down to a certain threshold, for example 3 dB power gain for the spatial filter/beam. In the example above, the NCR-RU is expected to generate spatial filters #1, #2, #3, and #4 that have different beam patterns. Generation of independent beams is further discussed herein.

FIG. 21 illustrates an example flowchart for beam selection by the NCR-Fwd with respect to reference NCR beams for a set of reference signals (RSs) 2100 according to embodiments of the present disclosure. The embodiment of the flowchart for beam selection by the NCR-Fwd with respect to reference NCR beams for a set of reference signals (RSS) 2100 illustrated in FIG. 21 is for illustration only. FIG. 21 does not limit the scope of this disclosure to any particular implementation of the flowchart for beam selection by the NCR-Fwd with respect to reference NCR beams for a set of reference signals (RSs) 2100.

As illustrated in FIG. 21, at step 2110, an NCR-MT receives/determines information of a first RS and a second RS. At step 2120, the NCR-RU determines a first UE-side NCR spatial filter (namely, a first spatial filter for the NCR access link) for the first RS, and a second UE-side NCR spatial filter (namely, a second spatial filter for the NCR access link) for the second RS. At step 2130, the NCR-MT is provided a beam indication message that maps a first set of T/F resources to the first RS/spatial filter, and maps a second set of T/F resources to the second RS/spatial filter. At step 2140, the NCR-RU uses the first UE-side NCR spatial filter for transmission to or reception from UE(s) in the first set of T/F resources, and uses the second UE-side NCR spatial filter for transmission to or reception from UE(s) in the second set of T/F resources.

For the first set of RSs corresponding to reference beams or for target T/F resources corresponding to target beams, there are various methods to indicate a spatial filter for the NCR, as described herein so that the NCR-Fwd interprets a beam indication message and determines a beam on the access link associated with an indicated beam index/entry (for example, to determine which beam pattern corresponds to entry/beam index #2).

In one example, gNB indication for beam selection of the NCR access link can be implicit for the first set of T/F resources or RS(s) associated with reference beams, without any explicit indication of beam indexes/labels. For example, the NCR-MT can be provided:

first set of T/F resources or RS(s) for which no beam indication or spatial relation is provided; and other T/F resources for which beam indication or spatial relation is provided with respect to the first set of T/F resources or RS(s).

In this case, the UE-side NCR-Fwd selects a beam as follows:

for the first T/F resources or for first RS(s), select beams independently, based on NCR implementation, for example with separate beams for each element from the first set of T/F resources or for each RS from the first RS(s); and for a T/F resource from other T/F resources, select a same beam as that used for an associated RS from the first RS(s).

For example, the first set of RSs includes SSB #1 and SSB #2 without any spatial relation information, and a second set of RSs or T/F resources includes SSB #3 (or T/F resource #3) and SSB #4 (or T/F resource #4), wherein SSB #3 has a spatial relation associated with SSB #1 and SSB #4 has a spatial relation associated with SSB #2. Then, the NCR-Fwd transmits/AFs SSB #1 with a first beam, based on NCR implementation, and SSB #2 with a second beam, based on NCR implementation. For example, the second beam can be different from the first beam. The gNB does not indicate any beam index/label for the first beam and the second beam. The NCR-Fwd transmits/AFs SSB #3 (or T/F resource #3) with a same Tx beam that the NCR-RU used to transmit SSB #1, and transmits/AFs SSB #4 (or T/F resource #4) with a same Tx beam that the NCR-Fwd used to transmit SSB #2.

One embodiment includes determination/generation of beams by NCR-Fwd for the NCR access link based on gNB beam indication message. There are various methods for how the NCR-Fwd interprets a beam indication message and determines a beam on the access link associated with an indicated beam index/entry (for example, to determine which beam pattern corresponds to entry/beam index #1 and which beam pattern corresponds to entry/beam index #2). The NCR-MT can be provided by the gNB information on how to select a beam/spatial filter corresponding to a beam indication message based on NCR capability report for beam generation and pre-configuration or coordination among the gNB and NCR. Alternatively, the NCR-Fwd can determine and generate a beam based on NCR implementation, with or without reporting to the gNB. The association of NCR-Fwd beam patterns with beam indexes provided in a beam indication message can be also based on a predetermined rule, such as an ascending order of angle of arrival (AoA) or angle of departure (AoD) for the NCR beams.

Herein, the beams can be used for transmission at the UE-side NCR-Fwd (namely, NCR access link) of DL receptions to UE(s) from the gNB, or for reception at the UE-side NCR-RU of UL transmission by/from UE(s), to be relayed to the gNB on the backhaul link of NCR-Fwd. For example, the beams can correspond to transmission/receptions on which the AF is already applied or is intended to be applied by the NCR-Fwd, or to transmission/receptions that are locally generated by the NCR as considered herein.

Herein, the beams can correspond to the first approach or the second approach described herein above (or any other approach considered for the NCR access link beam indication). For example, the beams can correspond to reference T/F resources or RSs or to target T/F resources, or in general to any T/F resource.

As described herein, a beam indication message for NCR can indicate an index/label for a beam of NCR access link to be used for a T/F resource or an RS. For example, the beam index/label can be based on a number of beams that NCR-Fwd can generate on the NCR access link (per NCR capability report, as discussed herein). For example, for an NCR that has indicated a capability for generating 4 beams on the access link, the gNB indicates a beam index/label from a set $\{1, 2, 3, 4\}$.

In a first realization, an association among NCR-Fwd beams and the beam indexes/labels is left to NCR implementation without reporting to the gNB. Therefore, the gNB only indicates that NCR-RU should use beam index 1 for a first time/frequency resource or a first RS. It will be up to NCR implementation how to interpret beam index 1, such as a left-most beam or a right-most beam, among the 4 NCR-Fwd beams. Instead of using left/right attributes to capture a beam direction, other attributes can be also used, such as an angle of arrival/departure for the beam.

In a second realization, the NCR determines an association among NCR-Fwd beams and the beam indexes/labels and reports the association to the gNB. For example, the NCR reports that an NCR-Fwd beam index 1 maps to a left-most beam of NCR-Fwd at the UE-side, and a beam index 2 maps to a second left-most beam, and so on, and beam index 4 maps to a right-most NCR-Fwd beam. Then, the gNB indicates the beam index for a first T/F resource or a first RS based on the reported beam association by the NCR. In one example, instead of using left/right attributes to capture a beam direction, other attributes can be also used, such as an angle of arrival/departure (AoA or AoD) for the beam. For example, the NCR can report a linkage of a beam label/index with an AoA or AoD. For example, the NCR-MT reports that the NCR-Fwd has determined a first AoA/AOD value for NCR-Fwd beam index #1, and a second AoA/AOD value for NCR-Fwd beam index #2, and so on.

In a third realization, the association among NCR-Fwd beams and the beam indexes/labels is determined by the gNB and indicated to the NCR. For example, the gNB indicates that beam index 1 should be mapped to the right-most NCR-Fwd beam, and beam index 4 should be mapped to the left-most NCR-Fwd beam. Instead of using left/right attributes to capture a beam direction, other attributes can be also used, such as an angle of arrival/departure (AoA or AoD) for the beam. For example, the NCR can report a set of AoA/AOD values that the NCR-Fwd can generate for its beam, and the gNB can decide how to associate those AoA/AOD values with the beam labels/indexes, and indicate such association to the NCR. For example, the gNB indicates to the NCR-MT that the gNB refers to an NCR beam with a first AoA/AOD as beam index #1, and refers to an NCR beam with a first AoA/AOD as beam index #2, and so on. Accordingly, when a beam indication message for the NCR includes beam index #1 for a first T/F resource of RS and beam index #2 for a second T/F resource or RS, the NCR-RU uses the NCR beam with the first AoA/AOD for the first T/F resource or RS, and uses the NCR beam with the second AoA/AoD for the second T/F resource or RS.

In a fourth realization, the association of access link NCR-Fwd beams with beam indexes/labels in a beam indication message can be based on a predetermined rule or order. For example, NCR-Fwd is expected to associate NCR beam indexes in an ascending order of beam direction, such as left-to-right, or ascending order of AoA/AOD, or ascending order of first azimuth then elevation of a beam pattern (e.g., the main lobe thereof), and so on. For example, the gNB and the NCR-Fwd share the same understanding/agreement that beam index #1 refers to a beam with smallest AoA/AOD, and beam index #2 refers to a beam with second smallest AoA/AOD, and so on. For example, the gNB and the NCR-Fwd share the same understanding/agreement that beam index #1 refers to a beam with smallest azimuth, and beam index #2 refers to a beam with second smallest azimuth, and so on. For example, when a first NCR beam and a second NCR beam have a same azimuth, and the first NCR beam has a smaller elevation than the second NCR beam, the first NCR beam is associated with a smaller beam index, and the second NCR beam is associated with a larger beam index.

FIG. 22 illustrates an example flowchart for beam selection by the NCR-Fwd on NCR access link 2200 according to embodiments of the present disclosure. The embodiment of the flowchart for beam selection by the NCR-Fwd on NCR access link 2200 illustrated in FIG. 22 is for illustration only. FIG. 22 does not limit the scope of this disclosure to any particular implementation of the flowchart for beam selection by the NCR-Fwd on NCR access link 2200.

As illustrated in FIG. 22, at step 2210, an NCR-MT reports a capability for generating K separate beam patterns at the NCR access kink. At step 2220, the NCR-MT receives/determines an association among the K separate beam patterns and a set of beam indexes $\{1, \ldots, K\}$. For example, the association can be based on NCR implementation, or based on gNB indication, or based on a predetermined rule. At step 2230, the NCR-MT is provided a beam indication message that provides a beam index k E $\{1, \ldots, K\}$ for a T/F resource. At step 2240, the NCR-Fwd generates a k-th beam pattern based on the associations, and uses the k-th beam pattern for the T/F resource.

In a first example, a beam indication message for NCR-MT can include no entry (blank/empty), that is, no spatial relation, for a T/F resource or RS. In this case, gNB indication for beam selection of the UE-side NCR-Fwd can be implicit, without any explicit indication of beam indexes/labels. For example, the NCR-MT can be provided no beam indication or spatial relation for a first set of T/F resources or a first set of RS(s). Then, it is up to NCR-Fwd implementation how to select a beam for such T/F resources or RS(s). In one example, the NCR beam selection has the constraint that different elements of the first set of T/F resources or different RS(s) from the first set of RS(s) are expected to use different/non-overlapping beams, as described herein. Such a behavior can be beneficial, for example in the second approach to NCR beam indication as described herein, wherein the NCR follows for other T/F resources or other signals/channels, a same beam as associated RS(s) from the first set, based on gNB indication.

In a second example, a beam indication message for NCR-MT can include a 'mute' entry (or an out-of-range 'OOR' entry, such as index 0 or index −1) for a T/F resource, which indicates that the NCR-RU need not transmit nor receive on the indicated T/F resource, thereby muting the resource. This behavior can be considered as an indication for a time-/frequency-specific ON/OFF operation by the NCR-RU, wherein the NCR-FWd is not expected to perform the AF operation (i.e., the NCR is switched off).

Combining the first and second examples, a beam indication message can include one of the following entries for each T/F resource:

- no beam indication→the NCR-RU selects a beam for a T/F resource or RS from a set of K T/F resources or RS(s) up to NCR implementation (with the potential constraint that NCR-RU uses a separate beam from those for other T/F resources with no beam indication)
  The set of such T/F resources or RSs with no beam indication can be labeled as $\{1, \ldots, K\}$, for example, in an ascending order of time/frequency resources, for example, with frequency first, time second.
- beam index $k \in \{1, \ldots, K\}$→two possible behaviors:
  When beam index k is provided for a target T/F resource, the NCR-RU uses a same beam as a reference T/F resource or RS with index k.
  When NCR operates according to the first approach described herein (without distinction of reference/target beams), or when beam index k is provided for a reference T/F resource, the NCR-RU generates a beam that is associated with beam index k, for example, per NCR implementation, or per NCR reporting, or per gNB indication, or per predetermined rules, as considered in the first/second/third/fourth realizations above.
- 'mute' or an out-of-range beam index (e.g., 0 or −1)→The NCR-RU does not receive or transmit on the indicated T/F resource (namely, the NCR-Fwd is indicated to be in OFF or not forwarding state).

In one example, the case of "no beam indication" may not exist, that is, a beam indication message that assigns no beam index to a T/F resource or a list of T/F resources may not exist. For example, the NCR-MT expects that a beam indication message always includes a beam index for a T/F resource or a list of T/F resources. Herein, a beam index can include a configured beam index for access link such as beam index $k \in \{1, \ldots, K\}$, or a 'mute' or an out-of-range beam index (e.g., 0 or −1) to indicate an OFF state for NCR-Fwd.

For example, the NCR can be provided a first beam index for a first number/list of T/F resources, and a second beam index for a second number/list of T/F resources. Accordingly, the UE generates a first beam for the first number/list of T/F resources, and generates a second beam for the second number/list of T/F resources, wherein the first and second beams are different. For example, there may be no need to separate out a certain T/F resource from the first (respectively, second) number/list of T/F resources, and identify the certain T/F resource as a reference T/F resource for the corresponding beam, as a beam generation is same for all T/F resources within the first (respectively, second) number/list of T/F resources.

Figure 23:
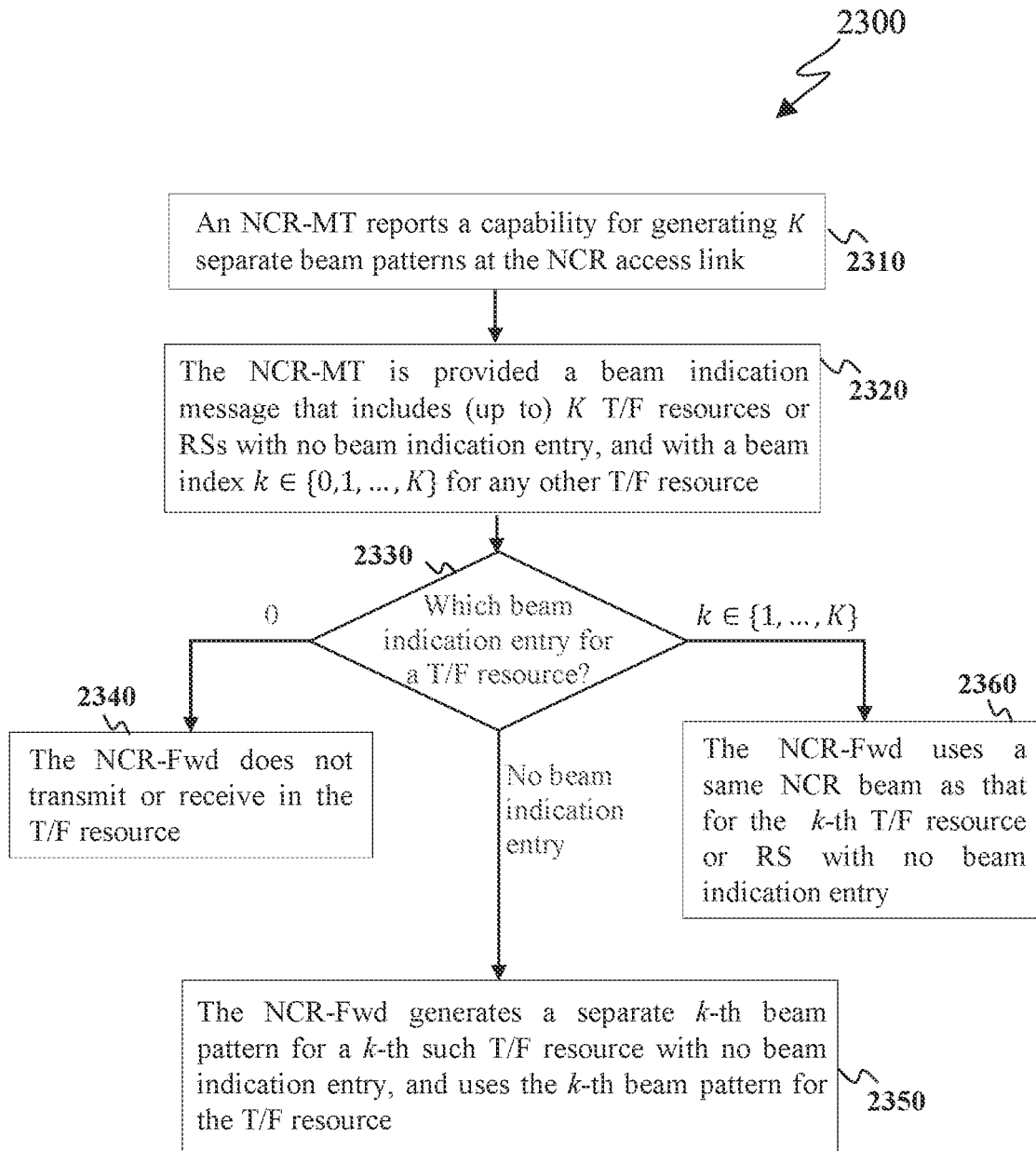
FIG. 23 illustrates an example flowchart for beam selection by the NCR-RU based on reference and target beams and including time-/frequency-specific ON/OFF of NCR according to embodiments of the present disclosure.

FIG. 23 illustrates an example flowchart for beam selection by the NCR-RU based on reference and target beams and including time-/frequency-specific ON/OFF of NCR 2300 according to embodiments of the present disclosure. The embodiment of the flowchart for beam selection by the NCR-RU based on reference and target beams and including time-/frequency-specific ON/OFF of NCR 2300 illustrated in FIG. 23 is for illustration only.

FIG. 23 does not limit the scope of this disclosure to any particular implementation of the flowchart for beam selection by the NCR-RU based on reference and target beams and including time-/frequency-specific ON/OFF of NCR 2300.

As illustrated in FIG. 23, at step 2310, an NCR-MT reports a capability for generating K separate beam patterns at the NCR access link. At step 2320, the NCR-MT is provided a beam indication message that includes (up to) K T/F resources or RSs with no beam indication entry, and with a beam index $k \in \{0,1, \ldots, K\}$ for any other T/F resource. At step 2330, the NCR-MT determines a beam indication entry for a T/F resource. When the beam indication entry for the T/F resource is 0, at step 2340 the NCR-Fwd does not transmit or receive in the T/F resource (NCR-Fwd in OFF or not forwarding state). When there is no beam indication entry for the T/F resource, and the T/F resource is a k-th such T/F resource with no beam indication entry, at step 2350 the NCR-RU generates a separate k-th beam pattern, and uses the k-th beam pattern for the T/F resource. When the beam indication entry for the T/F resource is $k \in \{1, \ldots, K\}$, at step 2360 the NCR-RU uses a same NCR beam as that for the k-th T/F resource or RS with no beam indication entry.

In one example, an NCR-Fwd can generate different modes of beam, such as a first mode with 4 narrow beams or a second mode with 2 wide beams. Then, the NCR can be provided information whether a beam indication by the gNB refers to the first mode or the second mode. For example, the NCR beam generation mode can be separately indicated along with a beam index for each T/F resource or for each RS, or the beam generation mode can be jointly indicated as a header in the beginning of a beam indication message/signaling that applies to all following beam indexes in the beam indication message/signaling. For example, when first mode is indicated by 'n' and second mode is indicated by 'w', an example beam indication message (with separate mode indication) can be '1n, 3n, 2w, 4n, 1w, 2n, . . . ' wherein each beam indication is interpreted based on the corresponding label for the beam generation mode. Another example (with joint mode indication) can be 'n: 1, 2, 4, 3, 2, 2, 1, . . . ' wherein all beam indications are based on the first mode (that is, beam indication from 4 narrow beams) or can be 'w—2, 1, 1, 2, 1, 2, 2, . . . ' wherein all beam indication are based on the second mode (that is, beam indication from 2 wide beams).

In one example, when an NCR is indicated first and second beams on the access link, the NCR can be additionally indicated that the second beam is QCL with the first beam. Accordingly, the NCR-Fwd generates the second beam such that a beam pattern for the second beam is within a beam pattern for the first beam. For example, the first beam corresponds to a wide beam (such as for SSB transmission) and the second beam is a narrow beam within the first/wide beam (such as for CSI-RS transmission). For example, when an NCR is also indicated a third beam on the access link, separate from the first beam (such as with a different beam index), and the NCR is indicated that the third beam is also QCL with the first beam, the NCR-Fwd generates the second and third beams such that beam patterns for both the second and third beams are within a beam pattern for the first beams, and that a beam pattern for the second beam is separate from a beam pattern for the third beam, as described above. For example, the NCR can be provided a beam mode or a beam type for the first, second, and third beam, as described above, such that the NCR can suitably generate the corresponding beam patterns. For example, the NCR-MT can be indicated that the first beam is a wide beam and that the second and third beams are narrow beams.

In one example, an NCR-RU receives, on the backhaul link, first and second SSB indexes with a same Rx beam/spatial reception filter (that is, with 'overlaid' SSB indexes), and the gNB indicates to the NCR-MT that the NCR-Fwd should use, on the access link, different Tx beams such as a first spatial transmission filter and a second spatial filter, respectively, when AF-ing the first and second SSB indexes. Such a method can be beneficial for the gNB to provide guidance on AF-ing SSBs, so that NCR-RU can generate different SSB beams for different SSB indexes (for the benefit of UE(s) served by the NCR, such as for initial/random access or for Connected-mode transmission/reception) while the NCR-Fwd uses a same 'incoming'/Rx beam for reception of those SSBs, such as when the NCR has a single beam for communication with the gNB. Similar operation can be extended to other RS(s), such as 'overlaid' CSI-RS resources.

In one example, 'overlaid' RS(s) such as 'overlaid' SSB(s) can have any order or any time gap. In another example, the NCR expects constraints on 'overlaid' RS(s)/SSB(s), for example, to satisfy NCR latency such as NCR beam switching or NCR processing latency. For example, the NCR does not expect 'overlaid' SSB index(es) with consecutive indexes that the NCR-RU needs to AF with different NCR Tx beams towards the UE(s). For example, the NCR expects that there is a minimum gap between indexes of any two 'overlaid' SSB indexes, such as allowing a minimum of one index gap between SSB index(es).

One embodiment includes a structure of a beam indication message (a.k.a., beamforming side control information)—methods for association of an NCR-RU beam with a time/frequency resource. The NCR-MT can be provided L1/L2 signaling that includes a beam indication message (also referred to as a beamforming side control information), such as one based on the first approach or the second approach described in Embodiments E-1-1 and E-1-2, respectively (or using any other approach). The mapping can additionally include an indication for a granularity of T/F resources.

Herein, time-frequency resources correspond to a number of time symbols/slots and/or a number of frequency resource elements (REs) or resource blocks (RBs) in which the NCR is operating, so NCR-Fwd is performing AF for incoming transmissions/receptions from the gNB or UE(s) to generate outgoing transmission/receptions to the UE(s) or the gNB, respectively.

The entries for beam indication are associated with T/F resources either explicitly, such as with explicit indication of a corresponding T/F resource, or implicitly based on an ordering of T/F resources in a list, as described in the following examples.

In one example, a list of T/F resources can include an arbitrary set/combination of such resources, such as including indexes of N time slots/symbols, possibly along with SFN indication, and/or indexes of M frequency resource elements (REs) or resource blocks (RBs), wherein the corresponding T/F resources can be consecutive or non-consecutive. The list can also provide information of an SCS configuration for determination of the T/F resources. Herein, parameters N and M can be:
- predetermined in the specifications, or
- provided by higher layer signaling to NCR-MT (such as by a SIB, a SIB1 extension, or by a SIBx dedicated to NCR nodes) or by pre-configuration such as by OAM signaling via an OAM entity,
- provided by L1/L2 signaling as part of side control information, for example, with same signaling that includes the list of T/F resources or with a separate/previous signaling of side control information.

For example, with N=40 slots and M=100 RBs, the table includes indexes for N·M=4,000 T/F resources, and 4,000 entries for the corresponding beam indications.

In one example, an SCS for the T/F resources in such a list can be:
- predetermined in the specifications of the system operation, such as a reference SCS, for example, 30 kHz for FR1 and 120 kHz for FR2, or
- pre-configured such as by OAM signaling via an OAM entity, or
- provided by higher layer signaling such as by system information or by common or dedicated RRC configuration, or
- same as an SCS configuration for an active DL/UL BWP of the NCR-MT or an initial DL/UL BWP of a primary cell of the NCR-MT, or
- same as a largest (or smallest) SCS configuration across different DL/UL BWPs configured for different serving cells of NCR-MT, or
- same as a largest (or smallest) SCS configuration provided for different passbands of an NCR-Fwd, if provided.

In another example, a list of T/F resources can include consecutive resources, so the NCR is provided indication of only index of a first symbol/slot and index of a first RE/RB, along with a number N of time slots/symbols and a number of M REs/RBs. The list can also provide information of an SCS configuration for determination of the T/F resources. For example, with $i_{0,t}=0$ and $i_{0,f}=0$ along with N=40 slots and M=100 RBs, the list refers to {slot #0, slot #1, . . . , slot #39} and {RB #0, RB #1, . . . , RB #99}. The beam indication can be in an ascending order with frequency first, then time. For example, a first beam indication is associated with (slot #0, RB #0), a second beam indication associated with (slot #0, RB #1), . . . , and a 4000th beam indication is associated with (slot #39, RB #99).

In a further example, a list of T/F resources can include a number $K_t$ sets of consecutive symbols/slots, and a number $K_f$ sets of consecutive REs/RBs, wherein different sets may not be consecutive. For example, a first set of consecutive slots can be {slot #0, slot #1, slot #2}, and a second set of consecutive slots can be {slot #5, slot #6, slot #7}. Similar, a first set of consecutive RBs can be {RB #0, RB #1, . . . , RB #9}, and a second set of consecutive RBs can be {RB #20, RB #21, . . . , RB #29}. Accordingly, the NCR can be provided index and size of each set of consecutive symbols/slots or REs/RBs.

In yet another example, a list of T/F resources can be in groups of multiple symbols/slots, such as $K_t=3$ symbols/slots, or groups of multiple REs/RBs, such as $K_f=4$ REs/RBs. Therefore, each beam indication is applied to the corresponding group of symbols/slots/REs/RBs, rather than a single symbol/slot/RE/RB. Different groups of T/F resources can be consecutive or non-consecutive.

The NCR can be provided beam indication for all T/F resources or all RSs, or only for some/a subset of T/F resources or RSs (or alternatively, all resources/RSs with independent/reference beams or only some/subset of resources/RS with independent/reference beams). In one example, the NCR can be provided separate beam indexes for each T/F resource or each RS. For example, the gNB indicates to the NCR 4 beam indexes for 4 SSB indexes, with a first NCR beam index for a first SSB, a second NCR beam index for a second SSB, and so on (for example, as considered in the first approach described in one or more embodiments herein). For example, the gNB indicates to the NCR 4 beam indexes corresponding to an NCR capability to generate 4 or more beams (for example, as considered in the first approach described in one or more embodiments herein). The indication can be in same or different signaling as a signaling indication providing the information of the 4 SSBs to the NCR. In another example, the NCR can be provided a first beam index for a first RS (associated with a first time/frequency resource) and the NCR determines beam indexes for other RS based on a predetermined rule. For example, when an NCR-UE reports a capability for generating K beams (such as K=4), and the gNB indicates N RSs (such as N=8) along with a first index $i_0$ for a first RS, the NCR determines a beam index for other (N−1) RSs using a modulo-K addition operation, that is beam index (RS(n))= ($i_0$+n) mod K, where n=2, . . . , N−1.

In one example, a beam indication message only refers to time domain, so that a beam indication message is a mapping from time resources, such as time slot/symbols or groups of time slots/symbols to a set of NCR-RU beams. Such method can be beneficial, for example, when NCR has only one panel and can generate one beam at a time, to be used for all RBs or all 'active' RBs within a pass band of an NCR-Fwd for any given time slot/symbol, or when the NCR hardware cannot distinguish different frequency components such has a frequency-flat filtering applicable to all RBs. In another example, NCR may be able to apply AF to a single or a number of contiguous frequency components. Then, the beam indication message applies to those frequency components.

In one example, the NCR-MT can be provided an indication of UE(s) that are served through the NCR, such as a C-RNTI for each such UE(s), or a UE index associated with such C-RNTI(s). According to this example, a beam indication message can include the UE indication.

One embodiment includes exchange of information between the NCR-MT and the gNB about RS(s) locally (re-) generated at the NCR-Fwd. An NCR-MT can report a capability for locally re-generating RS(s) that the NCR-Fwd could/would receive from the gNB or a capability for locally generating RS(s) that the NCR-Fwd may have not received from the gNB. The NCR-MT and the gNB coordinate on information elements associated with the RS(s) that the NCR-Fwd needs in order to locally (re-) generate such RS(s).

Herein, local re-generation of RS(s) refers to a scenario in which the NCR-Fwd receives the corresponding RS(s) from the gNB and the NCR-Fwd does not AF the received RS(s). Rather, the NCR-RU re-generates those RS(s) independently as if the NCR-RU were the gNB. The NCR-Fwd re-generation of the RS(s) is based on necessary configuration information of the RS(s) as provided by the gNB to the NCR-MT. For example, the NCR-Fwd receives SSB indexes {4, 5, 6}, but instead of AF-ing the received SSB indexes, NCR-Fwd re-generates SSB indexes {4, 5, 6} locally as if the NCR-RU were the gNB. Local re-generation of RS(s) can be beneficial for improved time/frequency synchronization such as to ensure that any AF latency or NCR processing latency does not impact UE reception of the corresponding RS(s). For example, regenerated SSB index(es) by the NCR-RU can be transmitted at a same time as other SSB indexes that are generated by the gNB, therefore UE(s) covered by the NCR do not experience any additional/material latency in SSB reception timing compared to UE(s) that are directly covered by the gNB.

Herein, local generation of RS(s) refers to the scenario in which the NCR-Fwd does not receive the corresponding RS(s) from the gNB, so AF operation by the NCR is not applicable/feasible. Rather, the NCR-Fwd generates the RS(s) solely based on the information/indication provided by the gNB. Therefore, the gNB is 'silent' (that is, the gNB may/does not transmit any signal) in the time/frequency resources corresponding to the RS(s). For example, the gNB generates SSB indexes {0, 1, . . . , 7}, and the NCR-Fwd receives SSB indexes {4, 5, 6} and transmits them with AF towards UE(s) in the coverage area of the NCR. In addition, the NCR-Fwd can generate SSB indexes {8, 9, 10, 11} locally and transmit to UE(s) in the coverage area of NCR. It is noted that, the gNB allocates time/frequency resources to SSB indexes {8, 9, 10, 11}, but the gNB does not generate those SSB indexes, that is, leaves the resources 'blank'/unused for the NCR-Fwd to use. However, the gNB treats SSB indexes {8, 9, 10, 11} same as other SSB indexes that the gNB originally generates and transmits, for example, considers them in the system information messages, beam/CSI/measurement configurations, such as SS/PBCH Block Measurement Timing Configuration (SMTC) configuration, and so on. Local generation of RS(s) can be beneficial for reducing transmission/reception in the system, reducing interference, or reducing signaling overhead.

Local (re-) generation of RS(s) corresponds to NCR-Fwd capability to generate RS(s), such as SSB(s) or CSI-RS resource(s), that the NCR-Fwd has not received or need not receive for such generation. For example, the capability can refer to granularity or precision of the NCR-Fwd clock or frequency oscillator or base-band modem to generate sequences that correspond to RS(s) and to transmit/multiplex them in the time/frequency grid with sufficient accuracy, so as to be aligned with other transmission/receptions in the system, such as other RS(s) generated by the gNB or other RS(s) that the NCR-fwd receives from the gNB and transmits/AFs to corresponding UE(s). For example, the NCR-Fwd can report a first capability to (re-) generate RS(s) with a granularity of OFDM slot or resource block (RB), or report a second capability to (re-) generate RS(s) with a granularity of OFDM symbol or resource element (RE). For example, a first capability can be suitable for (re-) generation of SSBs, while a second capability can be suitable for (re-) generation of CSI-RS resources. The NCR capability for symbol/slot/RB/RE can be w.r.t. a SCS configuration such as a reference SCS as mentioned herein.

In one example, locally (re-) generated RS(s) can have arbitrary time-domain (or frequency domain) allocation, such as SSB indexes with arbitrary indexes, including consecutive indexes, and/or with arbitrary SCS configuration. In another example, the NCR expects constraints on time-domain (or frequency domain) allocation of the locally generated RS(s), for example, to satisfy NCR latency requirements such as NCR beam switching to NCR processing latency (or NCR tuning requirements), and so on. For example, the NCR does not expect locally (re-) generated SSBs with consecutive indexes (corresponding to different NCR Tx beams towards the UE(s), namely NCR beam for access link) at least for certain high SCSs, wherein an NCR latency may be larger than the OFDM cyclic prefix (CP).

In one example, the NCR-MT indicates information of a number of required/requested guard symbols or guard bandwidth/RBs for an NCR-RU to locally (re-) generate RS(s), for example, without causing interference to other signals/channels transmitted by the gNB or the UE(s) or signals/channels AF'ed by the NCR-RU. The indication can be in the form of an NCR capability report or in the form of an UL side control information or an UL MAC-CE to request such guard/margin values.

In one example, the gNB provides the NCR-MT information of a number or time/frequency resources, including SCS configuration, for the RS(s) that the NCR-Fwd is to locally (re-) generate. For example, when locally (re-)

generated RS(s) are SSBs, the NCR is provided information such as one or more of a number and/or indexes of SSBs, a half-frame information, MIB information included in the PBCH corresponding to the SSB, a transmission power level for the SSBs, and so on. When locally (re-) generated RS(s) are CSI-RSs, the NCR is provided information such as one or more of periodicity and offset, an activation/start time/slot/symbol for semi-persistent CSI-RS, any resource ID(s) or sequence ID(s) or UE ID(s) for CSI-RS generation including initialization for random sequence generalization, absolute power level for the CSI-RS or a power offset for CSI-RS relative to SSB transmission power level, and so on.

In one example, the NCR-Fwd is not expected to locally (re-) generate an aperiodic RS, such as aperiodic CSI-RS. In another example, the NCR-RU can locally (re-) generate an aperiodic RS, such as aperiodic CSI-RS, when corresponding information for local (re-) generation of the aperiodic RS is received at NCR-MT earlier than a threshold, such as at least N symbols/slots, in a reference/indicated SCS before a symbol/slot in which the aperiodic CSI-RS is to be transmitted. Herein, the N symbols/slots can depend on NCR-RU capability for beam switching latency or processing latency, and so on.

If the specifications of the system operation support local (re-) generation of only one type of RS, such as only SSBs or only CSI-RS, there is no need to indicate an RS type. If the specifications of the system operation support local (re-) generation of different types of RSs, such as both SSB and CSI-RS, the gNB indicates the RS type along with the other information for generating the RS, such as time/frequency resources and so on. In one example, whether the NCR-Fwd is able to generate SSB or CSI-RS can depend on an NCR capability for local (re-) generation of RSs, as described earlier.

In one example, for the information described above that NCR-Fwd uses to locally (re-) generate RS(s), when the gNB configures to UEs an update to parameters or information elements (IEs) associated with the RS(s), the NCR-MT is also provided updates of the parameters or IEs. For example, if MIB information is updated in PBCH, the gNB indicates the updated MIB information to the NCR-MT. The update is provided to the NCR-MT early enough, such as N symbols/slots in an indicated/reference SCS, before the updates go into effect (such as when provided to UEs), so that UE(s) served via an NCR is not impacted, and cell-specific information is commonly available to all UE(s) in the cell at the same time.

In another example, the gNB includes information of such locally (re-) generated RS(s) in cell-specific or UE-specific configuration(s) in a same way as other RS(s) that are originally generated and transmitted by the gNB. The configuration(s) can include one or more of system information, inter-cell or intra-cell measurements, such as for handover, mobility, SS/PBCH Block Measurement Timing Configuration (SMTC), beam/CSI measurement and reporting, BFR/RLF procedures, configuration of QCL/TCI state/spatial info, configuration of other reference signals, and so on.

In one example, there can be several methods for selection of beam/spatial transmission filter for RS(s) that the NCR-Fwd locally (re-) generates, for example, based on methods discussed herein. For example, beam selection for locally (re-) generated RS(s) can be up to the NCR implementation and the NCR-MT may or may not report the selected beams to the gNB. For example, the NCR-MT can report an association among NCR beams for transmission of locally generated RS(s) and the NCR beam indexes/labels, as described herein. In another example, the NCR-Fwd only reports such association when the locally (re-) generated RS(s) have beam relationship based on QCL assumptions, such as a first locally (re-) generated RS has a same spatial transmission filter as a second locally (re-) generated RS. In another example, the NCR-Fwd only ensures that separate NCR beams/spatial transmission filters are used for the locally generated RS(s), and therefore no association is reported by the NCR-MT. In another example, the NCR-MT reports a beam association for locally (re-) generated RS(s) based on time/frequency resources of the RS(s). In one example, selection of beams for locally (re-) generated RS(s) can be based on gNB decision or indication. Various other methods can be considered as discussed herein.

In one example, it is expected that at least one of the following SSB(s), that are operated by the NCR-Fwd, is a cell-defining SSB (CD-SSB) and can be used for initial/random access by UE(s) in the coverage area of the NCR:

SSB(s) that the NCR-Fwd receives from the gNB and transmits to UE(s) with AF; or SSB(s) that the NCR-Fwd receives from the gNB and transmits to UE(s) based on local re-generation, without AF operation; or SSB(s) that the NCR-Fwd locally generates and transmits to UE(s), without receiving from the gNB or performing AF operation.

One embodiment includes low-overhead mechanisms for updating NCR beam selection information. The NCR-MT can be provided an indication by the gNB to update/overwrite some entries from a previous beam indication message for NCR with corresponding new entries. The update indication can include a new beam indication for the corresponding entries, or can include muting/skipping operation of NCR-Fwd for the corresponding T/F resources. The update indication can be based on signaling that provides new beam indication entries for a few indicated T/F resources, instead of a full beam indication message for a predetermined/preconfigured number/set of T/F resources. The NCR-MT can be additionally or alternatively provided an indication for 'not-allowed' NCR-RU beams by the gNB that the NCR-RU is not expected to use, or the NCR-MT can indicate to the gNB about recommended or preferred/desired beams by the NCR-Fwd. Such indications can correspond to certain indicated T/F resources or to any T/F resource such as all T/F resources during a time period (for example, a number of slots).

In one example, a beam indication message to the NCR, can correspond to a number $N_t$ time resources, such as slots, and a number of $N_f$ frequency resources, such as RBs, wherein $(N_t, N_f)$ can have large values such as $N_t=40$ slots and $N_f=100$ RBs. A beam update indication can include beam indication to only few T/F resources, such as $M \in \{2, 4, 8\}$ T/F resources from a set of T/F resources in a most recent beam or previous indication message. In one example, the NCR-MT can be indicated corresponding T/F resources, such as indexes of slots/RBs, for which a beam indication update is applicable. In another example, the NCR is provided information of parameters that the NCR can use to determine the corresponding T/F resources for the beam update indication. For example, the beam update indication is considered to apply to a number of consecutive slots, so only a first slot and a number of applicable slots are indicated. In another example, a formula may be used to indicate the corresponding T/F resource, such as a formula for SLIV (start and length indicator value) as used in a TDRA fields of a DCI format, wherein the SLIV can be in a time unit of symbols or extended to a time unit of slots (with suitable modifications). Similar, index for frequency resources corresponding to a beam update indication can be based on FDRA type-1 or type-2 (per TS 38.214 v17.2.0), such as indication of a number of continuous RBs or indication of RB groups (RBGs) and so on.

In one example, a beam update indication can include a second entry/beam index for a corresponding T/F resource that is different from a first entry/beam index for the corresponding T/F resource that is previously provided by a gNB in a most recent beam or previous indication message. For example, when an NCR is provided a beam indication message indicating a first beam index for a T/F resource, and the NCR receives a beam update indication indicating a second beam index for the T/F resource, the NCR-Fwd uses the second beam index for transmission/reception in the T/F resource.

In one example, a beam update indication can include a 'mute' entry or an out-of-range (OOR) beam index (such as beam index 0 or −1) for a T/F resource for which an entry/beam index is provided in a most recent/previous beam indication message by the gNB. For example, when an NCR is provided a beam indication message indicating a first beam index for a T/F resource, and the NCR receives a beam update indication indicating a 'mute' or OOR beam index, the NCR-Fwd is not expected to transmit or receive in the T/F resource.

In one example, a beam update indication can modify a set of RBs for which a beam indication is applicable in a slot. For example, the NCR can receive a beam indication message that indicates a first entry/beam index for a first slot and a first number/set of RBs (such as slot #10 and RB #20, . . . , #29), and the NCR can receive a beam update indication that indicates the first entry/beam index applies to the first slot, and a second number/set of RBs (such as slot #10 and RB #10, . . . , #39). Similar mechanisms can apply to update a number/set of symbols in which a beam indication is applicable within a slot. For example, the update indication can indicate that a first beam is only applicable to symbols #1,2,3,4 instead of all symbols within the slot.

In one example, the NCR-MT can be provided an indication for a set of not-allowed beams for NCR-RU. For example, the NCR can be indicated that NCR-RU beam #3 is not allowed (for example, since it is making excessive intra-beam/cell or inter-beam/cell interference), so the NCR should avoid using NCR-RU beam #3. For example, the NCR is expected to not transmit/receive on any/all T/F resources for which a previous/most recent beam indication message has indicated to use NCR-RU beam #3. In one example, a not-allowed beam for NCR may not be expected in next/future beam indication messages. In another example, when a first beam (such as beam #3) is indicated as a not-allowed beam for NCR and the first beam is provided in entries of a next beam indication message, the NCR can assume that the first beam (such as beam #3) is allowed onwards, and a previous restriction for NCR-RU is void.

In one example, the NCR can operate according to a beam update indication provided a corresponding T/F resource for which the beam update is provided, starts (in time) no earlier than a threshold number of $N_{update}$ symbols/slots after a last/ending symbol of a signaling (such as a DCI format or a MAC-CE and so on) that includes the beam update indication. The threshold number of symbols/slots $N_{update}$ can be based on one or more of: a latency for NCR to receive and decode the signaling (such as the DCI format or the MAC-CE) that includes the beam update indication, an NCR processing latency such as a latency to provide information from NCR-MT to NCR-RU and NCR-Fwd preparations for the corresponding actions, a latency for NCR beam switching, an RF latency such as a retuning latency, a HARQ-ACK feedback reporting latency for NCR-MT to indicate to gNB a successful reception of the beam indication message, and so on. In one example, $N_{update}$ is predetermined in the specifications of the system operation based on a reported NCR capability or based on operating frequency range, such as FR1, FR2, or FR2-2 and so on. For example, $N_{update}$ can have a first (larger) value for a first (baseline) NCR capability, and can have a second (smaller) value for a second (advanced) NCR capability. For example, $N_{update}$ can have a first value for a first SCS and a second value for a second SCS. In one example, an SCS configuration for $N_{update}$ is:

same SCS as that for a most recent beam indication message, or same SCS as that for the beam update indication, or provided in a same signaling (such as a same DCI format or a same MAC-CE) that includes the beam update indication, or a reference SCS, such as 15 kHz for FR-1 and 60 kHz for FR2, pre-configured such as by OAM signaling via an OAM entity, or provided by higher layer signaling such as by system information or by common or NCR-dedicated RRC configuration, or same as an SCS for an active DL/UL BWP of the NCR-MT or an initial DL/UL BWP of a primary cell of the NCR-MT, or same as a largest (or smallest) SCS configuration across different DL/UL BWPs configured for different serving cells of NCR-MT, or same as a largest (or smallest) SCS configuration provided for different passbands of an NCR-Fwd, if provided.

In another example, the threshold is expressed in terms of absolute time units, such as milli-sec or micro-sec or nano-sec, instead of a number of symbols/slots.

In one example, when an NCR-MT receives a beam update indication at least $N_{update}$ symbols/slots before the corresponding T/F resource, the NCR applies the beam update indication as described in the previous examples. In another example, when an NCR-MT receives a beam update indication later than $N_{update}$ symbols/slots before the corresponding T/F resource, the NCR does not apply the indicated beam update and discards the beam update indication. For example, the NCR applies a previously indicated beam for the T/F resource, or the UE does not transmit or receive in the T/F resource if no beam indication was previously provided for the T/F resource.

In one example, the NCR-MT can provide assistance information to the gNB in terms of recommended beams or preferred beams for NCR-Fwd operation. For example, the NCR determines, for example based on internal measurements, that a first NCR-Fwd beam (such as beam #4) is experiencing low interference or high link quality, or alternatively that a second NCR-Fwd beam (such as beam #2) is experiencing high interference or low link quality. Then, the NCR-MT can indicate to the gNB that the first beam (such as beam #4) is preferred or recommended for NCR-RU operation, and that the second beam (such as beam #2) is not preferred or not recommended for NCR-RU operation. It is up to the gNB whether/how to take such assistance information into account for corresponding configuration or scheduling of the UE(s) served through NCR or for generating beam indication messages or beam update indications.

In one example, the above methods or examples can apply beyond beam update indication, to any modification for NCR operation, such for ON/OFF indication, power control, TDD configuration information, transmit/receive timing information, and so on.

Two main scenarios can be considered for delivering higher layer information to the NCR-MT:
1) Higher layer information is provided by over-the-air signaling (such as, SIB or RRC);
2) Higher layer information is provided by pre-configuration (such as, offline signaling, OAM, and so on).

In either scenario, the NCR can be regarded as "connected" after receiving the higher layer information. Accordingly, all NCR-MT procedures, such as L1/L2 signaling for control or data reception/transmission procedures, are based on the higher layer information.

In scenario 1, NCR-MT procedures before 'connection', such as initial/random access, can be specified, for example, similar to 'UE' procedures in 5G NR Rel-15/16/17.

In scenario 2, no procedure may be defined for NCR-MT before 'connection', for example, no initial/random access may be introduced in the specifications for system operation. For example, in scenario 2, there may be no assumption about the support (or no support) or any corresponding method for one or more of the following: NCR-MT time/frequency synchronization, or NCR-MT awareness of SSB/MIB/SIB1 information, or re-configuration thereof, and so on. In another example, an NCR-MT may be assumed to be time/frequency synchronized, but no corresponding method may be specified, and the operation may be left to NCR implementation. For example, an NCR-MT may be assumed to be provided with SSB or assumed to receive and decode the SSB, without specifying any corresponding operation. In another example, no cell search and initial access procedure may be defined for the NCR-MT, but after 'connection', the NCR-MT can become aware SSB/MIB/SIB1 reconfigurations based on receiving and decoding those signals/channels.

In one example, higher layer information (based on SIB/RRC configuration, or based on pre-configuration) can include one or both of the following:
a) NCR-common information, that includes higher layer information that is applicable to and can be provided using a shared signaling/mechanism to all NCR nodes operating with a same gNB. Such information can be mainly considered in scenario 1 above, wherein the NCR-MT can receive and decode OTA signaling such as SIB or RRC-common signaling. Examples of NCR-common information include cell-specific TDD DL-UL configuration information, at least when the NCR node is not expected (based on system specifications or NCR capability) to support UE-specific and/or dynamic TDD DL-UL indication.
b) NCR-dedicated information, that includes higher layer information that is applicable to and can be provided using separate signaling/mechanism to each NCR node operating with a same gNB. This can be applicable to scenario 1 or scenario 2. For example, the former can be based on dedicated RRC configuration. The latter is inherently the case, since any offline signaling or OAM pre-configuration is inevitably dedicated, although the gNB implementation can use same information elements (IEs) for multiple NCR nodes. Examples of NCR-dedicated information include beamforming information or ON/OFF information or power control information and so on, that can be different for different NCR nodes. For example, such NCR-dedicated information can be based on UE-specific scheduling or configuration corresponding to different UEs served by different NCR nodes.

An NCR-MT can be provided L1/L2 signaling that include various control information, such as: control information for controlling the NCR-MT itself; side control information for controlling the NCR-RU; or assistance information to the gNB by the NCR. The NCR can distinguish various control information types based on, for example, one or more of: a header or identifier/ID; a length or payload size; or using validation/re-interpretation methods.

A first type of NCR control information can include, for example, control information for controlling the NCR-MT itself and can correspond to, for example, for RLF procedure, CSI reporting for link adaptation, beam management, and so on.

A second type of NCR control information can include, for example, side control information for controlling the NCR-RU and can correspond to, for example, beamforming information, ON/OFF indication, and so on. Such side control information can include coordination messages between the NCR and the gNB, as well as corresponding L1/L2 signaling, if any. For example, corresponding signaling can include L1/L2 DL signaling, if any, for indication or scheduling of control/data channel(s) reception such as PDCCH or PDSCH reception that includes the side control information. For example, corresponding L1/L2 signaling can include corresponding L1/L2 UL signaling, such as HARQ-ACK feedback information in a PUCCH or a PUSCH transmitted by the NCR-MT to confirm successful reception (or not) of the side control information. In another example, an NCR-MT can be (pre) configured by higher layer information or can be indicated by a 'triggering' L1/L2 signaling to transmit current value(s) for one or more side control information in one or multiple transmission occasions. Such operation can be beneficial, for example, for the gNB to become aware of the value(s) applied by NCR for various operations, to ensure of correct coordination between the gNB and the NCR, or to send necessarily L1/L2 signaling to the NCR-MT to update the side control information.

A third type of NCR control information can include, for example, assistance information to the gNB by the NCR and can correspond to, for example, reporting NCR measurements of UE uplink transmissions to the gNB, NCR measurements of neighbor cell interference or transmissions of corresponding UEs, and so on.

In one example, control information for an NCR can be referred to as NCR control information, and abbreviated as NCI. In one example, NCI may be used only for certain types of NCR control information, such as side control information for NCR-RU operation (that is, the second type of NCR control information as described above). In another example, NCI may be used for all types of NCR control information, such as all the types described above.

In one example, higher layer information or the specifications for system operation can provide default or fallback value(s) for (certain) NCR control information, so that when the NCR-MT does not receive an L1/L2 signaling that provides a value for the corresponding NCI, the NCR-MT can apply the default or fallback value.

An L1/L2 signaling that provides control signaling to the NCR-MT can be in the form of a DCI format or a MAC-CE command, or variants thereof. The NCR-MT can receive the L1/L2 control signaling using a downlink channel such as PDCCH or PDSCH (as described herein), and can transmit L1/L2 control signaling using an uplink channel such as PUCCH or PUSCH.

One embodiment includes methods and channels for L1/L2 control signaling to the NCR-MT. The NCR-MT can receive the NCR control information (of various types, as described earlier) using various approaches and methods. A first approach to NCR signaling can include one-step methods that involve one L1/L2 signaling to receive the control information. A second approach to NCR signaling includes two-step methods that involve two L1/L2 signalings to receive the control information. The signaling can be based on various channels, such as PDSCH or PDCCH. In addition, the signaling can be explicit or can involve blind decoding operation.

In a first approach, control information is provided by a one-step mechanism, i.e., the NCR-MT can directly receive the control information in one signaling, or possibly repetitions or re-transmissions thereof—otherwise, all necessary information to receive the signaling is already included in the higher layer information for NCR.

In a second approach, control information is provided by a two-step mechanism, so that, at least parts of the scheduling information for the control signaling of NCR is provided to the NCR-MT via a PDCCH, and then the NCR-MT receives the control signaling in a PDSCH that is activated or scheduled by the PDCCH.

These control methods are described in the following. In one example, only one approach or method is specified in the specifications for the system operation. In another example, multiple approaches or methods may be specified, and the NCR can be (pre) configured with one approach or method for reception of the control information. Herein, the (pre) configuration can be NCR-specific or can be NCR-common (that is, cell-specific or gNB-specific, that is shared by all NCR nodes connected to a same cell or gNB). In one example, a (pre) configuration of a signaling approach or method can be based on NCR capability signaling. For example, there can be various NCR types or NCR classes such that each NCR type/class can be (pre) configured with a different signaling approach or method. For example, a first NCR type/class can be (pre) configured with a one-stage signaling method using PDCCH only (as described herein), and a second NCR type/class can be (pre) configured with a one-stage signaling method using PDSCH only (as described in one or more embodiments herein), and a third NCR type/class can be (pre) configured with a two-stage signaling method using PDCCH+PDSCH (as described herein). In another example, different methods may be used for different types of NCR control information. For example, a first method such as PDCCH+PDSCH (as described herein) can be used for a first type of NCR control information such as information for controlling the NCR-MT itself, and a second method such as PDSCH only (as described in one or more embodiments herein) can be used for a second type of NCR control information such as for side control information for controlling the NCR-RU.

In the following example methods and in various embodiments throughout the present disclosure, a channel for providing L1/L2 control signaling from the gNB to the NCR-MT is considered to be a PDCCH or a PDSCH, and a channel for providing L1/L2 control signaling from the NCR-MT to the gNB is considered to be a PUCCH or a PUSCH. Alternatively, new channel(s) including control or data channel(s) dedicated to NCR nodes can be considered that are different from PDCCH or PDSCH or PUCCH or PUSCH, for example, referred to as physical repeater control channel (PRCCH) or physical repeater shared channel (PRSCH), and so on. Such channels can be only 'downlink' direction from the gNB to the NCR node, or only 'uplink' direction from the NCR node to the gNB, or can be in both directions. In one example, channels used for exchange of L1/L2 signaling among the gNB and the NCR-MT can use an air interference that is different from the Uu interface used for communication of 'normal' UEs.

One embodiment includes one-step control signaling to the NCR-MT via PDCCH. In a first realization of the first approach, the NCR-MT receives the NCR control information via a downlink control information (DCI) format in a PDCCH. Such method can be beneficial, for example, when a payload size for (a certain type of) control information is small, such as several tens of bits, or for an NCR node that may not support PDSCH processing or L2 functionalities.

The NCR-MT receives the DCI format in a PDCCH candidate from among a number of PDCCH candidates that the NCR-MT monitors according to a search space set associated with a control resource set (CORESET).

In one example, the NCR-MT can receive a PDCCH according to a search space set #0 associated with a CORESET #0 in an initial BWP or active BWP of a serving cell to which the NCR-MT is 'connected' or a cell for which the NCR-RU is performing AF operation. In another example, the NCR-MT can receive a PDCCH according to a search space set different from search space set #0 or associated with a CORESET different from CORESET #0 or in a BWP different from an initial BWP of a corresponding serving cell. The information for corresponding search space set or CORESET or BWP can be provided to the NCR-MT via higher layer information. For example, the BWP for PDCCH reception can be an active BWP of the serving cell, that is provided by NCR-specific (pre) configuration. For example, the BPW for PDCCH reception can be a new/second initial BWP, separate from an initial BWP of the serving cell, that is (pre) configured for NCR nodes connected to a same cell or gNB.

In one example, a DCI format that includes NCR control information can include a CRC that is scrambled by an RNTI, such as a C-RNTI, or a different RNTI such as R-RNTI used for NCR operation.

In one example, a DCI format that includes NCR control information can have a same size or a same DCI format as a DCI format that is used by 'normal' UEs. In another example, a DCI format that includes NCR control information can have a different DCI format size or a different DCI format compared to any DCI format used by 'normal' UEs.

In one example, the NCR-MT has a same PDCCH monitoring capability as a 'normal' UE, so that limits on a maximum number of PDCCH candidates or a maximum number of non-overlapping CCEs can be same as those for a 'normal' UE as described in [TS 38.213 v17.0.0, Clause 10.1]. In one example, the NCR-MT may have a lower PDCCH monitoring capability compared to a 'normal' UE, so that corresponding limits on the maximum number of PDCCH candidate or non-overlapping CCEs are smaller than those for 'normal' UEs. Such behavior can apply to all NCR nodes or can apply based on a reported NCR capability. For example, a first class/type of NCR nodes can report a first NCR capability to indicate a support for PDCCH monitoring limits same a 'normal' UE, and a second class/type of NCR nodes can report a second NCR capability to indicate a support for smaller PDCCH monitoring limits than a 'normal' UE.

Herein, 'normal' UEs refers to a set of UEs per Rel-15/16/17 or per future 5G NR releases with downlink or uplink communication to the gNB for data transmission or reception, possibly including UEs supporting sidelink communication or an IAB-MT.

In one example, a target reliability for a DCI format in a PDCCH that includes the NCR control information can be achieved without HARQ-ACK feedback or HARQ retransmissions. For example, a sufficient reliability such as a target block error ratio/rate (BLER) for the DCI format can be achieved by selection of appropriate aggregation level (AL) for the PDCCH that implies an effective coding rate for the corresponding DCI format. For example, the NCR-MT can be (pre) configured or indicated to receive PDCCH with repetition, such as with N=2 or 4 repetitions. For example, PDCCH repetition for NCR-MT can be in different symbols of a same slot, or can be in different slots, such as N=2 or 4 consecutive downlink slots. For example, one PDCCH candidate can be linked to N=2 or 4 other PDCCH candidates in a same search space or in a different search space, wherein the search space indexes or PDCCH candidates or corresponding monitoring occasions can have a same index or can have indexes with predetermined relationship or can have (pre) configured indexes, so that the NCR-MT need to perform blind decoding only for one of the repetitions. For example, PDCCH repetitions for NCR-MT can be in different RBs of a same slot, such as in N=2 or 4 consecutive or non-consecutive RB sets, wherein the information of RB sets, such as a first RB for the RB set or a number of RBs within the RB set or a gap between two adjacent RB sets are provided by higher layer information. The NCR-MT can be provided with higher layer information or by indication via a pervious L1/L2 signaling to receive the PDCCH repetitions with a same spatial reception filter/beam, or with multiple different spatial reception filters/beams, such as with sequential or cyclic beam sweeping/change among the PDCCH repetitions.

Figures 24, 25:
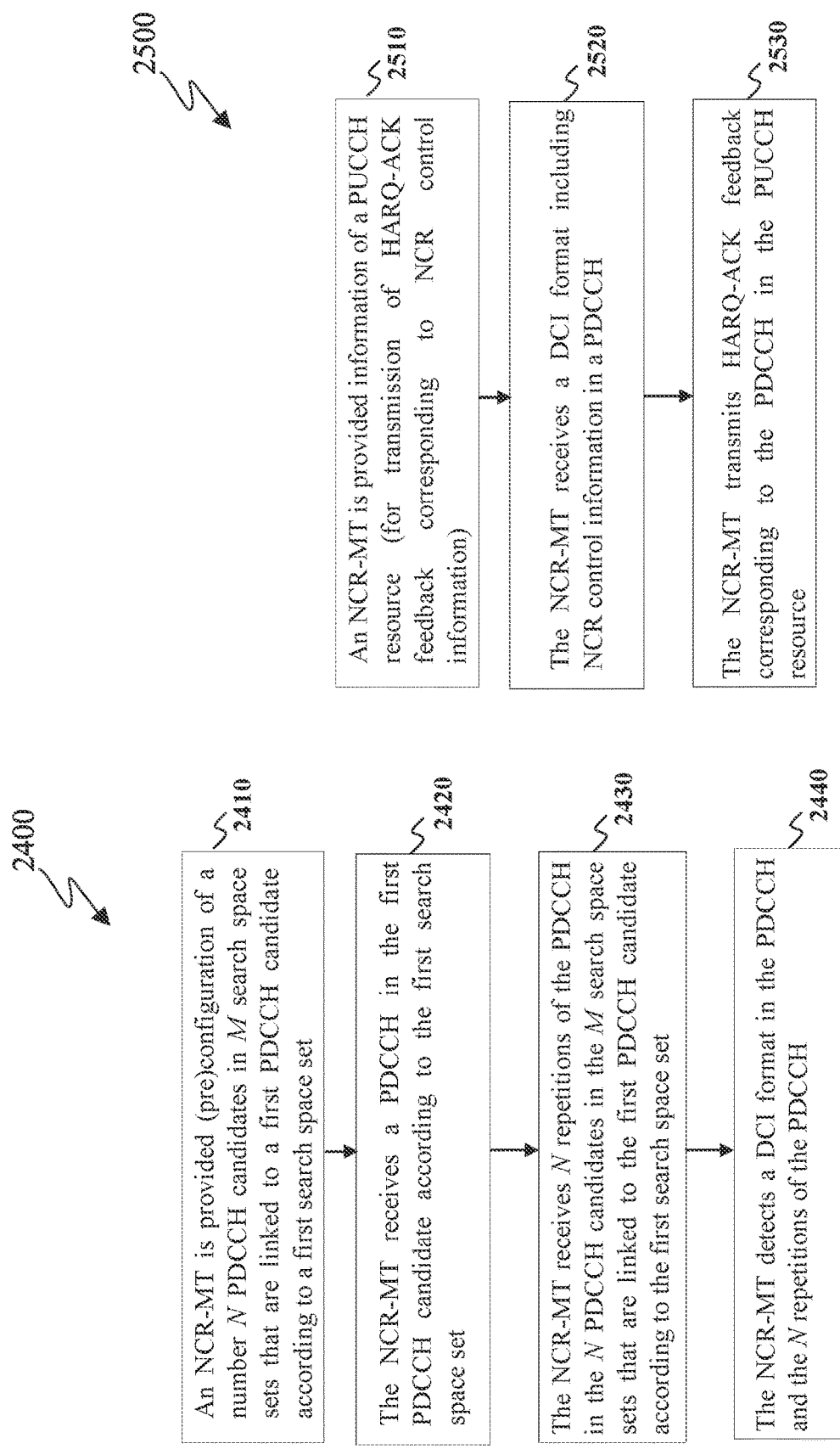
FIG. 24 illustrates an example flowchart for reception of NCR control information using PDCCH repetition according to embodiments of the present disclosure.
FIG. 25 illustrates an example flowchart for reception of NCR control information using PDCCH repetition according to embodiments of the present disclosure.

FIG. 24 illustrates an example flowchart for reception of NCR control information using PDCCH repetition 2400 according to embodiments of the present disclosure. The embodiment of the flowchart for reception of NCR control information using PDCCH repetition 2400 illustrated in FIG. 24 is for illustration only. FIG. 24 does not limit the scope of this disclosure to any particular implementation of the flowchart for reception of NCR control information using PDCCH repetition 2400.

As illustrated in FIG. 24, at step 2410, an NCR-MT is provided (pre) configuration of a number N PDCCH candidates in M search space sets that are linked to a first PDCCH candidate according to a first search space set. For example, the M search space sets can include the first search space set, or all can be different from the first search space set. For example, N=M or N>M. At step 2420, the NCR-MT receives a PDCCH in the first PDCCH candidate according to the first search space set. At step 2430, the NCR-MT receives N repetitions of the PDCCH in the N PDCCH candidates in the M search space sets that are linked to the first PDCCH candidate according to the first search space set. At step 2440, the NCR-MT detects a DCI format in the PDCCH and the N repetitions of the PDCCH. For example, the NCR-MT applies soft combining on the PDCCH and the corresponding N repetitions to detect the DCI format.

In one example, the NCR-MT is expected to provide HARQ-ACK feedback for a DCI format included in a PDCCH that provides control information for the NCR node. The transmission of HARQ-ACK feedback may be necessary by specifications of system operation, or can be enabled or disabled based on higher layer information or possibly based on a MAC-CE command or a field in a (previous or same) DCI format. For example, the NCR can operate with a Type-1 or Type-2 HARQ codebook per Rel-15/16/17 NR specifications [TS 38.213], and a DCI format can include a downlink assignment index (DAI) for HARQ codebook generation. For example, the DCI format may not include a new data indicator (NDI) field, as a DCI format is intended to include fresh/initial information. For example, the DCI format may not include a HARQ process number (HPN), as a HARQ retransmission and combining may not be applicable for a DCI format in a PDCCH. For example, the DCI format may not include a PUCCH resource indicator (PRI) or a PUCCH TPC command, as the corresponding PUCCH resource can be provided by higher layer information, or a closed-loop transmit power control may be disabled or not supported for NCR operation. For example, a K2 field to indicate time gap to HARQ-ACK feedback may not be present, as a corresponding PUCCH resource can be periodic, and the NCR-MT may be expected to transmit all HARQ-ACK feedback in a PUCCH occasion from the periodic PUCCH, possibly subject to a processing timeline. For example, the NCR-MT can be provided with a PUCCH resource every M=10 or 20 or 40 or 80 or 160 slots, and the NCR-MT may be expected to provide HARQ-ACK feedback (based on a HARQ codebook) in the PUCCH resource for all the control information, such as all DCI formats, received in the past M slots, offset by a processing offset. For example, when an NCR-MT receives a DCI format that includes NCR control information in a slot that is less than T slots before a slot in which the NCR-MT would transmit a PUCCH resource, the NCR-MT is not expected to include a HARQ-ACK feedback for the DCI format in the PUCCH resource. Herein, the value T can be predetermined the specifications for system operation, or can be based on an NCR-MT capability, which can be same as a 'normal' UE capability or can be different from a 'normal' UE capability.

In one example, one or more of the aforementioned DCI fields can be present in the DCI format for NCR.

In one example, the NCR-MT may not receive a HARQ retransmission of a first DCI format that includes NCR control information. Rather, the HARQ-ACK feedback from the NCR-MT corresponding to the first DCI format in a first PDCCH monitoring occasion provides awareness at the gNB, so that the gNB can decide to re-transmit the corresponding NCR control information, or variations thereof, as a new initial/fresh transmission of a second DCI format in a second PDCCH monitoring occasion.

FIG. 25 illustrates an example flowchart for reception of NCR control information using PDCCH repetition 2500 according to embodiments of the present disclosure. The embodiment of the flowchart for reception of NCR control information using PDCCH repetition 2500 illustrated in FIG. 25 is for illustration only. FIG. 25 does not limit the scope of this disclosure to any particular implementation of the flowchart for reception of NCR control information using PDCCH repetition 2500.

As illustrated in FIG. 25, at step 2510, an NCR-MT is provided information of a PUCCH resource (for transmission of HARQ-ACK feedback corresponding to NCR control information). At step 2520, the NCR-MT receives a DCI format including NCR control information in a PDCCH. At step 2530, the NCR-MT transmits HARQ-ACK feedback corresponding to the PDCCH in the PUCCH resource.

One embodiment includes one-step control signaling to the NCR-MT via 'blind decoding PDSCH'. In a second realization of the first approach, the NCR-MT can be provided candidate PDSCH occasions, and the NCR-MT performs blind decoding among the candidate PDSCH occasions to determine resources in which the NCR-MT can receive and decode NCR control information. The candidate PDSCH occasions can be provided by higher layers or can be predetermined in the specifications for system operation. The NCR control information included in the PDSCH can be in the form of a MAC-CE command or a DCI format multiplexed in the time/frequency resources of the PDSCH. This method can be beneficial, for example, when the protocol architecture for NCR-MT does not include OTA higher layers such as RRC, or higher layer information is provided by (pre) configuration, such as by OAM signaling via an OAM entity.

This method is similar to reception of NCR control information via PDCCH (as described herein), except that the NCR control information is provided by a PDSCH, therefore more flexible transmission scheme/parameters, such as modulation and channel coding can be used. For example, LDPC coding is applicable that enables larger payload size for the NCR control information.

The candidate PDSCH occasions can be provided by higher layer information, such as (pre) configuration of a 'PDSCH resource set' (dual of control resource set, or CORESET) that includes time/frequency resources in which the NCR-MT receives the PDSCH candidates, and a 'PDSCH search space set' (dual of PDCCH search space set) that includes information for determining candidate PDSCH occasions within the 'PDSCH resource set'. For example, a 'PDSCH search space set' can include one or more of: a periodicity and slot offset for the candidate PDSCH occasions, a duration such as a number of symbols for the candidate PDSCH occasions, or a 'PDSCH aggregation level' from a predetermined set of such levels that determine an effective MCS applied to the NCR control information included in the PDSCH. Herein, a PDSCH aggregation level refers to a collection of a number of data channel elements (DCEs-dual of control channel elements or CCEs), that comprise a predetermined number of PRBs, such as 6PRBs.

For example, a frequency domain allocation of a candidate PDSCH occasion can be predetermined in the specifications for system operations or can be (pre) configured by higher layers. For example, for a PDSCH search space set s associated with a PDSCH resource set p, the DCE indexes for aggregation level L corresponding to PDSCH candidate $m_{s,n_{CI}}^{(L)}$ of the search space set in slot $n_{s,f}^{\mu}$ for an active DL BWP of a serving cell corresponding to carrier indicator field value $n_{CI}$ are given by $$L \cdot \left\{ \left( Y_{p,n_{s,f}^{\mu}} + \left\lfloor \frac{N_{DCE,p}}{L} \right\rfloor \right) \mod \lfloor N_{DCE,p}/L \rfloor \right\} + i$$

where:
$Y_{p,n_{s,f}^{\mu}}=(A_p \cdot Y_{p,n_{s,f}^{\mu}-1}) \mod D$, $Y_{p,-1}=n_{RNTI} \neq 0$, $A_p=39827$ for pmod3=0, $A_p=39829$ for pmod3=1, $A_p=39839$ for pmod3=2, and D=65537;
i=0, ..., L-1;
$N_{DCE,p}$ is the number of DCEs, numbered from 0 to $N_{DCE,p}-1$, in PDSCH resource set p and, if any, per RB set;
the RNTI value used for $n_{RNTI}$ is the C-RNTI or any applicable RNTI for the NCR-MT, such as a new RNTI, for example, R-RNTI.

Figures 26, 27:
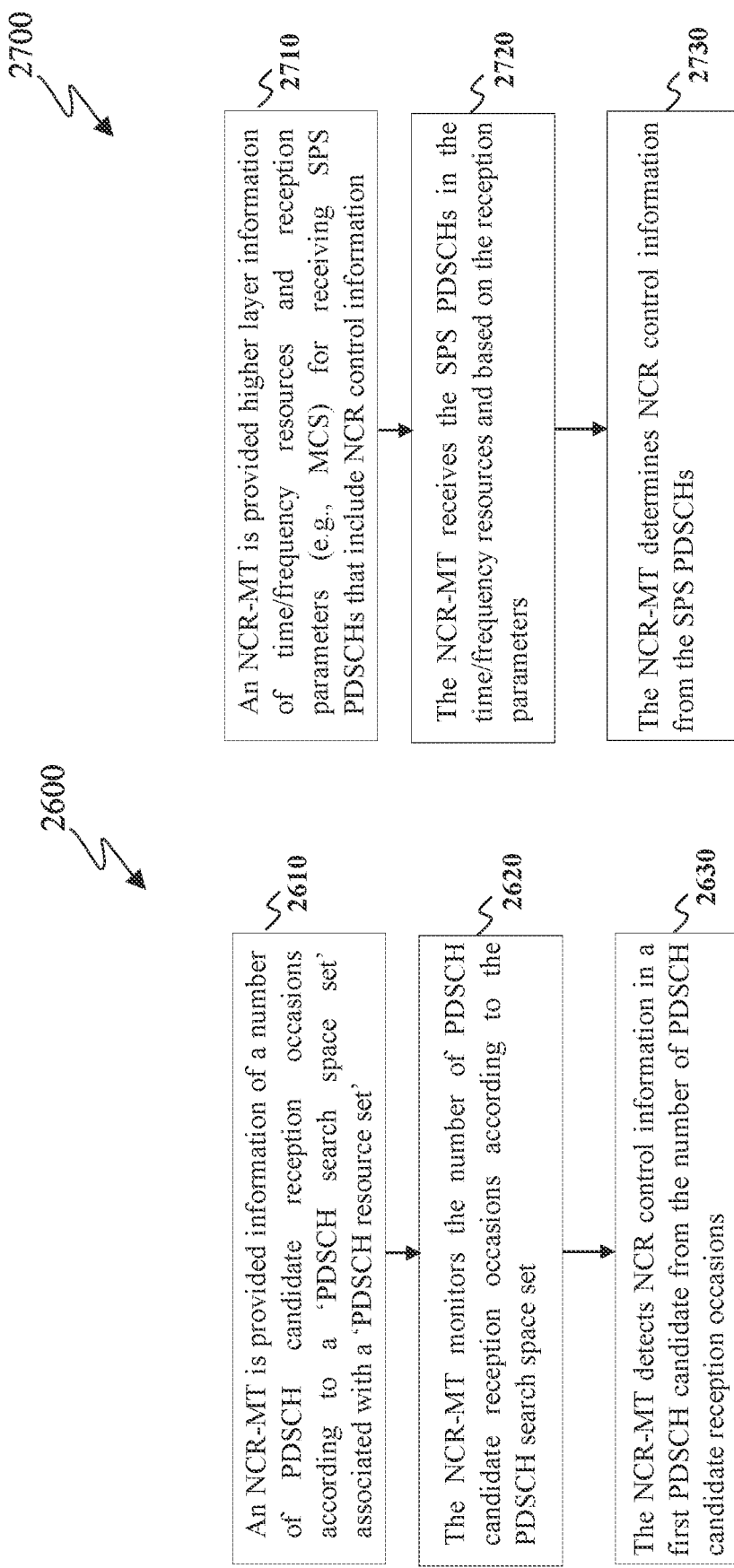
FIG. 26 illustrates an example flowchart for reception of NCR control information using PDSCH blind decoding according to embodiments of the present disclosure.
FIG. 27 illustrates an example flowchart for reception of NCR control information using SPS PDSCH 'Type-1' that is (pre) configured and activated by higher layer information (without need for L1 activation) according to embodiments of the present disclosure.

FIG. 26 illustrates an example flowchart for reception of NCR control information using PDSCH blind decoding 2600 according to embodiments of the present disclosure. The embodiment of the flowchart for reception of NCR control information using PDSCH blind decoding 2600 illustrated in FIG. 26 is for illustration only. FIG. 26 does not limit the scope of this disclosure to any particular implementation of the flowchart for reception of NCR control information using PDSCH blind decoding 2600.

As illustrated in FIG. 26, at step 2610, an NCR-MT is provided information of a number of PDSCH candidate reception occasions according to a 'PDSCH search space set' associated with a 'PDSCH resource set'. At step 2620, the NCR-MT monitors the number of PDSCH candidate reception occasions according to the PDSCH search space set. At step 2630, the NCR-MT detects NCR control information in a first PDSCH candidate from the number of PDSCH candidate reception occasions. For example, the NCR control information can be in MAC-CE command included in the first PDSCH or as a DCI format multiplexed in the first PDSCH.

To simplify the PDSCH blind decoding procedure for the NCR-MT, various assumptions/restrictions can be considered. For example, the PDSCH candidates can have only a single payload size, and correspond to only one identifier such as a single RNTI that is used for scrambling a CRC of various NCR control information. In another example, multiple different payload sizes or different RNTIs can be used for different (types of) NCR control information.

To simplify the PDSCH blind decoding procedure, the NCR-MT can be considered to support one or more of the following: (i) NCR-MT has only one serving cell, and (ii) NCR-MT supports only slot-based 'PDSCH blind decoding', and (ii) NCR-MT has a 'PDSCH blind decoding' capability same as PDCCH blind decoding capability of a 'regular' UE. Accordingly, Rel-15 limits for single-cell PDCCH monitoring as considered in [TS 38.213 v15.14.0, Clause 10.1] can be re-used for 'PDSCH blind decoding'. In one example, overbooking and dropping procedure is not applicable to 'PDSCH candidates' for NCR-MT, therefore, the NCR-MT is not expected to be configured a number of PDSCH candidates in a slot that is larger than corresponding limits on the NCR-MT blind decoding capability.

In another example, NCR-MT has a 'PDSCH blind decoding' capability that is lower than a PDCCH blind decoding capability of a 'normal' UE, such as smaller limits for a maximum number of PDSCH candidates in a slot.

In one example, HARQ retransmission is not applicable to a PDSCH that includes NCR control information. For example, an MCS for the PDSCH can help achieve a target BLER for the transmission. For example, the PDSCH can be repeated in time or frequency or spatial domain. For example, a PDSCH candidate occasion can include a number of repetitions. For example, a first PDSCH candidate can be linked to a number of second PDSCH candidate occasions, so that, when the NCR-MT receives control information in the first candidate PDSCH occasion, the NCR-MT can receive repetitions of the control information in the second candidate PDSCH occasions. For example, the linkage of first and second PDSCH candidate occasions can be provided by higher layer information. Accordingly, the NCR-MT can perform soft combining on the first and second PDSCH repetitions to determine the NCR control information (with improved BLER).

In one example, HARQ-ACK feedback or HARQ retransmission are applicable to PDSCH receptions of NCR-MT based on blind decoding.

In one example, a redundancy version (RV) for the PDSCH can be predetermined, such as RV=0. In another example, the RV can be provided by higher layer information, so a same RV can be applicable for all candidate PDSCH occasions. In another example, the NCR-MT determines an RV based on a predetermined or (pre) configured mapping to a 'PDSCH candidate occasion' in which the NCR-MT receives the control information. For example, the mapping can be based on a slot index for a PDSCH candidate occasion or based on an index of the PDSCH candidate reception occasion. For example, for an n-th candidate PDSCH reception occasion, the RV can be determined using one of the following options:

RV=n mod 4, or

RV=(n+rv$_s$) mod 4, wherein rv$_s$ is an RV offset provided by higher layer information, Based on a pattern, such as (0, 3, 0, 3, . . . )

Based on the table below (or a permutation thereof)

| rv$_{id}$ to be applied to n$^{th}$ candidate PDSCH occasion | | | |
|---|---|---|---|
| n mod 4 = 0 | n mod 4 = 1 | n mod 4 = 2 | n mod 4 = 3 |
| 0 | 2 | 3 | 1 |

Based on the table below (or a permutation thereof), wherein rv$_s$ is an RV offset provided by higher layer information

| rv$_{id}$ to be applied to n$^{th}$ candidate PDSCH reception occasion | | | |
|---|---|---|---|
| n mod 4 = 0 | n mod 4 = 1 | n mod 4 = 2 | n mod 4 = 3 |
| (0 + rv$_s$) mod 4 | (2 + rv$_s$) mod 4 | (3 + rv$_s$) mod 4 | (1 + rv$_s$) mod 4 |

In another example, the above example methods for RV determination can be used, wherein the 'candidate PDSCH reception occasion' can be replaced with other indexes, such as a slot index for the candidate PDSCH occasion. For example, when the NCR-MT receives first and second candidate PDSCH occasions in a same slot, the NCR-MT determines a same RV for a PDSCH in the first and second candidate PDSCH occasions.

This method can be used for reception of NCR control information of size in the order of several hundred bits.

The NCR-MT can be provided control information in a PDSCH via two options. In a first option, the control information is provided in a MAC-CE command to the NCR-MT. This option can be beneficial, for example, when HARQ retransmission for the NCR control information is supported or when NCR-MT is capable of both L1/L2. For example, this option enables different sizes or formats for each MAC-CE corresponding to different types of NCR control information.

In a second option, the NCR control information can be multiplexed in the time/frequencies of the PDSCH. This option can be beneficial, for example, when HARQ retransmission of NCR control information is not supported or when the NCR-MT is capable of L1 processing only. The NCR control information in the first option can be considered as a 'DCI format' that is provided in a PDSCH (instead of PDCCH), so a longer payload is possible for the 'DCI format'. In particular, a payload size for the NCR control information can be determined as follows.

An NCR-MT can determine a number $Q'_{NCI}$ of coded modulation symbols for multiplexing NCR control information in a PDSCH, prior to any duplication/allocation across spatial layers, if present, as follows:

$$Q'_{NCI} = \min\left\{\left\lceil \frac{(O_{NCI} + L_{NCI}) \cdot \beta^{NCI}_{offset}}{Q^{NCI}_m \cdot R} \right\rceil, \left\lceil \alpha \sum_{l=l_0}^{N^{PDSCH}_{symbol}-1} M^{NCI}_{sc}(l) \right\rceil\right\} + \gamma$$

where:
- $O_{NCI}$ is a number of bits for the NCR control information (NCI);
- $L_{NCI}$ is a number of CRC bits for the NCI, such as 24 bits;
- $\beta^{NCI}_{offset}$ is (pre) configured by higher layers;
- $Q^{NCI}_m$ is a modulation order of NCI, for example with a predetermined value 2 corresponding to QPSK (same as for a PDCCH), or pre-configured by higher layer information;
- R is a coding rate of the PDSCH as implied by the aggregation level of candidate PDSCH reception occasion, or a coding rate for the NCI that can be a (pre) configured offset relative to the coding rate of the PDSCH;
- α is (pre) configured by a higher layer parameter dl-NCI-Scaling;
- $l_0$ is a first symbol of the PDSCH in which the NCR-MT receives the multiplexed NCI, such as $l_0=0$ when the NCR-MT starts receiving the multiplexed NCR control information from the first symbol of the PDSCH, or $l_0$ is a symbol index of a first OFDM symbol of the PDSCH that does not include DM-RS REs when the NCR-MT starts receiving the multiplexed NCI in the PDSCH after the first OFDM symbol of the PDSCH with DM-RS REs;
- $N^{PDSCH}_{symbol}$ is a total number of OFDM symbols allocated to the PDSCH;
- $M^{NCI}_{sc}(l)$ is a number of resource elements that can be used for reception of the NCI in an OFDM symbol l of the PDSCH, for l=0,1,2 . . . , $N^{PDSCH}_{symbol}-1$, and can be determined as $M^{NCI}_{sc}(l)=M^{PDSCH}_{sc}(l)-M^{unavailable}_{sc}(l)$, wherein
- $M^{PDSCH}_{sc}(l)$ is a scheduled/(pre) configured bandwidth of the PDSCH reception, expressed as a number of subcarriers, in the OFDM symbol l of the PDSCH;
- $M^{unavailable}_{sc}(l)$ is a number of subcarriers, within the frequency domain resources such as RBs scheduled for the PDSCH, in OFDM symbol l that are not available to the PDSCH reception, such as aperiodic ZP CSI-RS resource sets or reserved resource patterns, or any other unavailable resources, such as resources used for PDCCH, or SS/PBCH block, or LTE CRS, and so on.
- γ is a number of vacant resource elements in a resource block in which a last coded modulation symbol of NCI belongs/is multiplexed, when an RB-level granularity is used for NCI multiplexing in the PDSCH, and γ=0 when a RE-level granularity is used.

In one example, in the above formula for $Q'_{NCI}$, the parameter $Q^{NCI}_m$ can be replaced with the parameter $Q^{PDSCH}_m$ corresponding to a modulation order of the PDSCH.

In another example, the UE determines a number of coded modulation symbols generated for NCI to be multiplexed on a PDSCH, prior to any duplication/allocation across spatial layers if present, denoted as $Q'_{M-DCI}$, as follows:

$$Q'_{NCI} = \min \left\{ \left\lceil \frac{(O_{NCI} + L_{NCI}) \cdot \beta_{offset}^{NCI} \cdot \sum_{l=0}^{N_{symbol}^{PDSCH}-1} M_{sc}^{NCI}(l)}{\sum_{r=0}^{C_{DL-SCH}-1} K_r} \right\rceil, \left\lceil \alpha \sum_{l=l_0}^{N_{symbol}^{PDSCH}-1} M_{sc}^{NCI}(l) \right\rceil \right\} + \gamma$$

wherein, $C_{DL-SCH}$ is a number of code blocks for DL-SCH of the first PDSCH reception;

$K_r$ is a size of r-th code block of DL-SCH of the PDSCH reception, for r=0, . . . , $C_{DL-SCH}$−1; if CBG operation is configured for the PDSCH in which the NCI is multiplexed; and all other parameters are defined as in the previous example.

The input bit sequence to rate matching for the NCR control information (NCI) is $d_0, d_1, d_2, d_3, \ldots, d_{N-1}$, where N is the number of channel coded bits for the NCI. Rate matching is performed according 5G NR Rel-15/16/17 procedure, such as one or more of sub-block interleaving, bit selection, or bit interleaving. The output bit sequence after rate matching is denoted as $g_0^{NCI}, g_1^{NCI}, g_2^{NCI}, g_3^{NCI}, \ldots, g_{G^{NCI}-1}^{NCI}$, where $G^{NCI} = Q'_{NCI} \cdot Q_m^{NCI}$ and $Q_m^{NCI}$ is modulation, order of NCI. In one example, a threshold is provided by the specifications for system operation or via higher layer information, that limits a maximum number of bits corresponding to the NCI after the rate matching procedure. For example, an NCR-MT is not expected to have $G^{NCI} > 4096$.

One embodiment includes a one-step control signaling to the NCR-MT via SPS PDSCH Type-1 (without activation DCI). In a third realization of the first approach, the NCR-MT receives the NCR control information in PDSCH(s) that are included in a SPS PDSCH, and whose time/frequency resources and other reception parameters are explicitly provided by higher layer information, without need for any activation DCI (as considered next herein). This method involves no randomization or time-variation, and the NCR-MT does not perform any 'blind decoding' for the PDSCH reception (as considered herein). This method can be beneficial, for example, when the protocol architecture for NCR-MT does not include RRC, or higher layer information is provided by (pre) configuration, such as by OAM.

This method can be used for reception of NCR control information of size in the order of several hundred bits. The payload size for the PDSCH can be fixed or predetermined or can be based on a size of (pre) configured time/frequency resources.

According to this method, the control information is provided by a PDSCH, which can be referred to as a 'Type-1' SPS PDSCH, that is, an SPS PDSCH that is activated by higher layer information (hence, no need for an L1 activation, such as an activation DCI format).

For example, the NCR-MT can be provided first time/frequency resources, such as a number of symbols/slots and a number of REs or RBs, in which the NCR-MT receives the PDSCH that includes the NCR control information.

For example, the NCR-MT receives higher layer information for: a periodicity and a slot offset, or a duration in symbols or a time-domain resource allocation (TDRA) for time slots in which the NCR-MT receives the SPS PDSCH.

For example, the NCR-MT receives higher layer information for a starting RB and a number of RBs in frequency domain in which the NCR-MT receives the SPS PDSCH.

For example, VRB-to-PRB mapping can be based on higher layer information, or can be predetermined, for example, always not-interleaved (or always interleaved).

In example, the time-domain and frequency-domain resource allocation for the SPS PDSCH that includes the NCR control information can be separate and independent. In another example, the time-domain and frequency-domain resource allocation for the SPS PDSCH can be dependent. For example, the NCR-MT receives the SPS PDSCH in a first set of RBs when the NCR receives the SPS PDSCH in a first set of slots, and receives the SPS PDSCH in a second set of RBs when the NCR receives the SPS PDSCH in a second set of slots. For example, a cyclic or sequential pattern may apply to the time/frequency resource allocation. For example, the NCR-MT receives the SPS PDSCH in RBs {10, 11, . . . , 20} for odd slots, and in RBs {40, 41, . . . , 50} for even slots, wherein the NCR-MT is (pre) configured to receive the SPS PDSCH in slots {5, 10, 15, 20, . . . }.

For example, the NCR-MT can be provided an MCS for reception of the PDSCH that includes the control information. In one example, a reduced number of bits may be used for MCS indication, such as only 2 or 3 bits, since less channel variations are expected for the NCR-to-gNB link quality.

FIG. 27 illustrates an example flowchart for reception of NCR control information using SPS PDSCH 'Type-1' that is (pre) configured and activated by higher layer information (without need for L1 activation) 2700 according to embodiments of the present disclosure. The embodiment of the flowchart for reception of NCR control information using SPS PDSCH 'Type-1' that is (pre) configured and activated by higher layer information (without need for L1 activation) 2700 illustrated in FIG. 27 is for illustration only. FIG. 27 does not limit the scope of this disclosure to any particular implementation of the flowchart for reception of NCR control information using SPS PDSCH 'Type-1' that is (pre) configured and activated by higher layer information (without need for L1 activation) 2700.

As illustrated in FIG. 27, at step 2710, an NCR-MT is provided higher layer information of time/frequency resources and reception parameters (such as MCS) for receiving SPS PDSCHs that include NCR control information. At step 2720, the NCR-MT receives the SPS PDSCHs in the time/frequency resources and based on the reception parameters. At step 2730, the NCR-MT determines NCR control information from the SPS PDSCHs.

In one example, HARQ retransmission is not supported for SPS PDSCH that includes NCR control information. It is up to the gNB whether or not to re-transmit a PDSCH, but if the gNB chooses to do so, the NCR-MT is not expected to perform HARQ combining such as incremental redundancy for a second/re-transmitted PDSCH with a first/initial PDSCH. Rather, a target reliability level such as a sufficiently low BLER can be achieved by a number of options. In a first option, sufficiently low BLER can be achieved by careful selection of MCS, PDSCH payload size, a number of time/frequency resources, and so on.

In a second option, a target reliability level such as a sufficiently low BLER can be achieved by SPS PDSCH repetition. For example, SPS PDSCHs that include NCR control information can be repeated in time, frequency, or spatial domain. For example, the NCR-MT can be (pre) configured to receive a number N=2 or 4 or 8 repetitions across time domain in consecutive SPS PDSCH occasions. The repetition occasions are not expected to overlap with slots/symbol designated as uplink in a corresponding TDD DL-UL configuration, and the NCR-MT discards/omits any such overlapping repetition, while possibly being counted towards a number of PDSCH repetitions.

In another example, the NCR-MT can be (pre) configured to receive a number of N=2 or 4 or 8 repetitions FDM'ed across the frequency domain. For example, the NCR-MT can be provided a number of repetitions, and for each repetition, a starting RB and a number of RBs. All repetitions are within a same time slot. For example, a time slot for the FDM'ed repetitions is among the slots (pre) configured for reception of the SPS PDSCH. In one example, the FDM repetitions can be in consecutive or adjacent RBs. In another example, the FDM repetitions can have gaps or guard bands for example, with (at least) size L RBs. In one example, all FDM repetitions are expected to be within a 'pass band' of an NCR.

FIG. 28 illustrates an example flowchart for reception of FDM repetitions for SPS PDSCHs that includes NCR control information 2800 according to embodiments of the present disclosure. The embodiment of the flowchart for reception of FDM repetitions for SPS PDSCHs that includes NCR control information 2800 illustrated in FIG. 28 is for illustration only. FIG. 28 does not limit the scope of this disclosure to any particular implementation of the flowchart for reception of FDM repetitions for SPS PDSCHs that includes NCR control information 2800.

As illustrated in FIG. 28, at step 2810, an NCR-MT is provided higher layer information for a set of slots for receiving SPS PDSCH that includes NCR control information. At step 2820, the NCR-MT is provided higher layer information for receiving a number of N repetitions and corresponding N RB sets for SPS PDSCH in each slot from the set of slots. At step 2830, the NCR-MT receives the SPS PDSCH with the number of N repetitions in the corresponding N RB sets for a first slot from the set of slots. At step 2840, the NCR-MT determines NCR control information from the SPS PDSCH with the number of N repetitions in the first slot.

A redundancy version (RV) for the SPS PDSCH can be predetermined, for example RV=0, or can be provided by higher layer information, so that a same RV is applicable for all SPS PDSCH occasions. In another example, the RV can be implicitly derived by the NCR-MT based on a predetermined rule, such as a mapping between a SPS PDSCH occasion or a slot index for SPS PDSCH reception and an RV value. For example, for an n-th SPS PDSCH occasion, the NCR-MT can determine a corresponding RV using one of the following options:

RV=n mod 4

RV=(n+$rv_s$) mod 4, wherein $rv_s$ is an RV offset provided by higher layer information Based on a pattern, such as (0, 3, 0, 3, . . . )

Based on the table below (or a permutation thereof)

| $rv_{id}$ to be applied to $n^{th}$ SPS PDSCH occasion | | | |
|---|---|---|---|
| n mod 4 = 0 | n mod 4 = 1 | n mod 4 = 2 | n mod 4 = 3 |
| 0 | 2 | 3 | 1 |

Based on the table below (or a permutation thereof), wherein $rv_s$ is an RV offset provided by higher layer information

| $rv_{id}$ to be applied to $n^{th}$ SPS PDSCH occasion | | | |
|---|---|---|---|
| n mod 4 = 0 | n mod 4 = 1 | n mod 4 = 2 | n mod 4 = 3 |
| (0 + $rv_s$) mod 4 | (2 + $rv_s$) mod 4 | (3 + $rv_s$) mod 4 | (1 + $rv_s$) mod 4 |

In one example, other indexes can be used in the above options instead of an index of a SPS PDSCH occasion, for example, a slot index corresponding to a SPS PDSCH occasion.

In one example, HARQ-ACK feedback or HARQ retransmission is supported for SPS PDSCH that includes NCR control information. In one example, the NCR-MT receives HARQ re-transmissions corresponding to an SPS PDSCH in time/frequency resource that are (pre) configured for the same SPS PDSCH, so that there is no need for a corresponding HARQ retransmission to be dynamically scheduled PDSCH by a DCI format.

For example, new date indicator (NDI) can be multiplexed within the SPS PDSCH.

For example, HARQ process number (HPN) can be multiplexed within the PDSCH, or the NCR-MT can determine an HPN corresponding to an SPS PDSCH based on a mapping to an SPS PDSCH occasion.

For example, DAI may not be applicable/needed when the NCR-MT receives the NCR control information, including HARQ retransmissions thereof, in SPS PDSCH occasions. For example, the NCR-MT can generate a simplified version of a Type-1 HARQ codebook that applies to SPS PDSCH occasions (without any PDSCH that is scheduled by a DCI format). For example, a periodic PUCCH or a configured grant PUSCH in slot n can include HARQ-ACK information feedback for all preceding SPS PDSCH occasions that the NCR-MT receives no later than slot (n-k) and after a slot in which the NCR-MT received a last SPS PDSCH occasion whose HARQ-ACK feedback information was multiplexed in a an immediately previous occasion of the periodic PUCCH or the configured grant PUSCH. Herein, a value of k can be predetermined in the specifications for system operation, or can be provided by higher layer information, or can be based on an NCR capability for (SPS) PDSCH processing or HARQ-ACK feedback generation, and so on.

In one example, a PUCCH resource for transmission of HARQ-ACK feedback corresponding to SPS PDSCHs can be provided by higher layers. For example, the higher layers can provide a single (pre) configured PUCCH resource from a predetermined list/set of PUCCH resources. For example, the list/set of PUCCH resources can be that defined in Rel-15/16/17 specifications for system operation [TS 38.213] for UE operation before RRC connection, such as for HARQ-ACK feedback of Msg4 PDSCH or corresponding retransmissions.

In one example, the specifications for system operation or the higher layer information may disable a closed-loop transmit power control for a PUCCH that includes HARQ-ACK feedback information corresponding to SPS PDSCH that includes the NCR control information. Therefore, a TPC command for PUCCH may not be applicable (that is, disabled), and therefore not provided.

One embodiment includes two-step control signaling to the NCR-MT via SPS PDSCH Type-2 (with DCI activation) or via a PDSCH scheduled by a DCI format. The second approach to L1/L2 signaling for NCR control information includes two-step methods with PDCCH+PDSCH. In a first realization of the second approach, the NCR-MT is (pre) configured an SPS PDSCH 'Type-2' for which some parameters, such as time/frequency resource allocation, are provided by higher layer information, and some other parameters are provided by an activation DCI format that also activates the SPS PDSCH reception. In a second realization of the second approach, the NCR-MT receives the NCR control information in a PDSCH that is dynamically and individually scheduled by a DCI format. In an extension, multiple PDSCHs including NCR control information can be scheduled by a single DCI format. In either realization, the NCR control information can be in a MAC-CE command included in the PDSCH or can be multiplexed in time/frequency resources of the PDSCH. The second approach is beneficial, for example, when the NCR-MT supports both L1/L2 functionalities or flexible reception of NCR control information. The NCR-MT may receive up to several thousands of bits of NCR control information using the second approach.

One embodiment includes higher layer information for the NCR-MT. Two main scenarios can be considered for delivering higher layer information to the NCR-MT:

1) Higher layer information is provided by over-the-air signaling (such as, SIB or RRC);
2) Higher layer information is provided by pre-configuration (such as, offline signaling, operation and management (OAM), and so on).

In either scenario, the NCR can be regarded as "connected" after receiving the higher layer information. Accordingly, all NCR-MT procedures, such as L1/L2 signaling for control or data reception/transmission procedures, are based on the higher layer information.

In scenario 1, NCR-MT procedures before 'connection', such as initial/random access, can be specified, for example, similar to 'UE' procedures in 5G NR Rel-15/16/17.

In scenario 2, no procedure may be defined for NCR-MT before 'connection', for example, no initial/random access may be introduced in the specifications for system operation. For example, in scenario 2, there may be no assumption about the support (or no support) or any corresponding method for one or more of the following: NCR-MT time/frequency synchronization, or NCR-MT awareness of SSB/MIB/SIB1 information, or re-configuration thereof, and so on. In another example, an NCR-MT may be assumed to be time/frequency synchronized, but no corresponding method may be specified, and the operation may be left to NCR implementation. For example, an NCR-MT may be assumed to be provided with SSB or assumed to receive and decode the SSB, without specifying any corresponding operation. In another example, no cell search and initial access procedure may be defined for the NCR-MT, but after 'connection', the NCR-MT can become aware SSB/MIB/SIB1 reconfigurations based on receiving and decoding those signals/channels.

FIG. 29 illustrates an example flowchart for NCR operation based on higher layer information 2900 according to embodiments of the present disclosure. The embodiment of the flowchart for NCR operation based on higher layer information 2900 illustrated in FIG. 29 is for illustration only. FIG. 29 does not limit the scope of this disclosure to any particular implementation of the flowchart for NCR operation based on higher layer information 2900.

As illustrated in FIG. 29, at step 2910, an NCR-MT is provided higher layer information using pre-configuration (e.g., OAM) or using over-the-air configuration signaling (e.g., SIB, RRC). At step 2920, the NCR-MT receives L1/L2 signaling (e.g., for control or data Tx/Rx) according to the higher layer information. At step 2930, the NCR node operates the NCR-MT or the corresponding NCR-RU based on the received L1/L2 signaling.

In one example, higher layer information (based on SIB/RRC configuration, or based on pre-configuration) can include one or both of the following:

a) NCR-common information, that includes higher layer information that is applicable to and can be provided using a shared signaling/mechanism to all NCR nodes operating with a same gNB. Such information can be mainly considered in scenario 1 above, wherein the NCR-MT can receive and decode OTA signaling such as SIB or RRC-common signaling. Examples of NCR-common information include cell-specific TDD DL-UL configuration information, at least when the NCR node is not expected (based on system specifications or NCR capability) to support UE-specific and/or dynamic TDD DL-UL indication.

b) NCR-dedicated information, that includes higher layer information that is applicable to and can be provided using separate signaling/mechanism to each NCR node operating with a same gNB. This can be applicable to scenario 1 or scenario 2. For example, the former can be based on dedicated RRC configuration. The latter is inherently the case, since any offline signaling or OAM pre-configuration is inevitably dedicated, although the gNB implementation can use same information elements (IEs) for multiple NCR nodes. Examples of NCR-dedicated information include beamforming information or ON/OFF information or power control information and so on, that can be different for different NCR nodes. For example, such NCR-dedicated information can be based on UE-specific scheduling or configuration corresponding to different UEs served by different NCR nodes.

One embodiment includes enhancements for delivery of higher layer information to the NCR-MT. Various enhancements can be considered for delivery of higher layer information to an NCR-MT. A first enhancement includes 'delta-signaling' to provide an over-the-air (OTA) update via L1/L2 signaling for a pre-configuration that is initially provided to the NCR-MT via offline signaling or OAM operation. A second enhancement includes an OTA calibration procedure for NCR so that time/frequency synchronization or spatial domain coordination among the gNB and the NCR can be re-tuned and calibrated (infrequently) during the NCR operation.

In a first enhancement, L1/L2-based 'delta signaling' can be used to provide fast update/re-configuration of higher layer information. For example, when higher layer information is provided by pre-configuration of NCR-MT (as considered in scenario 2 described herein), an OTA L1/L2 signaling may be used to provide an update to the higher layer information provided by pre-configuration. For example, when higher layer information is provided by OTA configuration of NCR-MT (as considered in scenario 1 described herein), an OTA L1/L2 signaling may be used to provide an update to the higher layer information provided by SIB or RRC configuration.

For example, the L1/L2 signaling provides update for only some first information elements (IEs) within the higher layer information, and does not make changes to other second IEs. Accordingly, the NCR-MT only updates the first IEs in the higher layer information, and does not update the second IEs-hence the name delta signaling. For example, the L1/L2 signaling can be using a DCI format or a MAC-CE command, that includes values for the first IEs. For example, delta signaling can be used for update of SSB information, system information, TDD DL-UL configuration, and so on. For example, L1/L2-based delta signaling can be considered when an update of higher layer information has a small payload size. L1/L2-based delta signaling can be beneficial, for example, to avoid slow delivery of higher layer information updates using offline/OAM methods.

Figures 30, 31:
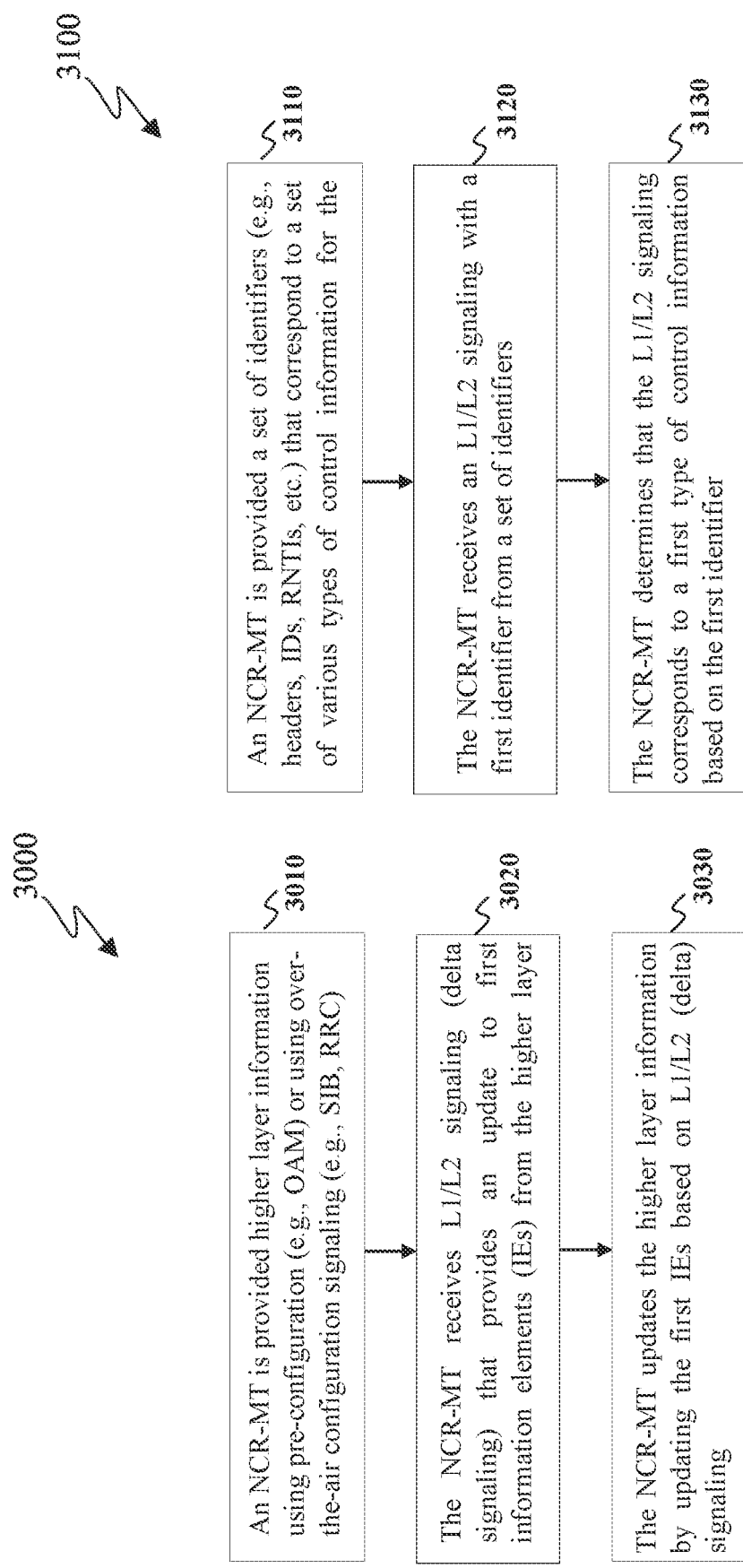
FIG. 30 illustrates an example flowchart for update of higher layer information based on L1/L2 delta signaling according to embodiments of the present disclosure.
FIG. 31 illustrates an example flowchart for distinguishing various types of control information for an NCR according to embodiments of the present disclosure.

FIG. 30 illustrates an example flowchart for update of higher layer information based on L1/L2 delta signaling 3000 according to embodiments of the present disclosure. The embodiment of the flowchart for update of higher layer information based on L1/L2 delta signaling 3000 illustrated in FIG. 30 is for illustration only. FIG. 30 does not limit the scope of this disclosure to any particular implementation of the flowchart for update of higher layer information based on L1/L2 delta signaling 3000.

As illustrated in FIG. 30, at step 3010, an NCR-MT is provided higher layer information using pre-configuration (e.g., OAM) or using over-the-air configuration signaling (e.g., SIB, RRC). At step 3020, the NCR-MT receives L1/L2 signaling (delta signaling) that provides an update to first information elements (IEs) from the higher layer information. At step 3030, the NCR-MT updates the higher layer information by updating the first IEs based on L1/L2 (delta) signaling and retains other IEs in the higher layer information.

In a second enhancement, an over-the-air calibration procedure for NCR can be defined among gNB and the NCR node, so that time/frequency synchronization or spatial domain coordination among the gNB and the NCR can be re-tuned and calibrated. The calibration procedure can be beneficial, for example, to ensure continued operation of NCR such as when initial setting of time/frequency synchronization or spatial domain coordination is established based on pre-configuration, such as by OAM.

One embodiment includes content and format of L1/L2 control signaling for NCR-MT. An NCR-MT can be provided L1/L2 signaling that include various control information, such as: control information for controlling the NCR-MT itself; side control information for controlling the NCR-RU; or assistance information to the gNB by the NCR. The NCR can distinguish various control information types based on, for example, one or more of: a header or identifier/ID; a length or payload size; or using validation/re-interpretation methods.

A first type of NCR control information can include, for example, control information for controlling the NCR-MT itself and can correspond to, for example, for RLF procedure, CSI reporting for link adaptation, beam management, and so on.

A second type of NCR control information can include, for example, side control information for controlling the NCR-RU and can correspond to, for example, beamforming information, ON/OFF indication, and so on. Such side control information can include coordination messages between the NCR and the gNB, as well as corresponding L1/L2 signaling, if any. For example, corresponding signaling can include L1/L2 DL signaling, if any, for indication or scheduling of control/data channel(s) reception such as PDCCH or PDSCH reception that includes the side control information. For example, corresponding L1/L2 signaling can include corresponding L1/L2 UL signaling, such as HARQ-ACK feedback information in a PUCCH or a PUSCH transmitted by the NCR-MT to confirm successful reception (or not) of the side control information. In another example, an NCR-MT can be (pre) configured by higher layer information or can be indicated by a 'triggering' L1/L2 signaling to transmit current value(s) for one or more side control information in one or multiple transmission occasions. Such operation can be beneficial, for example, for the gNB to become aware of the value(s) applied by NCR for various operations, to ensure of correct coordination between the gNB and the NCR, or to send necessarily L1/L2 signaling to the NCR-MT to update the side control information.

A third type of NCR control information can include, for example, assistance information to the gNB by the NCR and can correspond to, for example, reporting NCR measurements of UE uplink transmissions to the gNB, NCR measurements of neighbor cell interference or transmissions of corresponding UEs, and so on.

In one example, control information for an NCR can be referred to as NCR control information, and abbreviated as NCI. In one example, NCI may be used only for certain types of NCR control information, such as side control information for NCR-RU operation (that is, the second type of NCR control information as described above). In another example, NCI may be used for all types of NCR control information, such as all the types described above.

In one example, higher layer information or the specifications for system operation can provide default or fallback value(s) for (certain) NCR control information, so that when the NCR-MT does not receive an L1/L2 signaling that provides a value for the corresponding NCI, the NCR-MT can apply the default or fallback value.

An L1/L2 signaling that provides control signaling to the NCR-MT can be in the form of a DCI format or a MAC-CE command, or variants thereof. The NCR-MT can receive the L1/L2 control signaling using a downlink channel such as PDCCH or PDSCH, and can transmit L1/L2 control signaling using an uplink channel such as PUCCH or PUSCH.

The L1/L2 signaling format should be such that the NCR-MT (or the gNB) can determine which type of control information is provided in a given signaling. The NCR-MT (or the gNB) can determine the type of control signaling based on, for example, one or more of the following methods.

In a first method, the distinction of different types of NCR control information can be based on a (new) header or identifier/ID, such as a header/ID used for a MAC-CE command, or an RNTI using for scrambling a CRC of a DCI format. In one example, the NCR-MT can be provided multiple IDs, such as multiple RNTIs, wherein each ID or each RNTI corresponds to a different signaling. For example, the NCR-MT uses a first ID/RNTI for receiving control information for NCR-MT itself, and uses a second ID/RNTI for receiving side control information for NCR-RU.

In a second method, the distinction of different types of NCR control information can be based on a (new) length or payload size, such as a number of octets for a MAC-CE command or a DCI format size. In one example, each control information can have a separate payload size, such as corresponding to a different DCI format size. In another example, a single (new) DCI format or DCI format size for an NCR-MT can be used for signaling multiple different control information types. According to this example, the NCR-MT determines that an L1/L2 signaling corresponds to a first type of control information when a first set of fields/IEs in the L1/L2 signaling are set first predetermined values. For example, the NCR-MT determines that the L1/L2 signaling corresponds to a second type of control information when the first set of fields/IEs (or a second set of fields/IEs) in the L1/L2 signaling are set to second predetermined values.

FIG. 31 illustrates an example flowchart for distinguishing various types of control information for an NCR 3100 according to embodiments of the present disclosure. The embodiment of the flowchart for distinguishing various types of control information for an NCR 3100 illustrated in FIG. 31 is for illustration only. FIG. 31 does not limit the scope of this disclosure to any particular implementation of the flowchart for distinguishing various types of control information for an NCR 3100.

As illustrated in FIG. 31, at step 3110, an NCR-MT is provided a set of identifiers (e.g., headers, IDs, RNTIs, etc.) that correspond to a set of various types of control information for the NCR (such as NCR beamforming information, ON/OFF indication, or control information for NCR-MT itself). At step 3120, the NCR-MT receives an L1/L2 signaling with a first identifier from a set of identifiers. At step 3130, the NCR-MT determines that the L1/L2 signaling corresponds to a first type of control information based on the first identifier.

In a third method, the distinction of different types of NCR control information can be based on validation or re-interpretation methods, such as having certain predetermined set of fields/IEs from an existing Rel-15/16/17 signaling set to predetermined values. For example, the NCR-MT can determine that a first DCI format, such as DCI format 1_0, with CRC scrambled with a first RNTI corresponds to a first type of control information for the NCR, such as NCR-RU beamforming information, when first DCI fields in the first DCI format, such as RV, HPN, and so on, are set to first values, such as all zeros or all ones.

One embodiment includes resources for L1/L2 control signaling to the NCR-MT. The NCR-MT can be provided, via higher layer information, time or frequency resources in which the NCR-MT can receive various types of control information. The information can provide indication of resources in which the NCR-MT actually receives the control information, or can include a super-set of candidate/potential resources in which the NCR-MT may receive the control information, for example, based on an indication by L1/L2 signaling or based on NCR-MT blind decoding operation. The (pre) configuration of time/frequency resources can be NCR-dedicated (that is, separate for each NCR) or can be NCR-common or shared among multiple NCR nodes linked to a same gNB/serving cell.

In one example, higher layer information can provide information of a set of slots in which the NCR-MT can receive the NCR control information. For example, higher layer information can provide a periodicity and slot offset to indicate a set or pattern of slots in which the NCR-MT can receive the control information. For example, the NCR is indicated to receive control information every N=10, 20, 40, 80, 160 slots, with a slot offset from {0, 1, 2, . . . , N−1}. In another example, the NCR-MT can be provided an explicit list of time slots for receiving control information. For example, the NCR-MT can be provided an explicit list of time slot indexes for up to M=4 slots within a period of N=10, 20, 40, 80, 160 slots, wherein the up to M=4 slots can be any slot within the period. For example, when N=40 and M=4, the NCR-MT can be indicated slots {5, 18, 37}. For example, the NCR-MT can be indicated to re-use the same slot indexes for the next periods, such as, slots {5+40*k, 18+40*k, 37+40*k} for time periods k=0, 1, 2, . . . , until the NCR-MT receives new higher layer information, such as a higher layer re-configuration or an update to the higher layer pre-configuration.

In one example, time units for resource indication in the higher layer information can correspond to time units other than slots, such as symbols, frames, or absolute time units such as milli-sec or micro-sec and so on, which can be provided using methods similar to those described above for time slots. In one example, resources may be provided in a mixture format. For example, higher layers can provide a set of slots, and also a set or number of symbols within the slot for receiving NCR control information.

Herein, a slot/symbol/frame can be with respect to (w.r.t.) the SCS configuration of the initial DL/UL BWP of the NCR-MT or w.r.t. a reference SCS, such as 30 kHz for FR1 and 120 kHz for FR-2-1 and 480 kHz for FR-2-2, or can be w.r.t. an SCS explicitly provided by higher layer information such as by pre-configuration or in the MIB or SIB1 or SIBx (x>1) dedicated to NCR nodes.

In one example, the NCR-MT expects to receive control information in all indicated time slots. In another example, the NCR-MT may or may not receive control information in the indicated time slots, so the indicated time slots are candidate time slots for receiving the control information. In such a case, the NCR-MT can determine slots in which the NCR-MT receives control information based on L1/L2 signaling, such as a PDCCH/DCI format that schedules a PDSCH that includes the control information. In another example, the NCR-MT performs blind decoding operation with the indicated slots to receive, for example, a PDCCH that includes a DCI format for indication of NCR control information.

In one example, the NCR-MT does not receive a (pre) configuration of time-domain resources for NCR control information. For example, the higher layer information may indicate (candidate) resources in one domain only, such as frequency domain only, so that indication of time-domain resource for reception of NCR control information can be provided by L1/L2 signaling. For example, when the NCR receives control information in a PDSCH that is scheduled by a PDCCH, the NCR may be provided time-domain resources for PDCCH only, and a time slot for the PDSCH can be indicated by the PDCCH. For example, higher layer information can include a TDRA table, and a DCI format in the PDCCH can indicate a row from the TDRA table provided by higher layer information. In one example, to simplify the NCR operation/implementation, the NCR-MT does not expect to be provided a TDRA table by higher layer information, and the NCR-MT only uses a default TDRA table that is predetermined in the specifications for system operation.

In one example, higher layer information can provide information of frequency-domain resources in which the NCR-MT receives the L1/L2 signaling that includes the NCR control information. For example, the frequency-domain resources can be with respect to (w.r.t.) an active BWP or a serving cell for the NCR-MT operation or w.r.t. a 'pass band' for the NCR-RU operation. For example, the frequency domain resources can within a BWP such as an initial BWP or within a CORESET #0 of a serving cell for which the NCR-RU is performing the amplify-and-forward (AF). For example, the NCR-MT can determine frequency domain resources, such as RBs corresponding to the initial BWP or the CORESET #0, based on higher layer information or via NCR implementation (such as receiving and detecting/decoding the SSB, MIB, SIB1, or SIBx, and so on). For example, higher layer information can provide index of a row in a predetermined table that includes configuration of CORESET #0, such as a predetermined table in [TS 38.213] in 5G NR Rel-15/16/17. In one example, NCR-MT can be provided information of a subset of the initial BWP or CORESET #0 and so, such that the NCR-MT receives the L1/L2 signaling only with the indicated subset of frequency resources.

For example, the frequency domain resources can be within a BWP different from the initial BWP or a CORESET different from CORESET #0 of the serving cell for which the NCR-RU is performing the AF operation. For example, a gNB can allocate a BWP or a CORESET that is common to all NCR nodes that operate with the gNB or with a same serving cell associated with the gNB.

For example, a gNB can provide information of a new/second initial BWP that is different from a (first) initial BWP, wherein the (first) initial BWP can be used by Rel-15/16/17 and beyond 'normal' UEs, and a new/second initial BWP can be used by all NCR node connected to a same cell or associated with a same gNB. In one example, an NCR-MT is provided information of such a new/second initial BWP by (pre) configuration such as by OAM, or by OTA higher layer information such as by SIB1 or by SIB1 extension or by a new SIBx (x>1) or by RRC common or RRC dedicated signaling. Accordingly, the NCR-MT 'connects' the gNB on the new/second initial BWP. In another example, the (pre) configuration or higher layer signaling provide information of the (first) initial BWP, and the NCR-MT 'connects' to the gNB on the (first) initial BWP, and then receives information to switch to the new/second initial BWP. For example, when an NCR performs initial/random access procedure, the NCR-MT can be provided with information of or indication to switch to the new/second initial BWP in Msg2/MsgB/RAR, or in Msg4, or in following PDSCH receptions, including RRC messages, if any. The information of the new/second initial BWP can be relative to the (first) initial BWP, such as an RB offset for a starting or lowest index RB, or for a center RB, or indication of a gap or a difference in size in a number of RBs, relative to the (first) initial BWP.

In one example, when the new/second initial BWP includes the (first) initial BWP, the NCR-MT can use a same set of SSBs. When the new/second initial BWP is separate from the (first) initial BWP, such as partial or no overlap in frequency domain, the NCR-MT operates with a second set of SSBs that are different from a first set of SSBs associated with the (first) initial BWP.

In one example, for indicating a set of frequency-domain resources for receiving NCR control information, higher layer information can provide, for example, index of a starting RB and a size/number of RBs. For example, indication can be in terms of RB groups (RBGs) that include a number of RBs. For example, higher layer information can include index of size of an RBG, index of a starting RBG, and a number of RBGs. Alternatively, higher layer information can provide a list of indexes of a number of RBs or RBGs, that may be consecutive or non-consecutive.

Herein, an RB or RB group can be with respect to (w.r.t.) the SCS configuration of the initial DL/UL BWP of the NCR-MT or w.r.t. a reference SCS, such as 30 kHz for FR1 and 120 kHz for FR-2-1 and 480 kHz for FR-2-2, or can be w.r.t. an SCS explicitly provided by higher layer information such as by pre-configuration or in the MIB or SIB1 or SIBx (x>1) dedicated to NCR nodes.

In one example, when a two-step indication is used for providing the NCR control information, such as PDCCH+PDSCH, the set of frequency domain resources provided by higher layers for receiving the NCR control information can apply to either or both the PDCCH and the PDSCH. For example, the resources can apply to PDCCH only, and resources for PDSCH can be indicated separately.

In one example, an NCR may perform AF operation for multiple cells, such as multiple serving cells corresponding to the same gNB, possibly collocated cells. For example, a same gNB may operate a first number of cells in frequency range 1 (FR1) or a second number of cells in frequency range 2 (FR2), and a same repeater may be used to perform AF for first cell(s) from the first number of cells or second cell(s) from the second number of cells, such as when a pass band for the NCR includes multiple (possibly non-adjacent) frequency segments. In such scenarios, the NCR may be provided one set of frequency-domain resources for receiving control information for all corresponding cells, or may be provided multiple sets of frequency-domain resources for receiving control information for each corresponding cell.

Figure 32:
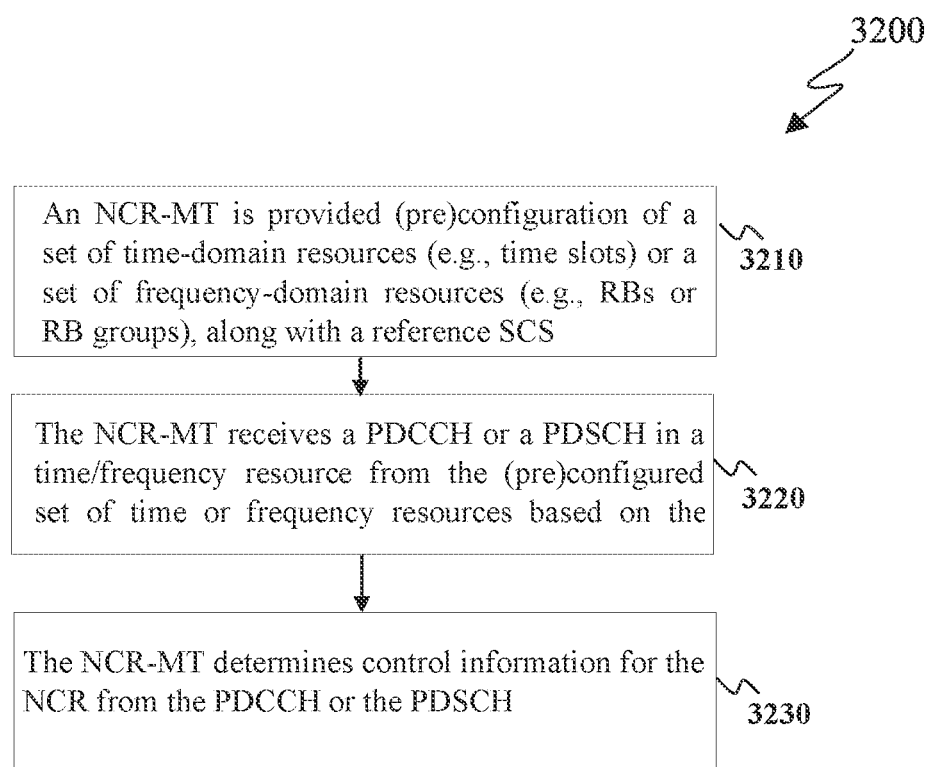
FIG. 32 illustrates an example flowchart for receiving L1/L2 control signaling in time/frequency resource (pre) configured for the NCR-MT according to embodiments of the disclosure.

FIG. 32 illustrates an example flowchart for receiving L1/L2 control signaling in time/frequency resource (pre) configured for the NCR-MT 3200 according to embodiments of the disclosure. The embodiment of the flowchart for receiving L1/L2 control signaling in time/frequency resource (pre) configured for the NCR-MT 3200 illustrated in FIG. 32 is for illustration only. FIG. 32 does not limit the scope of this disclosure to any particular implementation of the flowchart for receiving L1/L2 control signaling in time/frequency resource (pre) configured for the NCR-MT 3200.

As illustrated in FIG. 32, at step 3210, an NCR-MT is provided (pre) configuration of a set of time-domain resources (e.g., time slots) or a set of frequency-domain resources (e.g., RBs or RB groups), along with a reference SCS. At step 3220, the NCR-MT receives a PDCCH or a PDSCH in a time/frequency resource from the (pre) configured set of time or frequency resources based on the reference SCS. At step 3230, the NCR-MT determines control information for the NCR from the PDCCH or the PDSCH.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method for a network-controlled repeater (NCR), the method comprising:
    receiving, by an NCR mobile termination (NCR-MT) entity:
        first information for a list of spatial domain filters for an access link of an NCR forwarding (NCR-Fwd) entity corresponding to a list of time domain resources, second information for a set of spatial relations corresponding to reference signals (RSs) for transmission or reception on a control link (C-link) of the NCR-MT entity, and
third information indicating an uplink (UL) direction or a downlink (DL) direction for each time domain resource from the list of time domain resources;
determining, by the NCR-MT entity:
an UL time domain resource from the list of time domain resources based on the third information,
a first spatial domain filter from the list of spatial domain filters, and
a second spatial domain filter based on the second information;
receiving, by the NCR-Fwd entity, a radio frequency (RF) signal on the access link using the first spatial domain filter over the UL time domain resource;
amplifying, by the NCR-Fwd entity, the RF signal; and
transmitting, by the NCR-Fwd entity, the RF signal on a backhaul link of the NCR-Fwd entity using the second spatial domain filter over the UL time domain resource.

2. The method of claim 1, further comprising:
determining, by the NCR-MT entity:
a DL time domain resource from the list of time domain resources based on the third information,
a third spatial domain filter, from the list of spatial domain filters, and
a fourth spatial domain filter based on the second information;
receiving, by the NCR-Fwd entity, an RF signal on the backhaul link using the fourth spatial domain filter over the DL time domain resource;
amplifying, by the NCR-Fwd entity, the RF signal; and
transmitting, by the NCR-Fwd entity, the RF signal on the access link using the third spatial domain filter over the DL time domain resource.

3. The method of claim 1, wherein:
the first information includes a list of indexes from a set of indexes,
the list of spatial domain filters is from a set of spatial domain filters that the NCR-Fwd entity supports on the access link,
the set of spatial domain filters has a one-to-one mapping with the set of indexes, and
the set of spatial domain filters and the set of indexes are received from an operation and management (OAM) entity.

4. The method of claim 1, wherein:
the first information indicates:
a first list of indexes for the list of time domain resources, and
a second list of indexes for the list of spatial domain filters for the access link, indexes in the first list have a one-to-one mapping with indexes in the second list, the first list includes an index for the UL time domain resource, and the second list includes an index for the first spatial domain filter.

5. The method of claim 1, wherein:
the first information indicates:
a subcarrier spacing (SCS) for time domain resources within the list of time domain resources, and
parameters for the time domain resources, and
the parameters include:
an index of a starting slot,
an index of a starting symbol within the starting slot, and
a number of symbols.

6. The method of claim 1, further comprising:
determining a time duration for application of a spatial domain filter for the access link, wherein the reception of the first information is in a symbol or slot that is before the UL time domain resource by at least the time duration.

7. The method of claim 1, wherein:
the second spatial domain filter corresponds to a second spatial relation from the set of spatial relations for the C-link,
when the set of spatial relations for the C-link includes one spatial relation, the second spatial relation is the same as the one spatial relation, and
when the set of spatial relations for the C-link includes more than one spatial relation, the second spatial relation is one of:
a spatial relation, from the set of spatial relations, indicated for transmission by the NCR-MT entity on the C-link over the UL time resource,
a spatial relation, from the set of spatial relations, indicated for transmission by the NCR-Fwd entity on the backhaul link, or
a reference spatial relation from the set of spatial relations.

8. A network-controlled repeater (NCR) comprising:
a transceiver of an NCR mobile termination (NCR-MT) entity configured to receive:
first information for a list of spatial domain filters for an access link of an NCR forwarding (NCR-Fwd) entity corresponding to a list of time domain resources,
second information for a set of spatial relations corresponding to reference signals (RSs) for transmission or reception on a control link (C-link) of the NCR-MT entity, and
third information indicating an uplink (UL) direction or a downlink (DL) direction for each time domain resource from the list of time domain resources;
a processor of the NCR-MT entity, operably coupled to the transceiver of the NCR-MT entity, the processor of the NCR-MT entity configured to determine:
an UL time domain resource from the list of time domain resources based on the third information,
a first spatial domain filter from the list of spatial domain filters, and
a second spatial domain filter based on the second information; and
a transceiver of the NCR-Fwd entity, operably coupled to the processor of the NCR-MT entity, the transceiver of the NCR-Fwd entity configured to:
receive a radio frequency (RF) signal on the access link using the first spatial domain filter over the UL time domain resource;
amplify the RF signal; and
transmit the RF signal on a backhaul link of the NCR-Fwd entity using the second spatial domain filter over the UL time domain resource.

9. The NCR of claim 8, wherein:
the processor of the NCR-MT entity is further configured to determine:
a DL time domain resource from the list of time domain resources based on the third information,
a third spatial domain filter, from the list of spatial domain filters, and
a fourth spatial domain filter based on the second information; and the transceiver of the NCR-Fwd entity is further configured to:
receive an RF signal on the backhaul link using the fourth spatial domain filter over the DL time domain resource;
amplify the RF signal; and
transmit the RF signal on the access link using the third spatial domain filter over the DL time domain resource.

10. The NCR of claim 8, wherein:
the first information includes a list of indexes from a set of indexes,
the list of spatial domain filters is from a set of spatial domain filters that the NCR-Fwd entity supports on the access link,
the set of spatial domain filters has a one-to-one mapping with the set of indexes, and
the set of spatial domain filters and the set of indexes are received from an operation and management (OAM) entity.

11. The NCR of claim 8, wherein:
the first information indicates:
a first list of indexes for the list of time domain resources, and
a second list of indexes for the list of spatial domain filters for the access link, indexes in the first list have a one-to-one mapping with indexes in the second list, the first list includes an index for the UL time domain resource, and the second list includes an index for the first spatial domain filter.

12. The NCR of claim 8, wherein:
the first information indicates:
a subcarrier spacing (SCS) for time domain resources within the list of time domain resources, and
parameters for the time domain resources, and
the parameters include:
an index of a starting slot,
an index of a starting symbol within the starting slot, and
a number of symbols.

13. The NCR of claim 8, wherein:
the processor of the NCR-MT entity is further configured to determine a time duration for application of a spatial domain filter for the access link, and
the transceiver of the NCR-MT entity is further configured to receive the first information in a symbol or slot that is before the UL time domain resource by at least the time duration.

14. NCR of claim 8, wherein:
the second spatial domain filter corresponds to a second spatial relation from the set of spatial relations for the C-link,
when the set of spatial relations for the C-link includes one spatial relation, the second spatial relation is the same as the one spatial relation, and
when the set of spatial relations for the C-link includes more than one spatial relation, the second spatial relation is one of:
a spatial relation, from the set of spatial relations, indicated for transmission by the NCR-MT entity on the C-link over the UL time resource,
a spatial relation, from the set of spatial relations, indicated for transmission by the NCR-Fwd entity on the backhaul link, or
a reference spatial relation from the set of spatial relations.

15. A base station comprising:
a transceiver configured to transmit to a network-controlled repeater mobile termination (NCR-MT) entity:
first information for a list of spatial domain filters for an access link of a network-controlled repeater forwarding (NCR-Fwd) entity corresponding to a list of time domain resources,
second information for a set of spatial relations corresponding to reference signals (RSs) for transmission or reception on a control link (C-link) of the NCR-MT entity,
third information indicating an uplink (UL) direction or a downlink (DL) direction for each time domain resource from the list of time domain resources;
a processor operably connected to the transceiver, the processor configured to determine:
an UL time domain resource from the list of time domain resources based on the third information, and
a first spatial domain filter based on the second information; and
the transceiver is further configured to receive a radio frequency (RF) signal on a backhaul link from the NCR-Fwd entity using the first spatial domain filter over the UL time domain resource.

16. The base station of claim 15, wherein:
the processor is further configured to determine:
a DL time domain resource from the list of time domain resources based on the third information, and
a second spatial domain filter based on the second information; and
the transceiver is further configured to transmit an RF signal on the backhaul link using the second spatial domain filter over the DL time domain resource.

17. The base station of claim 15, wherein:
the first information includes a list of indexes, from a set of indexes, for the list of spatial domain filters,
the list of spatial domain filters is from a set of spatial domain filters that the NCR-Fwd entity supports on the access link,
the set of spatial domain filters has a one-to-one mapping with the set of indexes, and
the set of spatial domain filters and the set of indexes are received from an operation and management (OAM) entity.

18. The base station of claim 15, wherein:
the first information indicates:
a first list of indexes for the list of time domain resources,
a second list of indexes for the list of spatial domain filters for the access link,
a subcarrier spacing (SCS) for time domain resources within the list of time domain resources, and
parameters for the time domain resources, wherein the parameters include:
an index of a starting slot,
an index of a starting symbol within the starting slot, and
a number of symbols,
indexes in the first list have a one-to-one mapping with indexes in the second list,
the first list includes an index for the UL time domain resource,
the second list includes an index for the first spatial domain filter.

19. The base station of claim 15, wherein:
the processor is further configured to determine a time duration for application of a spatial domain filter for the access link, and the transceiver is further configured to transmit the first information in a symbol or slot that is before the UL time domain resource by at least the time duration.

20. The base station of claim 15, wherein:

the first spatial domain filter corresponds to a second spatial relation from the set of spatial relations for the C-link, when the set of spatial relations for the C-link includes one spatial relation, the second spatial relation is the same as the one spatial relation, and when the set of spatial relations for the C-link includes more than one spatial relation, the second spatial relation is one of:
- a spatial relation, from the set of spatial relations, indicated for reception by the NCR-MT entity on the C-link over the UL time resource,
- a spatial relation, from the set of spatial relations, indicated for reception by the NCR-Fwd entity on the backhaul link, or
- a reference spatial relation from the set of spatial relations.

\* \* \* \* \*